(12) United States Patent
Nakanishi et al.

(10) Patent No.: US 6,903,517 B2
(45) Date of Patent: Jun. 7, 2005

(54) COLD-CATHODE DRIVER AND LIQUID CRYSTAL DISPLAY

(75) Inventors: Hideyuki Nakanishi, Mitsu-gun (JP); Takahiro Kobayashi, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 103 days.

(21) Appl. No.: 10/362,943
(22) PCT Filed: Jun. 26, 2002
(86) PCT No.: PCT/JP02/06391
§ 371 (c)(1), (2), (4) Date: Feb. 27, 2003
(87) PCT Pub. No.: WO03/003555
PCT Pub. Date: Jan. 9, 2003

(65) Prior Publication Data
US 2004/0100592 A1 May 27, 2004

(30) Foreign Application Priority Data
Jun. 27, 2001 (JP) ........................................ 2001-194084
Dec. 4, 2001 (JP) ........................................ 2001-369851

(51) Int. Cl.⁷ .......................... H05B 41/24; H01L 41/04
(52) U.S. Cl. ................................. 315/209 PZ; 310/316
(58) Field of Search .......................... 315/209 PZ, 224, 315/307; 310/367, 313 A, 316.01, 318; 345/82

(56) References Cited

U.S. PATENT DOCUMENTS
5,854,543 A * 12/1998 Satoh et al. ................ 315/307

(Continued)

FOREIGN PATENT DOCUMENTS
EP       1050954 A1     11/2000

(Continued)

Primary Examiner—James Vannucci
Assistant Examiner—Minh Dieu A
(74) Attorney, Agent, or Firm—McDermott Will & Emery LLP

(57) ABSTRACT

A cold cathode tube driving device using a piezoelectric transformer in which an output voltage varies depending on a frequency of an input voltage, as a booster transformer for driving a cold cathode tube, includes: a frequency dividing means which generates a driving pulse of an average frequency corresponding to frequency data outputted from a frequency setting means at a distribution cycle which is a driving pulse N cyclic period; a controller which controls a control cycle so as to perform the same driving for predetermined number of times A (A≧2) at the average frequency; and a burst pulse generating means which generates a pulse having a duty width in accordance with a dimming level externally applied thereto and having a frequency outputted from the controller.

A control cycle is A times (natural number) the distribution cycle and the driving is performed A times at the same average frequency, whereby a digital driving system using the frequency distribution of the driving pulse is achieved. Consequently, a space for the driving circuit can be saved and cost can be reduced. Further, a frequency distribution system is adopted, thereby obtaining frequency resolution required for satisfactory dimming performance and lighting performance. Moreover, a burst dimming system is adopted, thereby suppressing brightness flicker seen in a tube current control system. Additionally, there is no electric power loss seen in a system in which a power source is turned on or off and further a shield circuit is unnecessary because of a system in which the driving pulse is turned on or off. In particular, the control cycle is A times the distribution cycle and the burst dimming is performed in which the driving is executed A times at the same average frequency, whereby the brightness flicker can be prevented by controlling the tube current to be constant with high dimming resolution assured.

34 Claims, 50 Drawing Sheets

U.S. PATENT DOCUMENTS 6,075,325 A * 6/2000 Kouno et al. ................ 315/307
6,153,962 A * 11/2000 Noma et al. ........... 310/316.01
6,362,798 B1 * 3/2002 Kimura et al. ................ 345/55

FOREIGN PATENT DOCUMENTS

| JP | 2000-133485 | 5/2000 |
| JP | 2000-139081 | 5/2000 |

* cited by examiner

COLD-CATHODE DRIVER AND LIQUID CRYSTAL DISPLAY

TECHNICAL FIELD

The present invention relates to a cold cathode tube driving device which utilizes a piezoelectric transformer as a booster transformer for driving a cold cathode tube, for example, a backlight of a liquid crystal panel, and a liquid crystal display device on which the cold cathode tube driving device is mounted.

BACKGROUND ART

A piezoelectric transformer that can be reduced in size and thickness and can bring high efficiency has been used, instead of an electromagnetic transformer, as a booster transformer for driving a cold cathode tube that is a backlight of a liquid crystal panel. The piezoelectric transformer is generally a voltage converting element, which utilizes the piezoelectric effect of a piezoelectric element for generating mechanical oscillations and taking out from its secondary electrode side a voltage amplified depending on a voltage step-up ratio determined by the shape of the piezoelectric transformer.

FIG. 40 shows a general characteristic of a piezoelectric transformer. In the piezoelectric transformer, an output voltage at its secondary side varies in accordance with a frequency of an AC voltage inputted to its primary side since the piezoelectric transformer has a resonance characteristic. Due to the aforementioned characteristic, the next form is popular as a method for controlling the brightness of the backlight at a constant level. Specifically, this method is such that the frequency of the AC voltage for driving the piezoelectric transformer is controlled to obtain an amplitude of a desired level at the secondary side, to thereby apply a stable voltage to the cold cathode tube. A linear inclined portion in the frequency area higher than the resonance frequency is utilized for the control.

FIG. 41 shows a general configuration of a backlight driving means. In FIG. 41, numeral 1 designates a piezoelectric transformer, 2 a coil, 3 a switching transistor (FET (Field Effect Transistor)), 4 a cold cathode tube, 5 a current detector for detecting electric current flowing through the cold cathode tube 4 and 6 a driving pulse generating circuit that compares the detected voltage by the current detector 5 with a reference voltage for producing a driving pulse of a frequency according to its difference.

FIG. 42 shows waveforms at each means of the circuit shown in FIG. 41. In FIG. 42, a voltage A is an output voltage waveform (driving pulse) of the driving pulse generating circuit 6, a voltage B is an input voltage waveform of the piezoelectric transformer 1 and a voltage C is an output voltage waveform of the piezoelectric transformer 1. The voltage C is given to the cold cathode tube 4 so that electric current (tube current) flows through the cold cathode tube 4. The current flowing through the cold cathode tube 4 is detected by the current detector 5. Although the input voltage of the piezoelectric transformer 1 is desirably a sinusoidal voltage, the following explanation is made with a half-wave sinusoidal voltage.

The coil 2 and the piezoelectric transformer 1 constitute a resonance circuit. Its resonance frequency is determined by the inductance value of the coil 2 and the input capacity value of the piezoelectric transformer 1. Applying energy to the resonance circuit via the FET 3 brings a half-wave sinusoidal voltage with the above-mentioned resonance frequency (voltage B). Only the resonance frequency component possessed by the piezoelectric transformer 1 itself is drawn out from the output of the piezoelectric transformer 1 to which the voltage B is inputted, with the result that the sinusoidal voltage that is the voltage C shown in FIG. 42 is outputted. This sinusoidal voltage C has the amplitude varying in accordance with the frequency of the voltage B due to the characteristic shown in FIG. 40.

Utilizing this characteristic, the driving pulse generating circuit 6 compares the voltage obtained from the current detector 5 with the reference voltage for controlling the frequency of the output voltage from the driving pulse generating circuit 6 such that the tube current is made to be a desired value. Voltages A1 to C1 in FIG. 42 respectively show waveforms of each means when the frequency of the driving pulse is lowered. The lower the frequency becomes, the greater the amplitude of the sinusoidal voltage becomes.

As described above, a method for controlling the tube current by varying the frequency of the driving pulse is generally used for controlling the brightness of the cold cathode tube 4 in the driving circuit of the piezoelectric transformer 1.

Conventionally, a circuit for realizing the above-mentioned technique has generally been formed of an analog circuit. Accordingly, there is a problem that the number of components is increased and the space for the components is large. Particularly, it has been desired that the space for the driving circuit is saved since miniaturization of equipment is important in a portable imaging equipment such as a VTR integrated with a camera or a digital camera.

In view of this, an attempt has been made for saving a space for the driving circuit and also reducing cost by digitizing the driving circuit to make one chip with the other LSIs (for example, liquid crystal controller or the like) (see Japanese Unexamined Patent Publication No. 2000-133485 (document 1)).

Several 100 MHz to several GHz clocks are normally required in order to obtain practical dimming resolution with the driving of the piezoelectric transformer of a digital system. The technique in the document 1 is a system in which a frequency of the driving pulse is distributed. This system enables a dimming resolution by a frequency control with approximately 10 MHz clocks.

The technique disclosed in the document 1 will briefly be explained. In the case of digitally producing a driving pulse, a frequency resolution required for the dimming control cannot be obtained in a method for obtaining a driving pulse by simply dividing clocks. A sharpness Q of the resonance of the piezoelectric transformer is extremely great. In case where the driving frequency of the piezoelectric transformer is about 100 KHz, for example, the frequency resolution required for the dimming control is at intervals of several 10 Hz in the vicinity of 100 KHz. However, in case where the clock frequency is 10 MHz and the driving pulse of 100 KHz is produced by using this clock, for example, the frequency resolution of only about 1 KHz can be obtained in the vicinity of 100 KHz, so that it is difficult to realize not only dimming performance but also stable lighting.

In view of this, a configuration is made such that a frequency dividing ratio is distributed in a predetermined driving cycle for obtaining a resolution with an average frequency as shown in FIG. 43. By this method, when the frequency dividing ratio is distributed in 100 cycles, for example, a hundred-fold frequency resolution can be obtained. This method enables to incorporate a cold cathode tube driving device in a digital LSI, thereby being capable of reducing a space and cost.

The driving method disclosed in the document 1 is a system for performing the dimming control by controlling the tube current. However, this method for performing the dimming control by controlling the tube current has the following problems:

(1) The current flowing through the cold cathode tube is unstable in the area where the tube current is small, so that the dimming level cannot be greatly reduced.

(2) A luminous efficiency of the cold cathode tube varies depending upon a current value, so that the luminous efficiency greatly changes in accordance with the dimming level in the tube current control.

(3) In order to change the tube current, the driving frequency is required to be changed. However, the efficiency of the piezoelectric transformer changes depending upon the driving frequency, so that there is a limitation to obtain a high efficiency within a wide dimming range.

As a means for solving these problems, there has been known a technique (hereinafter referred to as a burst dimming) in which the driving is intermittently turned on and off at a frequency (for example, about 100 Hz) that does not cause a brightness flicker. The dimming level is changed by changing a duty ratio of turning-on and turning-off. This technique has widely been used for not only a backlight driving circuit utilizing a piezoelectric transformer but also a backlight driving circuit utilizing a conventional electromagnetic transformer.

There are roughly the following two systems for realizing this burst dimming in the backlight driving circuit utilizing the piezoelectric transformer. One of them is a method for turning on and turning off a circuit power source, while the other one is a method for turning on and turning off only the driving pulse with the circuit actuated.

The former method can be adopted to the conventional circuit. In this method, a starting control upon turning on a power source and a normal control upon lighting are repeatedly executed. However, a shield circuit for turning on and turning off the power source is required in a power source line. An electric loss occurs due to this shield circuit, thus not preferable in a portable equipment in particular.

On the other hand, the latter method requires a means for turning off the detection of the tube current upon turning off the driving and holding the driving frequency at a predetermined value in addition to the conventional circuit. In this case, there is no electric loss in the power source line, thus excellent in the use of a portable equipment in particular. A technique for realizing this method in an analog system is disclosed, for example, in Japanese Unexamined Patent Publication No. 11-298060 (1999) (document 2).

The technique disclosed in the document 2 will briefly be explained. FIG. 44 is a view simplifying the technique disclosed in the document 2. It is featured in that a voltage at the current detector 5 is held by a sample holding means 8 upon turning off the driving, thereby holding the oscillation frequency of a voltage control oscillation circuit 12 at a constant level and promptly starting the lighting upon restarting the driving.

As described above, the burst dimming driving system can be realized by adding a simple circuit in the analog driving system. However, in case where the burst dimming is realized in the digital system by a frequency distribution system, there arises the following subjects:

(1) The frequency distribution system is configured such that a frequency of a driving pulse is distributed in a predetermined cycle to obtain a frequency resolution with an average frequency. It performs a current control with the distribution cycle as one set. Therefore, in case where the ON/OFF duty ratio is optionally changed, a current detection that is correct on principle of the distribution system cannot be executed, and hence, the current control is remarkably unstable.

(2) In case where the duty ratio is changed with a distribution cycle unit without destroying the distribution principle as shown in FIG. 45, a set of the distribution cycle is required in accordance with the dimming resolution in order to obtain a required dimming resolution. By this, the frequency of the burst cycle is remarkably reduced and brightness flicker is increased. Additionally, when the burst period rises high to a level that can suppress the brightness flicker, the dimming resolution cannot be obtained.

Further, there is a subject concerning a starting control upon the burst dimming (especially in case where the aimed brightness level is small) as a common subject of analog and digital systems. It is desirable to light up with a desired brightness upon lighting. However, this has been difficult in the conventional driving circuit because of the following reasons.

There are following two methods for lighting with a desired brightness. The first one is a method for performing with the burst driving upon the starting similar to the case upon the lighting as shown in FIG. 46. This method does not require extra circuits since the burst control is adopted upon starting and lighting. Further, the brightness level is shifted to the aimed brightness level without sense of a incongruity, thereby being capable of obtaining a satisfactory lighting quality.

However, the lighting performance of the cold cathode tube is deteriorated in this method, especially in case where the aimed brightness level is low.

A cold cathode tube generally has reduced lighting performance at a low temperature or under a dark ambient illuminance. This problem has been known to be improved by rising the starting voltage or lengthening time for applying the starting voltage.

However, the starting with the burst driving requires an extra time for applying the starting voltage, thereby taking time to light.

Additionally, in order to prevent extra stress due to high pressure being placed on the piezoelectric transformer upon starting, a protection function is provided to terminate the starting unless lighting is executed even after a predetermined period. There may be the case where lighting is not executed due to the influence of this protection function.

There is a method for rising the starting voltage upon the burst driving. However, this causes further stress on the piezoelectric transformer, thereby deteriorating reliability. Further, this method requires an extra circuit space to reinforce a measure for preventing a discharge caused by a high pressure, thus not preferable.

The second method is that, as shown in FIG. 47, continuous driving is performed upon the starting in view of the lighting performance of the cold cathode tube, and then, the driving is promptly shifted to the burst driving after the lighting. This method requires a lighting detecting means and a control switching means since the control is different between upon the starting and upon the lighting. If an ideal lighting detecting means can be obtained, it enables the lighting with the aimed brightness level without deteriorating the lighting performance of the cold cathode tube.

However, the conventional lighting detecting means is slow in detecting the lighting, resulting in that the brightness is greatly changed by the time of reaching the aimed brightness level as shown in FIG. 47, that causes a problem concerning the lighting quality.

The present invention is accomplished in view of the above-mentioned problems, and an object thereof is to firstly propose a driving system realizing a burst dimming in a digital system, and to realize reduced cost and saved space in a cold cathode tube driving device that can perform a burst dimming.

Further, another object of the present invention is secondly to provide a starting system excellent in lighting performance even in case where the aimed brightness level is low.

The other objects, features and advantages of the present invention will be apparent from the following description.

DISCLOSURE OF THE INVENTION

[First Solving Means]

As a first means to solve the subjects, the present invention provides, as a booster transformer for driving a cold cathode tube that is a load, a cold cathode tube driving device using a piezoelectric transformer in which an output voltage varies in accordance with a frequency of an input voltage, and including a data converting means, a smoothing process means, an error voltage calculating means, a frequency setting means, a frequency dividing means, a controller, a burst pulse generating means, an output enabling means and a power amplifying means. Each means may be achieved by hardware or software, or a hybrid configuration in combination of hardware and software. The data converting means detects electric current flowing through the cold cathode tube and converts the detected current amount into digital data. The smoothing process means smoothes output data from the data converting means at a predetermined timing. The error voltage calculating means compare smoothing data obtained from the smoothing process means with reference data for outputting error data corresponding to its difference. The frequency setting means sets a frequency of a driving pulse for driving the piezoelectric transformer based upon the error data applied from the error voltage calculating means. An N cycle of the driving pulse is called "distribution cycle". The frequency dividing means divides a clock of a predetermined frequency and generates a driving pulse of an average frequency corresponding to the frequency data outputted from the frequency setting means in the distribution cycle. The controller controls a control cycle so as to perform the same driving A times (A is a natural number not less than 2) with the average frequency. The burst pulse generating means generates a pulse having a duty width in accordance with a dimming level externally applied thereto and having a frequency outputted from the controller. The output enabling means turns on or off the output of the driving pulse outputted from the frequency dividing means in accordance with the output value from the burst pulse generating means. The power amplifying means performs inversion with a switching by the driving pulse from the output enabling means and then outputs to the piezoelectric transformer. By the above-mentioned configuration, the dimming level is controlled for adjusting the brightness level of the cold cathode tube. It is to be noted that reference is made to FIG. 2 in an embodiment 1 described later concerning this configuration.

The operation of this configuration will be explained as follows. The control cycle is A times the distribution cycle (N cycle of the driving pulse) so that driving is performed A times at the same average frequency. Specifically, the width of the active period of the burst pulse is set not shorter than the distribution cycle.

The frequency dividing means repeatedly performs the driving A times at the distribution cycle having the average frequency by the combination of the frequency dividing ratio over the control cycle, to thereby obtain a frequency resolution with high accuracy. Corresponding to this, it is a principle that the current flowing through the cold cathode tube that is a load is detected per the distribution cycle unit. However, if the burst driving control is executed in one distribution cycle unit so as to obtain constant tube current, the burst pulse width (ON-period) becomes shorter than the distribution cycle, resulting in that the current at ON-time cannot be controlled to be constant. Therefore, the driving is performed in plural cycles (distribution cycle plural cycles) at the same average frequency so that the burst pulse width (ON-time) is not shorter than one distribution cycle and the sampling number of the current detection is equal to the sampling number in the distribution cycle. This configuration assures a period of time for detecting average current during one distribution cycle. As a result, a control can be satisfactorily performed wherein the tube current is constant.

In other words, the control cycle is A times (natural number) the distribution cycle and the driving is performed A times at the same average frequency, whereby a satisfactory burst dimming can be realized even in a digital driving system using the frequency distribution of the driving pulse. Specific explanation is as follows. The space for the driving circuit can be saved and cost can be reduced because of the digital driving system. Further, frequency resolution required for satisfactory dimming performance and lighting performance can be obtained because of the frequency distribution system. Moreover, brightness flicker seen in a tube current control system can be suppressed because of the burst dimming system. Additionally, there is no electric power loss seen in a system in which a power source is turned on or off and further a shield circuit is unnecessary because of a system in which the driving pulse is turned on or off. As described above, the control cycle is A times the distribution cycle and the burst dimming is performed in which the driving is executed A times at the same average frequency, in particular, whereby the brightness flicker can be prevented by controlling the tube current to be constant with high dimming resolution assured.

A preferable mode in the first means to solve the subjects is that the smoothing process means is configured such that an acquisition range of data to be smoothed is variable in a unit of multiple of the distribution cycle. Reference is made to FIGS. 7 and 8 in the embodiment 1 described later concerning this operation. More specifically, a detection width adjusting means is provided for calculating the data acquisition range based upon the burst pulse from the burst pulse generating means and the control timing pule from the controller. By adjusting the data acquisition range in accordance with the burst pulse width, the greater the dimming level becomes, the more the current detection accuracy enhances.

A preferable mode in the above is that the smoothing process means is configured to perform an averaging process (as an averaging means). The averaging means is preferably used for detecting with high accuracy current flowing through the cold cathode tube that is a load. It is to be noted that it may be replaced with normal filter means so long as a strict brightness precision is especially not required.

In the first means to solve the subjects, the controlling process means comprising the smoothing process means, error voltage calculating means, frequency setting means, frequency dividing means, controller, burst pulse generating means and output enabling means may be achieved by a hardware or a software or a hybrid configuration in combination of the hardware and software. Reference is made to FIG. 20 in the embodiment 1 described later concerning the case where the controlling process means is achieved by a software.

A liquid crystal display device mounted thereto the cold cathode tube driving device having the above-mentioned configuration solves the above-mentioned subjects. The liquid crystal display device includes a liquid crystal panel, a cold cathode tube that is a backlight of the liquid crystal panel and the cold cathode tube driving device having the above-mentioned configuration, wherein the piezoelectric transformer in the cold cathode tube driving device is connected to the cold cathode tube. The driving pulse from the output enabling means in the cold cathode tube driving device having the above-mentioned configuration is supplied to a switching element in the power amplifying means to drive the piezoelectric transformer, to thereby control the dimming level for adjusting the brightness level of an image displayed on the liquid crystal panel.

According to the present invention, the burst dimming can be realized by driving the piezoelectric transformer with a digital driving system using the frequency distribution of the driving pulse in the liquid crystal display device in which the cold cathode tube that is the backlight of the liquid crystal panel is driven by the piezoelectric transformer. Specifically, the frequency resolution required for the necessary dimming can be obtained, whereby the current flowing though the cold cathode tube is stable even in an area where the tube current is relatively small, and hence the dimming level can be made low. As the secondary effect of the digital driving system, reduced cost and saved space can be obtained by the formation of one chip with other LSIs, that contributes to miniaturization of small-sized imaging equipment.

[Second Solving Means]

As a second means to solve the subjects, the present invention provides, as a booster transformer for driving a cold cathode tube that is a load, a cold cathode tube driving device using a piezoelectric transformer in which an output voltage varies in accordance with a frequency of an input voltage, and including a data converting means, a smoothing process means, an error voltage calculating means, a frequency setting means, a frequency dividing means, a controller, a burst pulse generating means, an output enabling means and a power amplifying means, those means being configured by the same manner as those in the first means, wherein the controller controls the control cycle such that the same driving is performed predetermined A×k times (A≧2, k is a variable value in accordance with the distribution cycle) at the average frequency, and further a distribution number adjusting means having the following function is newly added as a component element. Specifically, the distribution number adjusting means sets the values of N and k that determine the distribution cycle in synchronization with the burst pulse width outputted from the burst pulse generating means. By the above-mentioned configuration, the dimming level is controlled to adjust the brightness level of the cold cathode tube.

Compared to the first means, the feature of the second means is that the configuration of the controller is different from that of the first means and the distribution number adjusting means is added. The distribution number adjusting means may be achieved by a hardware or software, or may be achieved by a hybrid configuration of a software and a hardware. The controller in the first means controls the control cycle such that the driving is repeatedly performed given predetermined times A (A≧2) at the same average frequency. On the other hand, the controller in the second means controls the control cycle such that the driving is repeatedly performed given predetermined times A×k at the same average frequency, wherein k is a variable value according to the distribution cycle. Additionally, the distribution number adjusting means is newly added to set the values of N and k that determine the distribution cycle in synchronization with the burst pulse width. Reference is made to FIG. 9 in an embodiment 2 described later concerning the configuration of the second means. Further, reference is made to FIG. 10 concerning that the value k is variable.

A preferable mode in the second means is that the distribution number adjusting means determines the value of k such that the control cycle by the controller is made constant irrespective of the value N (that determines the distribution cycle).

Further, a preferable mode in the second means is that the value A of the controller is adjusted in synchronization with the duty of the burst pulse outputted from the burst pulse generating means.

The operation by the above-mentioned configuration is as follows. In order to correctly detect the average current flowing through the cold cathode tube that is a load, a detection range of a minimum of one distribution cycle is required. In the first means, the burst pulse width is required to be made greater than the distribution cycle width, so that there is a restriction in the lower limit of the dimming level. The second means is accomplished in view of this. Specifically, although the distribution number N (distribution cycle) is changed in accordance with the burst pulse width, the number of times for driving at the same average frequency is simultaneously changed so as not to change the control cycle (i.e., cycle of the burst pulse) even if the distribution cycle is changed. Briefly, N×k is made constant.

For assuring the detection during one distribution cycle, the duty of the burst pulse becomes great when the distribution number is so many, while the small duty is enough when the distribution number is small. On the other hand, the current accuracy is high as the distribution number is great. However, the dimming level of about 50 to 100% used for the image appreciation normally requires the dimming precision. A low brightness means does not require the dimming precision compared to a high brightness means. A low brightness mode is used to reduce power consumption when only a stand-by mode or OSD (on-screen display) is displayed. In the case of the low brightness (in case where the burst pulse width is not more than the predetermined value), the distribution number is made small and the number of times for driving at the same frequency increases so as not to change the burst frequency (see FIG. 10). Hence, changing the distribution number in accordance with the burst pulse width enables to lower the dimming level, thereby being capable of enlarging the dimming range.

A preferable mode in the first means to solve the subjects is that the smoothing process means is configured such that an acquisition range of data to be smoothed is variable in a unit of multiple of the distribution cycle. More specifically, a detection width adjusting means is provided for calculating the data acquisition range based upon the burst pulse from the burst pulse generating means and the control timing pule from the controller (see FIGS. 7 and 8). By adjusting the data acquisition range in accordance with the burst pulse width, the greater the dimming level becomes, the more the current detection accuracy enhances.

A preferable mode in the above is that the smoothing process means is configured to perform an averaging process (as an averaging means). The averaging means is preferably used for detecting with high accuracy current flowing through the cold cathode tube that is a load. It is to be noted that it may be replaced with normal filter means so long as a strict brightness precision is especially not required.

In the second means to solve the subjects, the controlling process means comprising the smoothing process means, error voltage calculating means, frequency setting means, frequency dividing means, controller, burst pulse generating means and output enabling means may be achieved by a hardware or a software or a hybrid configuration in combination of the hardware and software.

A liquid crystal display device mounted thereto the cold cathode tube driving device having the above-mentioned configuration includes a liquid crystal panel, a cold cathode tube that is a backlight of the liquid crystal panel and the cold cathode tube driving device having the above-mentioned configuration, wherein the piezoelectric transformer in the cold cathode tube driving device is connected to the cold cathode tube. The driving pulse from the output enabling means in the cold cathode tube driving device having the above-mentioned configuration is supplied to a switching element in the power amplifying means to drive the piezoelectric transformer, to thereby control the dimming level for adjusting the brightness level of an image displayed on the liquid crystal panel.

According to the present invention, the burst dimming can be realized, like the first means to solve the subjects, by driving the piezoelectric transformer with a digital driving system using the frequency distribution of the driving pulse in the liquid crystal display device in which the cold cathode tube that is the backlight of the liquid crystal panel is driven by the piezoelectric transformer. Specifically, the frequency resolution required for the necessary dimming can be obtained, whereby the current flowing though the cold cathode tube is stable even in an area where the tube current is relatively small, and hence the dimming level can be made low. Additionally, changing the distribution number according to the burst pulse width enables to further lower the dimming level, thereby being capable of enlarging the dimming range.

[Third Solving Means]

As a third means to solve the subjects, the present invention provides, as a booster transformer for driving a cold cathode tube that is a load, a cold cathode tube driving device using a piezoelectric transformer in which an output voltage varies in accordance with a frequency of an input voltage, and including a data converting means, a smoothing process means, an error voltage calculating means, a frequency setting means, a frequency dividing means, a controller, a burst pulse generating means, an output enabling means and a power amplifying means, those means being configured by the same manner as those in the first means, wherein the data converting means detects current flowing through the cold cathode tube and an input voltage of the cold cathode tube and converts the respective current values into digital data. The cold cathode tube driving device further includes, as new structural element, a lighting detecting means, a control cycle switching means and a dimming level switching means, those having the following functions.

Each means may be achieved by a software or a hardware, or a hybrid configuration in combination with a software and hardware.

The lighting detecting means detects lighting from the output from the data converting means and applies a lighting detection pulse that is the detected result to the control cycle switching means and dimming level switching means. The control cycle switching means changes over the number of times A in synchronization with the lighting detection pulse outputted from the lighting detecting means and applies the same to the frequency setting means. The dimming level switching means performs the change-over between the externally applied dimming level and the separately set dimming level in synchronization with the lighting detection pulse outputted from the lighting detecting means, and applies the resultant level to the burst pulse generating means. By this configuration, the dimming level is controlled for adjusting the brightness level of the cold cathode tube.

The features of the third means to solve the subjects compared to the first means are that the configuration of the data converting means is different and the lighting detecting means, control cycle switching means and dimming level switching means are newly added. The data converting means has a function of detecting the input voltage of the cold cathode tube in addition to the function of detecting the current flowing through the cold cathode tube. Moreover, added in the third means are the lighting detecting means for detecting the lighting from the output from the data converting means, control cycle switching means for changing the number of times A in synchronization with the lighting detection pulse outputted from the lighting detecting means and dimming level switching means for performing the change-over between the externally applied dimming level and the separately set dimming level in synchronization with the lighting detection pulse. The controller controls the control cycle such that the same driving is executed predetermined number of times A (A is a natural integer not less than 2) at the same frequency like the first means to solve the subjects. Reference is made to FIG. 13 in an embodiment 3 described later concerning the configuration of the third means. (The smoothing process means is illustrated as the averaging means as its one example.)

A preferable mode in the third means is that the number of times A showing the control cycle set at the control cycle switching means is set such that the number of times A at the starting is smaller than the number of times A at the lighting.

Moreover, a preferable mode in the third means is that the distribution number at the frequency dividing means is changed over in synchronization with the lighting detection pulse outputted from the lighting detecting means, and the distribution cycle at the starting is set smaller than the distribution cycle at the full lighting.

Further, a preferable mode in the third means is that the dimming level switching means outputs a dimming level representing 100% continuous driving when the lighting detection pulse outputted from the lighting detecting means is a value showing the non-lighting state.

The operation of the above configuration is as follows. The dimming level and the burst pulse width are correlated with each other. When the burst pulse is effective, the piezoelectric transformer is driven to apply a voltage to the cold cathode tube. If the dimming level is low and the burst pulse width is narrow, the lighting performance at the starting is unsatisfactory. The third means is accomplished in view of this. The burst pulse width is set somewhat great so as to achieve a somewhat high dimming level at the dimming level switching means by the time when the lighting of the cold cathode tube is realized. For example, the dimming level is set to 100% to achieve a continuous driving. This operation can assure a long time taken to apply a voltage to the cold cathode tube from the piezoelectric transformer. Further, the control cycle is set rather short at the control cycle switching means, whereby the lighting is detected within the burst pulse width at the MIN dimming. Consequently, the variation in the brightness immediately after the lighting is suppressed. When the tube current flows through the cold cathode tube by the completion of the lighting, the lighting detecting means detects the lighting and controls the control cycle switching means and dimming level switching means. The dimming level is promptly shifted to a desired dimming level after the detection of the lighting. By the multiplier effect described above, the lighting performance is satisfactory even if the dimming level is low.

By controlling the distribution number adjusting means based upon the lighting detection pulse from the lighting detecting means to make the distribution number at the starting smaller than the distribution number at the full lighting, an irregular period is made short that is a brightness change at the lighting, to thereby improve a lighting quality and obtain a satisfactory lighting performance.

In the third means to solve the subjects, the controlling process means comprising the smoothing process means, error voltage calculating means, frequency setting means, frequency dividing means, controller, control cycle switching means, dimming level switching means, burst pulse generating means and output enabling means may be achieved by a hardware or a software or a hybrid configuration in combination of the hardware and software.

A liquid crystal display device mounted thereto the cold cathode tube driving device having the above-mentioned configuration includes a liquid crystal panel, a cold cathode tube that is a backlight of the liquid crystal panel and the cold cathode tube driving device having the above-mentioned configuration, wherein the piezoelectric transformer in the cold cathode tube driving device is connected to the cold cathode tube. According to the liquid crystal display device, the lighting performance is satisfactory even if the dimming level of the cold cathode tube that is the backlight of the liquid crystal panel is low.

Required to the piezoelectric transformer for driving the cold cathode tube that is the backlight basically are dimming function, low electric power (high power conversion efficiency) or the like. Further, its source is battery in case where it is used in portable equipment such as a notebook-sized personal computer or a digital video camera. However, a stable source cannot be obtained by the battery source. Accordingly, stable lighting and stable power conversion efficiency within a wide power voltage range are desired considering by paying attention to the battery source.

As a countermeasure, there has conventionally been proposed a method for changing a duty ratio of the driving in accordance with the power supply voltage in an analog driving system. However, in case where this method is performed in a digital driving system, the resolution of the duty ratio is rough when the clock frequency is low, thereby not obtaining a satisfactory performance. Raising the clock frequency can assure the resolution, but it causes increased circuit power or increased radiated interference, thus unpractical. Therefore, it is desired that the duty ratio of the driving pulse can be adjusted in intervals of as small as possible for obtaining a satisfactory performance within a wide power supply voltage range.

Fourth means and the following means to solve the subjects of the invention described later are accomplished in view of the above-mentioned subject, and propose a duty control system in a digital driving system without deteriorating an efficiency for aiming to realize a cold cathode tube driving device coping with a power supply voltage of a wide range.

The present invention concerning a cold cathode tube driving device in which a power supply voltage variation is considered solves the above-mentioned subject by taking the following measures.

[Fourth Solving Means]

The present invention of the fourth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means, a frequency dividing means, a power supply voltage detecting means, a pulse width calculating means and a pulse width adjusting means, each of those means having the following functions. Each means may be achieved by a hardware or a software, or a hybrid configuration in combination of a hardware and a software.

The frequency setting means obtains dividing ratio information as to the driving pulse from the information of the difference, and then applies the obtained information to the frequency dividing means and pulse width calculating means. The frequency dividing means produces a distribution pulse (a driving pulse for distributing a frequency dividing ratio) that is a pulse for distributing a frequency dividing ratio based upon the dividing ratio information from the frequency setting means. The power supply voltage detecting means detects a power supply voltage and applies the information of the power supply voltage to the pulse width calculating means. The pulse width calculating means calculates information of the pulse width of the distribution pulse based upon the power supply voltage information from the power supply voltage detecting means and the dividing ratio information from the frequency setting means and applies the calculated information to the pulse width adjusting means. The pulse width adjusting means produces an extended pulse having a pulse width obtained by extending the pulse width of the distribution pulse based upon the pulse width information from the pulse width calculating means as well as performs a change-over between the distribution pulse and the extended pulse based upon the pulse width information and then outputs the resultant to a driving element of the piezoelectric transformer. Reference is made to FIG. 21 in an embodiment 4 described later concerning this configuration.

The operation of this configuration is as follows. The pulse width calculating means applies the pulse width information according to the detected power supply voltage to the pulse width adjusting means. The pulse width increases in principle as the power supply voltage lowers (see FIG. 24). The pulse width adjusting means produces the extended pulse from the distribution pulse, as well as selects either one of the distribution pulse and the extended pulse based upon the pulse width information, i.e., the detected power supply voltage, and then outputs the selected one to the driving element of the piezoelectric transformer.

The production of the extended pulse from the distribution pulse is digitally executed. A pulse obtained by shifting the timing of the distribution pulse is produced. The pulse having the shifted timing is composed with the initial distribution pulse by taking a logical sum, resulting in producing the extended pulse having a width greater than that of the distribution pulse. The extended pulse has a pulse width extended by a period of the shifted timing. How much to shift the timing is determined based upon the pulse width information corresponding to the detected power supply voltage. Further, which one is selected from the initial distribution pulse and the extended pulse is also determined based upon the pulse width information. By this process, the driving pulse having a pulse width corresponding to the detected power supply voltage can digitally be realized to be produced. The period of shift is set as smaller as possible.

This configuration can provide a driving pulse having an optimum pulse width in a wide power supply voltage range even in a digital driving system. The resolution of the pulse width can be made twice that of the distribution pulse. This leads to reduce a power consumption due to an improvement in efficiency and to prevent a break-down of an FET or piezoelectric transformer because of a surge upon driving the piezoelectric transformer, thereby bringing a great effect.

There are a method by latching at a leading edge of a clock, a method using a delay element and a method of combining these methods in order to produce a pulse having a timing shifted from the distribution pulse.

Examples of a preferable mode in the fourth means are as follows. The pulse width calculating means is configured to output the pulse width information obtained from the power supply voltage information from the power supply voltage detecting means and the dividing ratio information from the frequency setting means as data including decimal means corresponding to one cycle or less of a clock. Further, the pulse width adjusting means is configured to include a pulse width shaping means, a pulse width extending means and a switching means. Specifically, the pulse width shaping means shapes the pulse width of the distribution pulse outputted from the frequency dividing means into a value corresponding to an integer means of the pulse width information. The pulse width extending means converts the output from the pulse width shaping means into the extended pulse having an extended pulse width. One or more pulse width extending means are provided. The switching means performs a change-over between the output from the pulse width extending means and the output from the pulse width shaping means in accordance with the value of the decimal means of the pulse width information and outputs the resultant. Reference is made to FIGS. 25 to 27 in the embodiment 4 described later concerning this configuration.

The operation by this configuration is as follows. The distribution number is defined by the number of the initial distribution pulses existing in one distribution cycle. This distribution number is a natural number. When the pulse width is adjusted only by adjusting the distribution number, all the adjustment that can be made is only by the natural number unit. Specifically, the pulse width next greater than the distribution number N is (N+1), while the pulse width next smaller than the distribution pulse is (N−1). On the other hand, the present measure is to adjust the pulse width at a level of the tenth's place, not by the natural number unit.

The present invention having the above-mentioned configuration can be described as follows by illustrating from another angle of view. The present invention of the fourth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means, a frequency dividing means, a power supply voltage detecting means, a pulse width calculating means, a pulse width shaping means, a pulse width extending means and a switching means, each of those means having the following functions. The frequency setting means obtains dividing ratio information as to the driving pulse from the information of the difference. The frequency dividing means produces a distribution pulse having a dividing ratio of D+1 L times (L>K) during K cycles of the driving pulse with respect to the reference dividing ratio D. The power supply voltage detecting means detects an inputted power supply voltage. The pulse width calculating means outputs the pulse width information obtained from the power supply voltage information from the power supply voltage detecting means and the dividing ratio information from the frequency setting means as data including decimal means corresponding to one cycle or less of a clock. The pulse width shaping means shapes the pulse width of the distribution pulse outputted from the frequency dividing means into a value corresponding to an integer means of the pulse width information. The pulse width extending means converts the output from the pulse width shaping means into the extended pulse having an extended pulse width. One or more pulse width extending means are provided. The switching means performs a change-over between the output from the pulse width extending means and the output from the pulse width shaping means in accordance with the value of the decimal means of the pulse width information and outputs the resultant to a driving element of the piezoelectric transformer. Reference is made to FIG. 28 in the embodiment 4 described later concerning this configuration.

A preferable mode in the above-mentioned configuration is that the pulse width extending means includes a delay fine-adjusting means that converts the output from the pulse width shaping means into an extended pulse having a pulse width extended with the respective delay difference set shorter than one cycle of the clock.

Further, a preferable mode in the above configuration is that the delay fine-adjusting means is configured by a flip-flop that latches at a trailing edge of a clock. In this case, a pulse width resolution with a double precision by using a trailing edge of a clock can be obtained without deviating from a designing technique of a digital LSI.

[Fifth Solving Means]

A fifth means to solve the subjects solves the above-mentioned subject by taking the following measures in a cold cathode tube driving device in which a power supply voltage variation is considered.

The present invention of the fifth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means, a frequency dividing means, a power supply voltage detecting means, a pulse width calculating means and a pulse width adjusting means, each of those means having the following functions. Each means may be achieved by a hardware or a software, or a hybrid configuration in combination of a hardware and a software.

The frequency setting means obtains dividing ratio information as to the driving pulse from the information of the difference, and then applies the obtained information to the frequency dividing means and pulse width calculating means. The frequency dividing means produces a distribution pulse (a driving pulse for distributing a frequency dividing ratio) that is a pulse for distributing a frequency dividing ratio based upon the dividing ratio information from the frequency setting means, and applies the produced pulse to the pulse width adjusting means. The power supply voltage detecting means detects a power supply voltage and applies the information of the power supply voltage to the pulse width calculating means. The pulse width calculating means calculates information of the pulse width of the distribution pulse based upon the power supply voltage information from the power supply voltage detecting means and the dividing ratio information from the frequency setting means and applies the calculated information to the pulse width adjusting means. The pulse width adjusting means produces an extended pulse having a pulse width obtained by extending the pulse width of the distribution pulse by 0.5 cycles, produces a delayed pulse and delayed and extended pulse each having a pulse width obtained by respectively delaying the distribution pulse and extended pulse by 0.5 cycles based upon the pulse width information from the pulse width calculating means, performs a change-over among the distribution pulse, extended pulse, delayed pulse and delayed and extended pulse based upon the pulse width information, and then, outputs the resultant to a driving element of the piezoelectric transformer. Reference is made to FIG. 30 in an embodiment 5 described later concerning this configuration.

The difference from the fourth means lies in the pulse width adjusting means. The pulse width adjusting means in the fifth means produces pulses of three types from the distribution pulse and selects one pulse among pulses of four types in total. Four types are (1) distribution pulse, (2) extended pulse having a pulse width obtained by extending the pulse width of the distribution pulse, (3) delayed pulse obtained by delaying the distribution pulse and (4) delayed and extended pulse obtained by delaying the extended pulse.

By this configuration, even in case where high precision has already been aimed in the frequency dividing ratio of the driving pulse by using the trailing edge of a clock, the cold cathode tube driving device of this embodiment can finely adjust the pulse width of the driving pulse by effectively using the trailing edge of a clock without hindering the effect of this case, to thereby obtain an optimum pulse width in accordance with a power supply voltage. A double resolution, i.e., a resolution having precision four times that of the distribution pulse in total can be obtained compared to the fourth means, whereby a pulse width control with higher precision can be obtained (see FIG. 31). An effect in power consumption and effect for preventing a break-down due to a surge because of the other improvements in efficiency can similarly be obtained.

Examples of a preferable mode in the fifth means are as follows. The pulse width calculating means is configured to output the pulse width information obtained from the power supply voltage information from the power supply voltage detecting means and the dividing ratio information from the frequency setting means as data including decimal means corresponding to one cycle or less of a clock. Further, the pulse width adjusting means is configured to include a pulse width shaping means, a 1-clock-cycle delaying means, a 0.5-clock-cycle delaying means and a switching means. Specifically, the pulse width shaping means shapes the pulse width of the distribution pulse outputted from the frequency dividing means into a value corresponding to an integer means of the pulse width information. The 1-clock-cycle delaying means latches the output from the pulse width shaping means at the leading edge of a clock. The 0.5-clock-cycle delaying means latches the output from the pulse width shaping means at the trailing edge of a clock for producing a delay pulse. An extended pulse is formed by taking a logical sum (first logical sum) of the delay pulse that is the output from the 0.5-clock-cycle delaying means and the distribution pulse that is the output from the pulse width adjusting means, while a delayed and extended pulse is formed by taking a logical sum (second logical sum) of the delay pulse that is the output from the 0.5-clock-cycle delaying means and the extended pulse that is the output from the 1-clock-cycle delaying means.

The switching means outputs each pulse obtained in the following four patterns as a driving pulse to the driving element of the piezoelectric transformer.

(1) When low-order 1-bit value of the A-bit pulse width information is at low level and the dividing ratio is D, it outputs the distribution pulse that is the output from the pulse width shaping means.

(2) When low-order 1-bit value of the A-bit pulse width information is at low level and the dividing ratio is D+1, it outputs the delayed pulse that is the output from the 0.5-clock-cycle delaying means.

(3) When low-order 1-bit value of the A-bit pulse width information is at high level and the dividing ratio is D, it outputs the extended pulse that is the first logical sum.

(4) When low-order 1-bit value of the A-bit pulse width information is at high level and the dividing ratio is D+1, it outputs the delayed and extended pulse that is the second logical sum.

Reference is made to FIGS. 30 and 31 in the embodiment 5 described later concerning this configuration.

The present invention having the above-mentioned configuration can be described as follows by illustrating from another angle of view. The present invention of the fifth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means, a frequency dividing means, a power supply voltage detecting means, a pulse width calculating means, a pulse width shaping means, a 1-clock-cycle delaying means, a 0.5-clock-cycle delaying means, a pulse width extending means and a switching means, each of those means having the following functions. The frequency setting means obtains dividing ratio information as to the driving pulse from the information of the difference. The frequency dividing means produces a distribution pulse having a dividing ratio of D+1 L times (L<K) during K cycles of the driving pulse with respect to the reference dividing ratio D. The power supply voltage detecting means detects an inputted power supply voltage. The pulse width calculating means outputs the pulse width information obtained from the power supply voltage information from the power supply voltage detecting means and the dividing ratio information from the frequency setting means as data including decimal means corresponding to one cycle or less of a clock. The pulse width shaping means shapes the pulse width of the distribution pulse outputted from the frequency dividing means into a value corresponding to an integer means of the pulse width information. The 1-clock-cycle delaying means latches the output from the pulse width shaping means at the leading edge of a clock. The 0.5-clock-cycle delaying means latches the output from the pulse width shaping means at the trailing edge of a clock. The switching means is configured to have the following functions.

(1) When low-order 1-bit value of the A-bit pulse width information is at low level and the dividing ratio is D, it outputs the output from the pulse width shaping means to the driving element of the piezoelectric transformer.

(2) When low-order 1-bit value of the A-bit pulse width information is at low level and the dividing ratio is D+1, it outputs the output from the 0.5-clock-cycle delaying means to the driving element.

(3) When low-order 1-bit value of the A-bit pulse width information is at high level and the dividing ratio is D, it outputs the logical sum of the output from the 0.5-clock-cycle delaying means and the output from the pulse width adjusting means to the driving element.

(4) When low-order 1-bit value of the A-bit pulse width information is at high level and the dividing ratio is D+1, it outputs the logical sum of the output from the 0.5-clock-cycle delaying means and the output from the 1-clock-cycle delaying means to the driving element.

The switching means is configured as described above.

[Sixth Solving Means]

Sixth means to solve the subjects solves the above-mentioned subject by taking the following measures in a cold cathode tube driving device in which a power supply voltage variation is considered.

The present invention of the sixth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means, a frequency dividing means, a power supply voltage detecting means, a pulse width calculating means, a pulse width distributing means and a pulse width adjusting means, each of those means having the following functions. Each means may be achieved by a hardware or a software, or a hybrid configuration in combination of a hardware and a software.

The frequency setting means obtains dividing ratio information as to the driving pulse from the information of the difference, and then applies the obtained information to the frequency dividing means and pulse width calculating means. The frequency dividing means produces a distribution pulse (a driving pulse for distributing a frequency dividing ratio) that is a pulse for distributing a frequency dividing ratio based upon the dividing ratio information from the frequency setting means, and applies the produced pulse to the pulse width adjusting means. The power supply voltage detecting means detects a power supply voltage and applies the information of the power supply voltage to the pulse width calculating means. The pulse width calculating means calculates information of the pulse width of the distribution pulse based upon the power supply voltage information from the power supply voltage detecting means and the dividing ratio information from the frequency setting means and applies the calculated information to the pulse width distributing means. The pulse width distributing means inputs the pulse width information from the pulse width calculating means, increases the pulse width information at a predetermined timing and then outputs the resultant to the pulse width calculating means. The pulse width adjusting means adjusts the pulse width of the distribution pulse from the frequency dividing means according to the output from the pulse width distributing means and outputs the resultant to the driving element of the piezoelectric transformer. Reference is made to FIG. 33 in an embodiment 6 described later concerning this configuration.

The sixth means provides a system in which the pulse width is distributed at a predetermined cycle for obtaining a resolution of a pulse duty at an average pulse width in a driving pulse during a predetermined cycle, to thereby be capable of obtaining a pulse width adjustment with highly enhanced resolution compared to the fourth means and fifth means described above. This system enables to perform a smooth duty control with respect to a power supply voltage, thereby improving a driving efficiency of the piezoelectric transformer. This greatly contributes to power reduction at a backlight means. Further, this system can be used in synchronization with the distribution in the frequency dividing ratio, thereby not ruining the conventional effect. Additionally, it can be used with the above-mentioned fourth means and fifth means. The combination of these systems is very effective for improving efficiency.

A preferable mode in the sixth means to solve the subjects is that the pulse width calculating means is configured to output the pulse width information as A-bit data based upon the power supply voltage information and the dividing ratio information obtained at the frequency dividing means, and that the pulse width distributing means is configured to output data obtained by adding 1 to the high-order (A-n)-bit data of the A-bit pulse width information during nth root of 2 of the distribution pulse the times represented by the low-order n-bit of the A-bit pulse width information.

The present invention of the sixth means having the above-mentioned configuration can be described as follows by illustrating from another angle of view. The present invention of the sixth means to solve the subjects provides a cold cathode tube driving device that generates a driving pulse obtained by dividing a clock of a predetermined frequency in accordance with a frequency dividing ratio corresponding to a difference between an electric amount in a cold cathode tube that is a load of a piezoelectric transformer and a reference electric amount, and then outputs the generated pulse to the piezoelectric transformer, this device including a frequency setting means for obtaining dividing ratio information as to the driving pulse from the information of the difference, a frequency dividing means that produces a distribution pulse having a dividing ratio of D+1 L times (L<K) during K cycles of the driving pulse with respect to the reference dividing ratio D, a power supply voltage detecting means that detects an inputted power supply voltage, a pulse width calculating means that outputs the pulse width information as A-bit data based upon the power supply voltage information and the dividing ratio information obtained at the frequency dividing means, and a pulse width distributing means that outputs data obtained by adding 1 to the high-order (A-n)-bit data of the A-bit pulse width information during nth root of 2 of the distribution pulse the times represented by the low-order n-bit of the A-bit pulse width information.

A preferable mode in the above includes the following configuration. Specifically, the pulse width distributing means is configured to distribute a distribution pulse such that the duty ratio of the pulse width of the distribution pulse becomes approximately constant, and the frequency dividing means is configured to include a frequency dividing means that divides a clock having a predetermined frequency with the dividing ratio D illustrated by high-order (M-n)-bit data of the M-bit dividing ratio information in order to make the duty ratio of the pulse width of the distribution pulse approximately constant and a dividing ratio distributing means that outputs 1 during nth root of 2 of the distribution pulse the times represented by the low-order n-bit of the M-bit dividing ratio information to make the dividing ratio of the frequency dividing means D+1, wherein the pulse width distributing means is configured to add 1 to the high-order (A-n)-bit data of the A-bit pulse width information when the output from the dividing ratio distributing means is 1. Reference is made to an adder 110 in FIG. 33 concerning this configuration.

The following configuration is preferable in either of the above-mentioned means to solve the subjects.

Specifically, the cold cathode tube driving device may also include, in front of the frequency setting means, a current detecting means for detecting a current flowing through the cold cathode tube that is a load of the piezoelectric transformer, a rectifying means that converts a sinusoidal voltage obtained from the current detecting means into an approximately DC voltage, an A/D converter that converts the rectified voltage signal into a digital signal, a smoothing process means for smoothing the output data from the A/D converter and an error voltage calculating means that multiplies difference data between the externally applied reference data and the output data from the smoothing process means by a constant and outputs the resultant to the frequency setting means as error data.

BEST MODES FOR CARRYING OUT THE INVENTION

A specific embodiment of a liquid crystal display device according to the invention will be explained below in detail with reference to the drawings.

Figure 1:
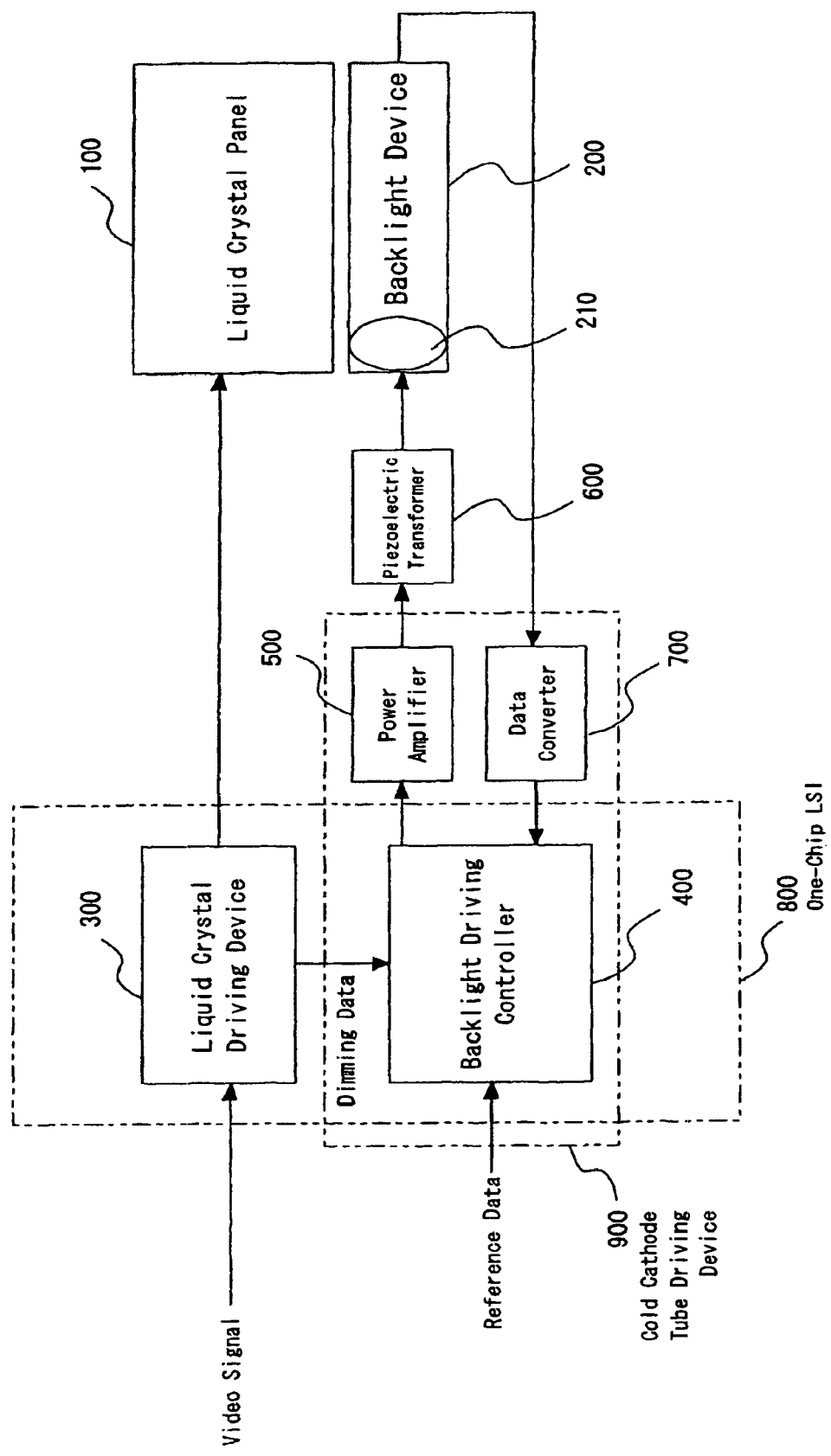
FIG. 1 is a block diagram schematically showing a configuration of a liquid crystal display device in an embodiment of the present invention.

FIG. 1 is a block diagram showing a schematic configuration of the liquid crystal display device having mounted thereto a cold cathode tube driving device. In FIG. 1, numeral 100 denotes a liquid crystal panel displaying an image, 200 a backlight device (including a cold cathode tube 210) with respect to the liquid crystal panel 100, 300 a liquid crystal driving device that converts an inputted imaging signal into a liquid crystal driving signal and outputs dimming data for controlling a brightness of the backlight device 200 in synchronization with the imaging signal, 400 a backlight driving controller for driving the backlight 400 and controlling the dimming (hereinafter referred to as a driving controller), 500 a power amplifier for power-amplifying a driving pulse outputted from the driving controller 400, 600 a piezoelectric transformer that drives the cold cathode tube 210 in the backlight device 200 based upon the driving pulse from the power amplifier 500, 700 a data converter that electrically detects the driving state of the cold cathode tube 210 in the backlight device 700 and converts the detected result into digital data to be fed back to the driving controller 400, 800 a one-chip LSI obtained by integrating the liquid crystal driving device 300 with the driving controller 400 and 900 a cold cathode tube driving device comprising the driving controller 400, power amplifier 500 and data converter 700. The present invention is structured such that the driving controller 400 is realized in a digital form for making the one-chip LSI incorporating the liquid crystal driving device 300 and the driving controller 400, thereby enabling a backlight dimming in synchronization with the image and realizing reduced cost and saved space.

Some preferable embodiments of the invention will specifically be explained hereinafter. For the sake of convenience, the following explanation is made such that the case where power supply voltage variation does not have to be considered is marked by (A) and the case where power supply voltage variation is considered is marked by (B). The case (A) includes embodiments 1 to 3, while the case (B) includes embodiments 4 to 6.

(A) Cold Cathode Tube Driving Device/Liquid Crystal Display Device wherein Power Supply Voltage Variation is not Considered

Embodiment 1

Figure 2:
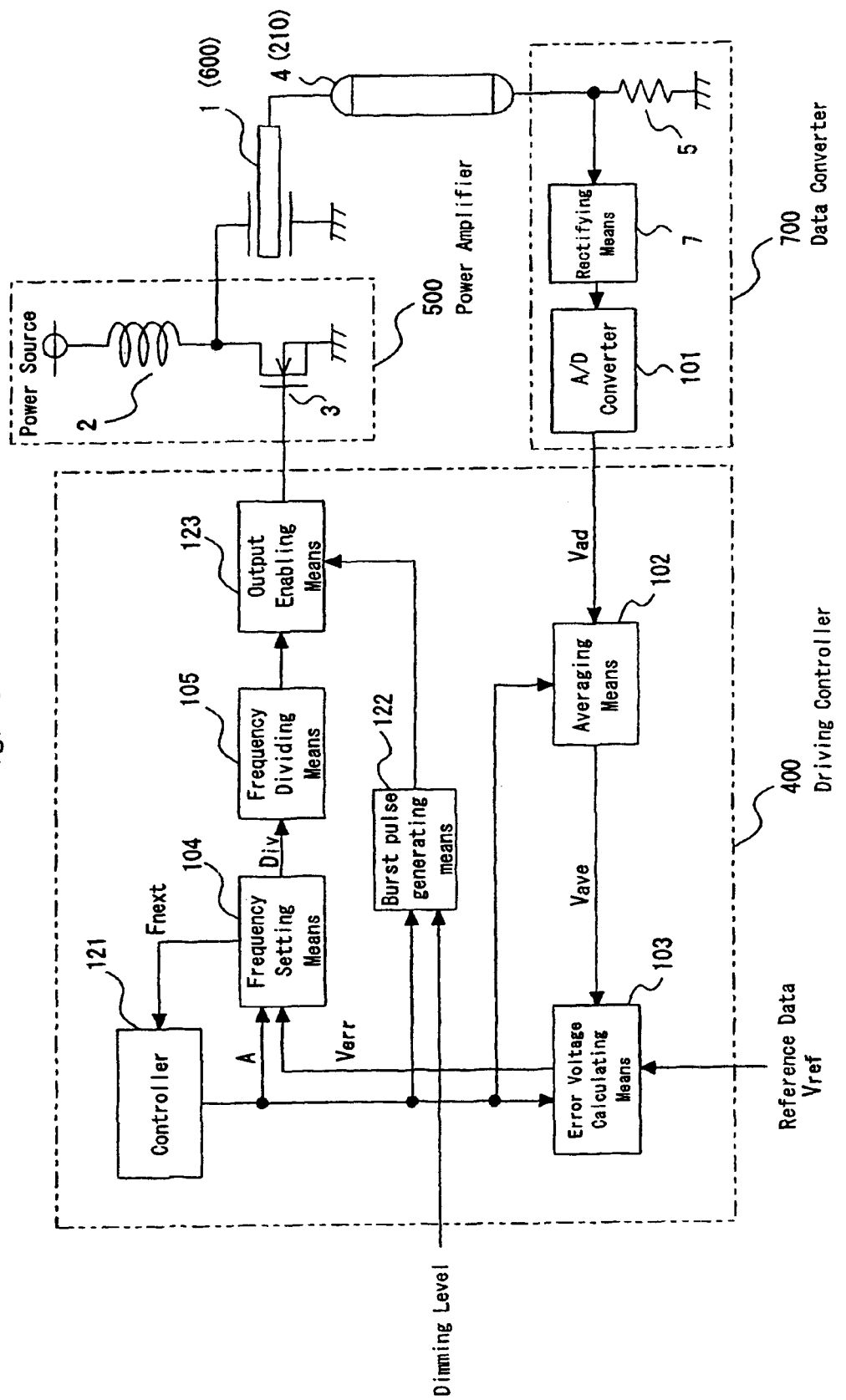
FIG. 2 is a block diagram showing a cold cathode tube driving device according to an embodiment 1 of the invention.

FIG. 2 is a block diagram showing a configuration of the cold cathode tube driving device 900 in the liquid crystal display device according to the embodiment 1 of the invention. In FIG. 2, numeral 1 denotes a piezoelectric transformer (corresponding to the piezoelectric transformer 600 in FIG. 1), 2 a coil, 3 a switching transistor (FET), 4 a cold cathode tube (corresponding to the cold cathode tube 210), 5 a current detector that detects current flowing through the cold cathode tube 4 and converts the detected result into a voltage signal, 7 a rectifying means (e.g., a peak detector circuit) that rectifies a sinusoidal voltage signal taken out from the current detector 5 and converts the resultant into DC voltage and 101 an A/D converter that converts the voltage outputted from the rectifying means 7 into a digital signal. Although the current detector 5 is typically represented by a mark of a resistance in the figure, it is not limited to the resistance. The A/D converter 101 has a sufficient number of bits in order to obtain a voltage detection accuracy and its sampling clock has a frequency sufficient for assuring a response speed required for the control. An output digital signal from the A/D converter 101 is represented by Vad. Numeral 102 denotes an averaging means (preferable example of smoothing process means) that performs an averaging process to a detection voltage Vad outputted from the A/D converter 101 within a predetermined sample number N (described later). The output digital signal from the averaging means 102 is represented by Vave hereinafter. Numeral 103 denotes an error voltage calculating means that compares the output signal Vave from the averaging means 102 with externally set reference data Vref, calculates the difference between them and outputs the resultant as error data Verr. Numeral 104 denotes a frequency setting means for setting a frequency of a driving pulse of the piezoelectric transformer 1. This frequency setting means 104 adds or subtracts the frequency corresponding to the error data Verr to or from the previous frequency setting value Fprev, and outputs M-bit data Fnext. This data Fnext means a frequency dividing ratio for the N cycle of the driving pulse. Specifically, the value of Fnext/N becomes an average frequency dividing ratio Div of the driving pulse for N cycle. Numeral 121 denotes a controller for generating a control timing pulse at a predetermined period based upon the frequency data Fnext outputted from the frequency setting means 104. This control period is set to the period A (A: natural integer) times the N cycle of the driving pulse. A burst frequency has a period equal to that of the timing pulse outputted from the controller 121. Numeral 105 denotes a frequency dividing means that distributes the frequency dividing ratio such that the average frequency dividing ratio Div of the driving pulse for N cycle becomes Fnext/N to divide a clock. A driving pulse to the piezoelectric transformer 1 is produced by the frequency dividing means 105. The cycle comprising the driving pulse for N cycle is a distribution cycle. Numeral 122 denotes a burst pulse generating means that outputs a pulse (hereinafter referred to as a burst pulse) having a duty ratio corresponding to a dimming level included in the dimming data applied from an external means (the liquid crystal driving device 300 in FIG. 1) based upon the control cycle pulse obtained at the controller 121. This burst pulse is set such that "H" level period is not shorter than the distribution cycle. Numeral 123 denotes an output enabling means that switches over the enabling and disabling of the output of the driving pulse obtained at the frequency dividing means 105. It is configured to be disabled to stop the driving when the value of the burst pulse is "L" level. The sampling number at the averaging means 102 is set to be equal to the sampling number during the period of the distribution cycle.

The corresponding relationship between FIG. 1 and FIG. 2 is as follows. The coil 2 and the FET 3 constitute the power amplifier 500 that power-amplifies the driving pulse outputted from the output enabling means 123 and outputs the resultant to the piezoelectric transformer 1. The current detector 5, rectifying means 7 and A/D converter 101 constitute the data converter that converts the current flowing through the cold cathode tube 4 into digital data. The averaging means 102, error voltage calculating means 103, frequency setting means 104, controller 121, frequency dividing means 105, burst pulse generating means 122 and output enabling means 123 constitute the driving controller 400 that is made by a digital circuit. This driving controller 400 produces a driving pulse that is to be applied to the piezoelectric transformer 1 based upon the current information in the cold cathode tube 4 outputted from the data converter 700 and the externally inputted dimming level and the reference data, to thereby control the luminous amount of the cold cathode tube 4.

Subsequently explained is the operation of the cold cathode tube driving device 900 in the liquid crystal display device having the above-mentioned configuration. Firstly, the entire driving concept will be explained.

The first feature of the present embodiment is that the control cycle is A (A: natural integer) times N cycle of the driving pulse (the distribution cycle) for driving A times at the same average frequency, and the burst pulse width is set such that its "H" level period is not shorter than the distribution cycle. The second feature is that the sampling number N of the averaging means 102 is set to be equal to the sampling number during the period of the distribution cycle. What is meant by these two features will be explained with reference to FIG. 3.

Figure 3:
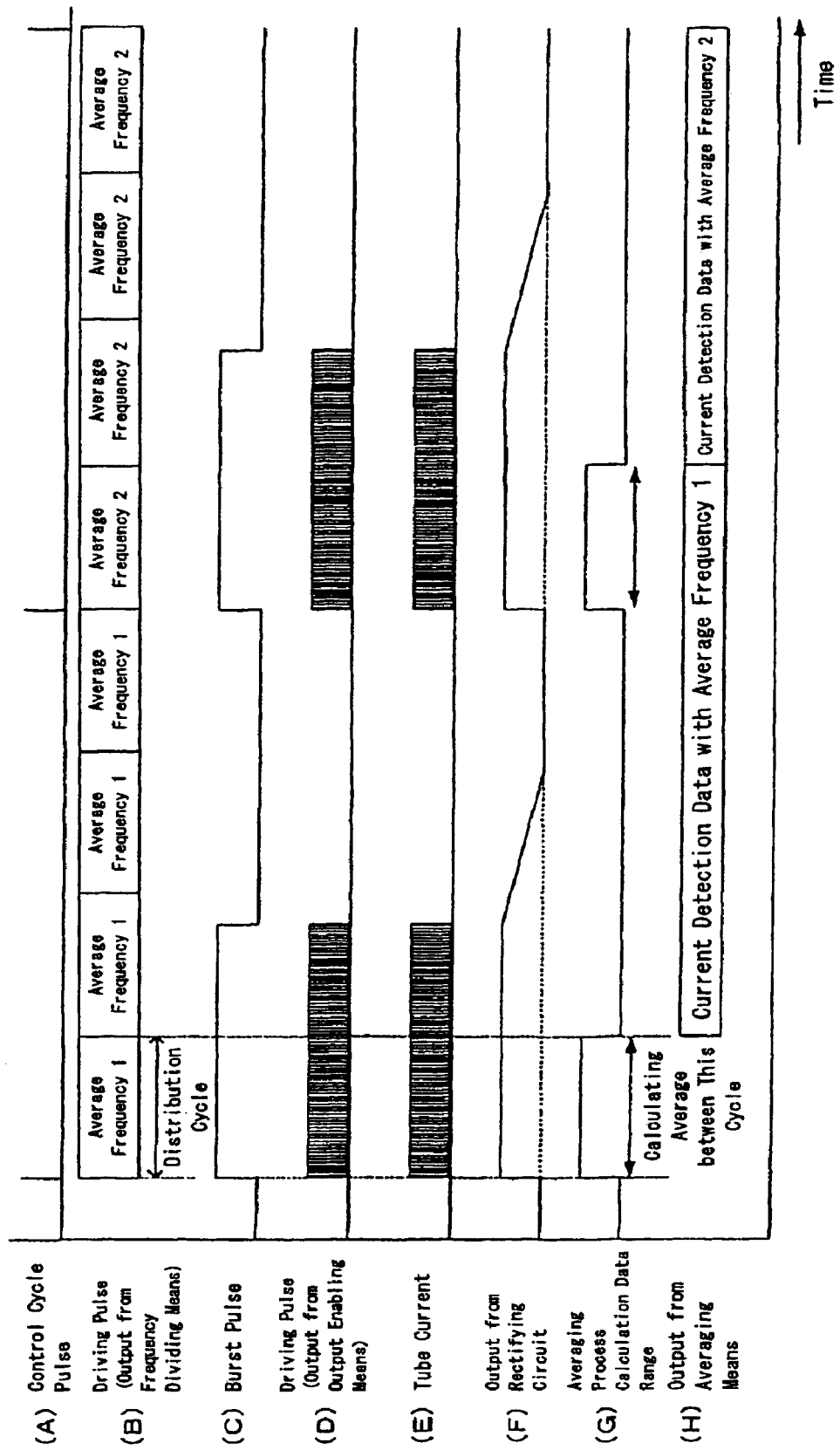
FIG. 3 is a timing chart for explaining an operation of the cold cathode tube driving device according to the embodiment 1.

FIG. 3 is a timing chart for explaining an operational concept of the embodiment 1. FIG. 3(A) shows the control cycle pulse outputted from the controller 121, FIG. 3(B) shows the driving pulse (substantially shown in FIG. 4(C)) outputted from the frequency dividing means 105, FIG. 3(C) shows the burst pulse (by which the on-duty is determined during the control cycle) outputted from the burst pulse generating means 122, FIG. 3(D) shows the driving pulse outputted from the output enabling means 123, FIG. 3(E) shows the tube current flowing through the cold cathode tube 4, FIG. 3(F) shows the current detection signal outputted from the rectifying means 7, FIG. 3(G) shows the data range in which the averaging process is performed at the averaging means 102 and FIG. 3(H) shows the output data Vave from the averaging means 102. For the sake of convenience, the value of A is set to 4. Specifically, there are four repeated patterns with the same average frequency 1 (or average frequency 2) shown in FIG. 3(B) during one control cycle represented by the control cycle pulse shown in FIG. 3(A).

The frequency dividing means 105 gets high-precise frequency resolution at the average frequency for the driving pulse N cycle. Therefore, the piezoelectric transformer 1 is driven with the driving pulse obtained at the frequency dividing means 105. Hence, in case where the current flowing through the cold cathode tube 4 is detected, the detection has to be made per this distribution cycle unit.

On the other hand, control is performed to make the current during ON-period constant upon the burst driving. When the control is executed per one distribution cycle unit, the burst pulse width (ON-period) becomes shorter than the distribution cycle, so that the current during the ON-period cannot be controlled to be constant. Therefore, as shown in FIG. 3(A), driving is performed plural times (plural distribution cycles) at the same average frequency and the burst pulse width (ON-period) is set so as not to be shorter than one distribution cycle, to thereby assure a period for detecting average current during one distribution cycle. Consequently, in the current detection, the system of the present invention does not detect current during "H"-level period (ON-period) of the burst pulse like the system disclosed in the document 2, but detects the current only during "H"-level period of the burst pulse as well as during the first distribution cycle period (the first cycle of four distribution cycles) as shown in FIG. 3(G).

The features of the present embodiment were explained above. An actual control flow of the cold cathode tube driving device shown in FIG. 1 will be explained below by using specific numerical examples.

Figure 4:
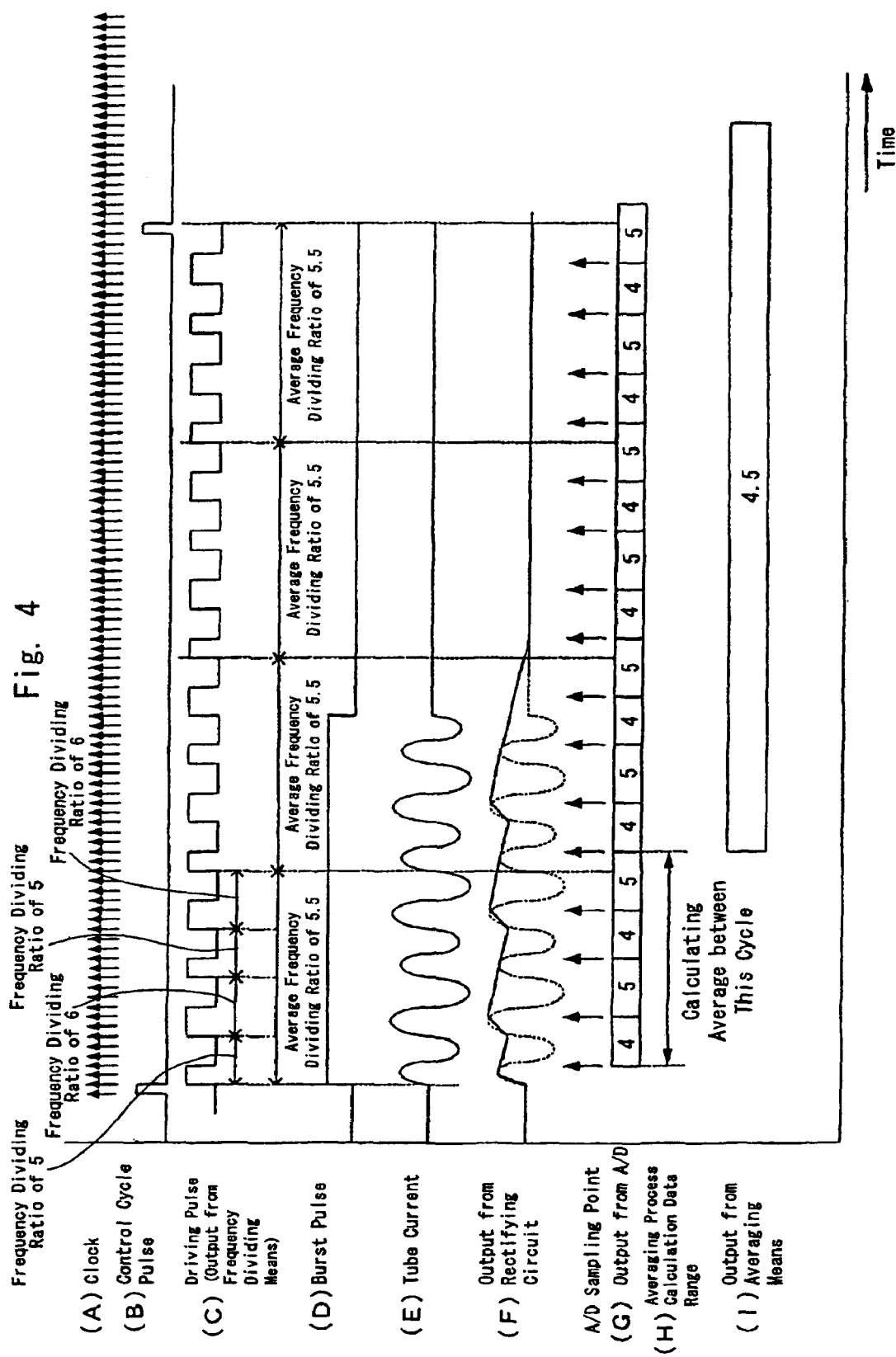
FIG. 4 is a timing chart showing a specific operation of the cold cathode tube driving device according to the embodiment 1.

In order to simplify the explanation, the distribution cycle is set to 4 (N=4) and the control cycle is A times (A 4) the distribution cycle. Further, the resolution of the A/D converter is set to 3-bit and the aimed tube current value is 6.5 obtained by the conversion of the digital data outputted from the A/D converter 101. Decimal fraction data is not outputted from the A/D converter 101. However, in case where it is considered as the average data during the distribution cycle, decimal fraction exists. Specifically, 11010 (=6.5 wherein upper 3-bit is an integer means 6, while lower 2-bit 10 is a decimal fraction means) is applied as the externally applied reference data Vref. In case where the average frequency dividing ratio is 5.5 in order to generate the driving pulse, the frequency data Fnext outputted from the frequency setting means 104 is 10110. In this data, the high-order 3-bit represents the integer means and low-order 2-bit represents the decimal fraction means. Since the distribution cycle N is set to 4, the decimal fraction means is 2-bit. By this, the driving pulse shown in FIG. 4(C) is outputted from the frequency dividing means 105. In FIG. 4(C), driving pulses of four cycles are illustrated in one distribution cycle, that is the distribution cycle N. Although there are various methods for distributing the frequency dividing ratio, no limitation is set here.

FIG. 4(E) shows the tube current waveform when the burst pulse is applied. As shown in FIG. 4(E), the current value becomes a value corresponding to the frequency of the driving pulse. FIG. 4(F) shows an output waveform obtained at the rectifying means 7 with the peak detection after detecting the tube current by the current detector 5. In this example, the A/D output data during the distribution cycle is obtained such as "4", "5", "4", "5" as shown in FIG. 4(G). The averaging means 102 averages the data of the first distribution cycle ((4+5+4+5)/4=4.5), and then outputs the resultant data of 4.5. The error voltage calculating means 103 compares the average value 4.5 with the externally applied reference data (=6.5), and then outputs 2.0 (=6.5−4.5) that is the difference data. Subsequently, at the frequency setting means 104, the output data (=2.0) from the error voltage calculating means 103 is added to the previous frequency setting value (=6.5) for outputting the next frequency setting data 8.5. This control is then repeated until the tube current becomes equal to the externally applied reference data Vref, whereby the average current can be held constant during ON-period.

Figure 5:
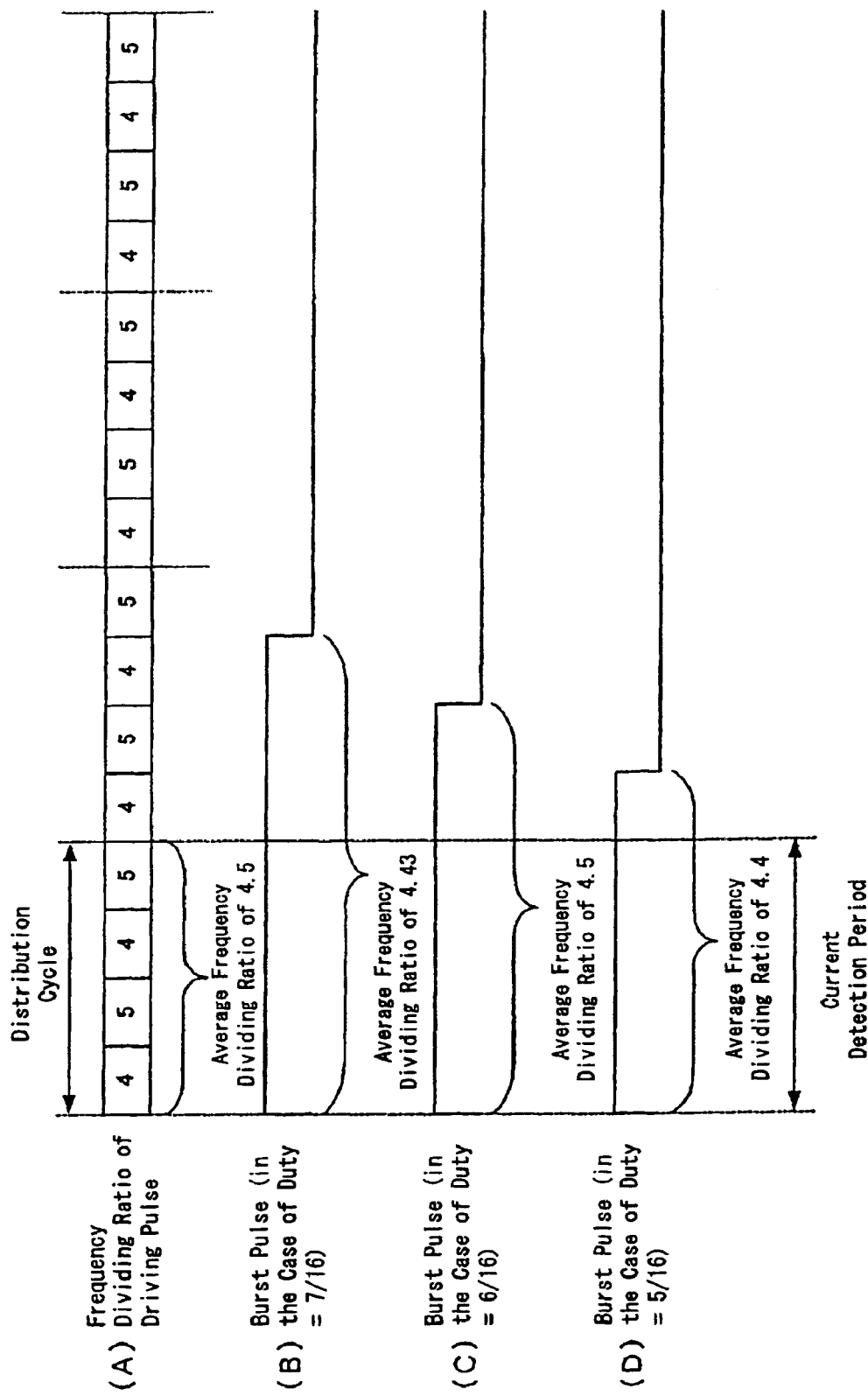
FIG. 5 is a view for explaining current detection characteristic in the cold cathode tube driving device according to the embodiment 1.

Here, the average current upon ON-period changes depending strictly upon the burst pulse width, that will be explained with reference to FIG. 5. FIG. 5(A) shows a distribution example of the frequency dividing ratio. The current according to the frequency dividing ratio flows through the cold cathode tube 4. The current detection period in this example is only the first distribution cycle as shown in FIG. 5, and the average frequency dividing ratio during this cycle is 4.5.

In case where the burst pulse has a pulse width shown in FIG. 5(B), the average frequency dividing ratio during this cycle becomes 4.43 (=31/7). In the case of the pulse width shown in FIG. 5(C), its average frequency dividing ratio becomes 4.5 (=27/6), while in the case of the pulse width shown in FIG. 5(D), its average frequency dividing ratio becomes 4.4 (=22/5). In this way, the average current value and the detected current value are actually different. The narrower the burst pulse width becomes, the greater the difference becomes.

However, the brightness is greatly influenced by the dimming precision due to the burst pulse width. In the example in FIG. 5, the differences in the brightness level due to the burst pulse width are respectively 1/16=6.75%, while the influence due to the error by the current detection is (4.5−4.43/4.5)=1.5% in the case of (B), 0% in the case of (C), and only (4.5−4.4)/4.5=2.2% in the case of (D). Further, the frequency dividing ratio is actually far greater than 4 or 5. In case where a pulse of 100 KHz is produced with a clock of 10 MHz, for example, a clock is required to be divided by 100. This is suggested in FIG. 3(D) in which driving pulses are illustrated in greater detail. Moreover, the frequency dividing ratio is far greater than 4 (e.g., 256 distributions). Therefore, the error by the detection becomes a level that can nearly be ignored.

As described above, in the present embodiment, the control cycle is A times (A: natural integer) N cycle of the driving pulse (distribution cycle) for driving A times at the same average frequency, and the sampling number N at the averaging means 102 becomes equal to the sampling number during the distribution cycle. Therefore, the burst dimming can be realized in the digital driving system using the frequency distribution of the driving pulse. Consequently, the present invention can provide a cold cathode tube driving device using a digital system that is advantageous in reducing cost and saving space because of one-chip formation with the other LSIs, to thereby bring a great effect to a further miniaturization of a small-sized imaging equipment.

Figure 6:
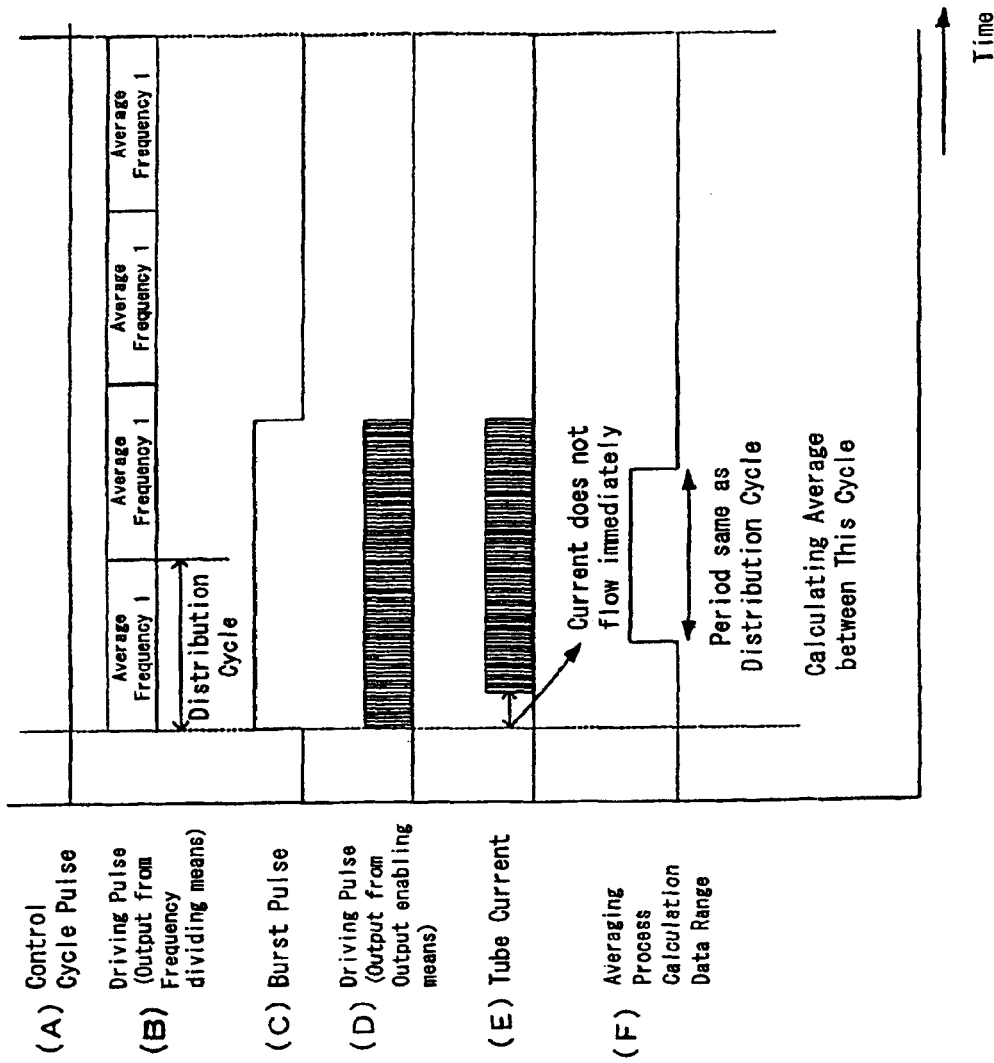
FIG. 6 is a timing chart for explaining a current detection position in the cold cathode tube driving device according to the embodiment 1.

Although the current detection period is set to the first distribution cycle in this embodiment, the current detection period is not limited to this cycle. This is because the cold cathode tube 4 does not always start lighting immediately after the voltage is applied thereto. Specifically, some delay occurs upon starting the lighting. Upon the burst driving, the tube current starts to flow after a short time after the shift from OFF to ON as shown in FIG. 6(E). Therefore, if the current detection period is set to the first distribution cycle, accurate average current cannot be detected, thus disadvantageous. In view of this, the detected position may be shifted without changing the detected width considering the delay time occurred from restarting the driving to the lighting as shown in FIG. 6(F).

Figure 7:
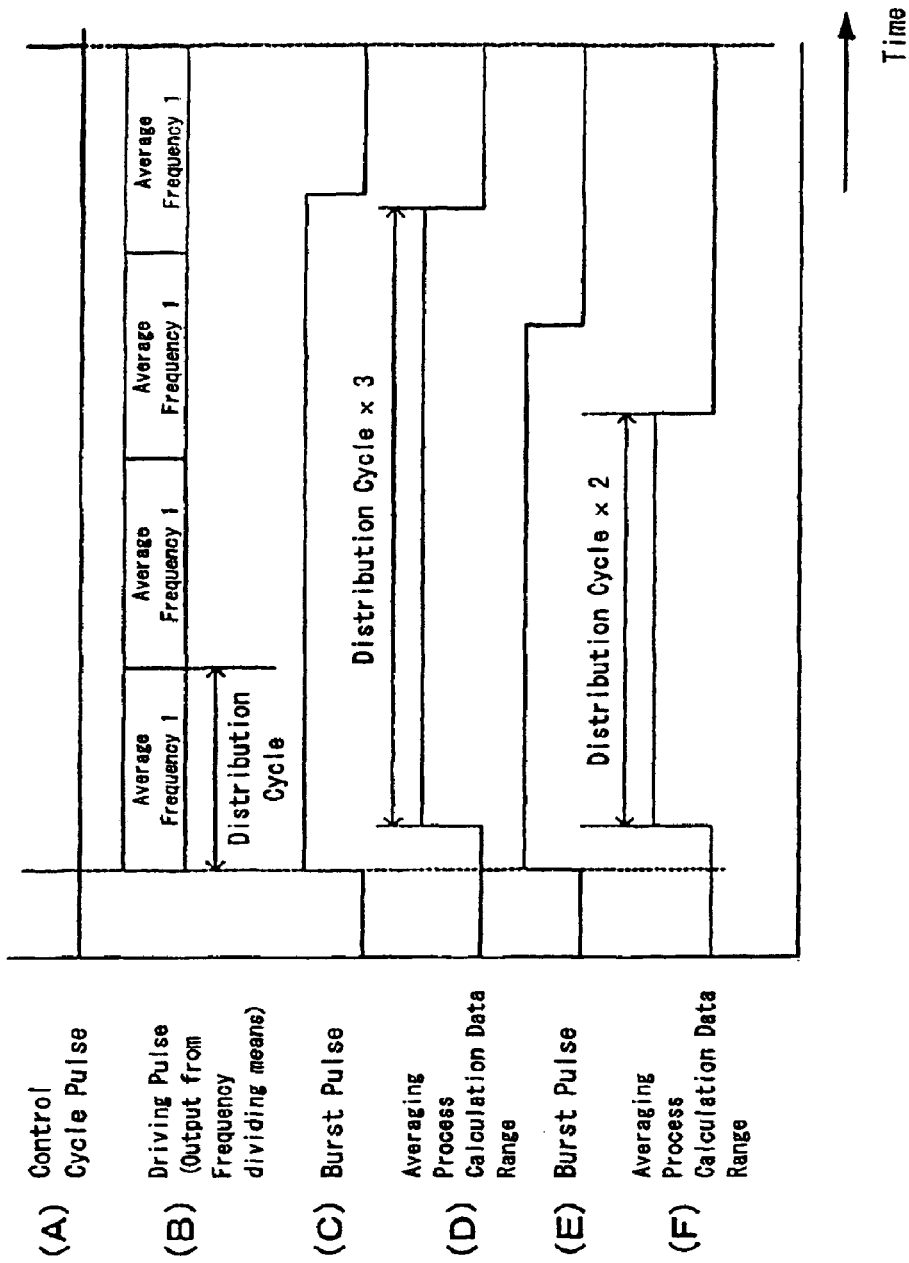
FIG. 7 is a timing waveform for explaining other averaging process in the cold cathode tube driving device according to the embodiment 1.

Further, this current detection period is not necessarily set to one distribution cycle. The current detection period may be varied to have a width of the double of the distribution cycle or a width of the triple of the distribution cycle or the like in accordance with the burst pulse width as shown in FIG. 7. A block diagram of this case is shown in FIG. 8.

Figure 8:
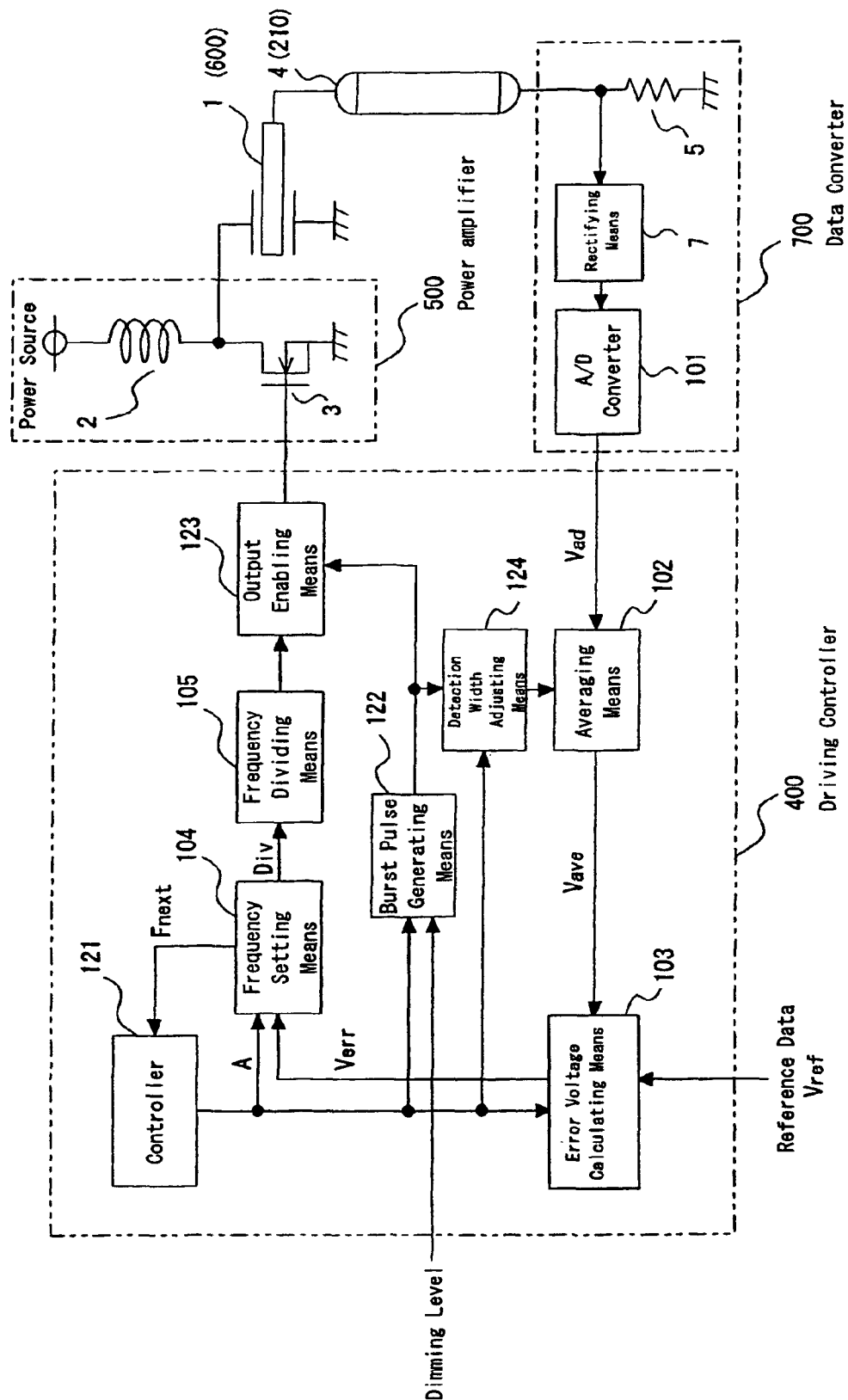
FIG. 8 is a block diagram showing a cold cathode tube driving device according to a modified mode of the embodiment 1.

In FIG. 8, numeral 124 denotes a detection width adjusting means that calculates a detection range from the burst pulse from the burst pulse generating means 122 and the control timing pulse from the controller 121 for adjusting the detection range in accordance with the burst pulse width. In this case, the greater the dimming level becomes, the more the current detection accuracy enhances.

Although the present embodiment utilizes the averaging means to detect the average current flowing through the cold cathode tube 4 during one distribution cycle, a normal filter can be replaced with the averaging means in case where a strict brightness precision is not required. The averaging means or filter means can collectively be referred to as smoothing process means. They are referred to as smoothing process means in claims of the invention.

Further, each element constituting the driving controller 400 such as the averaging means 102, error voltage calculating means 103, controller 121, frequency setting means 104, burst pulse generating means 122, frequency dividing means 105, output enabling means 123 and detection width adjusting means 124 may be achieved by a hardware or software or by a hybrid structure in combination with a hardware and software.

Embodiment 2

Subsequently explained is a cold cathode tube driving device according to the embodiment 2 of the invention. In order to correctly detect the average current flowing through the cold cathode tube 4, the detection range for a minimum of one distribution cycle is required. In the embodiment 1, the burst pulse width is required to be greater than the distribution cycle and there is a restriction for the lower limit of the dimming level. The embodiment 2 solves this subject.

Figure 9:
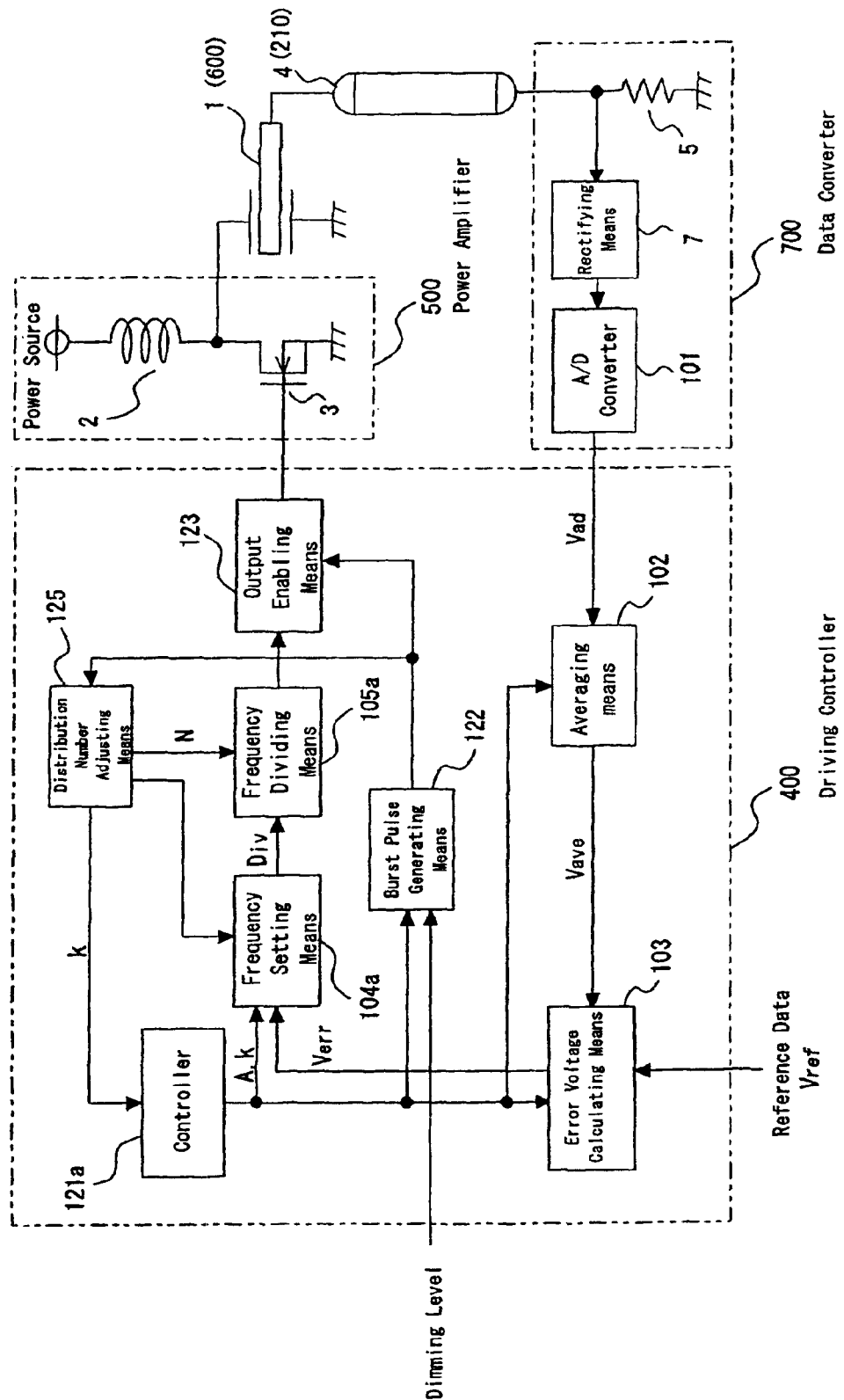
FIG. 9 is a block diagram showing a cold cathode tube driving device according to an embodiment 2 of the invention.

FIG. 9 is a block diagram showing a configuration of a cold cathode tube driving device according to the embodiment 2. Numeral 104a denotes a frequency setting means for setting a frequency of a driving pulse of the piezoelectric transformer 1. This frequency setting means 104a adds or subtracts the frequency corresponding to the error data Verr to or from the previous frequency setting value Fprev, and outputs M-bit data Fnext. The different point from the frequency setting means 104 explained in the embodiment 1 shown in FIG. 2 is that, among the M-bit data showing the frequency dividing ratio including the decimal fraction, the effective bit number in the decimal fraction means is variable in the embodiment 2 while it is fixed in the embodiment 1. The method for varying the effective bit number in the decimal fraction means will be made apparent later. Numeral 121a denotes a controller for generating a control timing pulse at a predetermined period based upon the frequency data Fnext outputted from the frequency setting means 104a. This control period is set to the period A×k times (A is a natural integer, and k is a value varying in accordance with the distribution cycle) the N cycle of the driving pulse.

Numeral 105a denotes a frequency dividing means that distributes the frequency dividing ratio such that the average frequency dividing ratio Div of the driving pulse for N cycle becomes Fnext/N to divide a clock. The driving pulse of the piezoelectric transformer 1 is produced by the frequency dividing means. The different point from the frequency dividing means 104a in the embodiment 1 shown in FIG. 2 is that the value N determining the distribution cycle can be set from outside of the frequency dividing means. Numeral 125 denotes a distribution number adjusting means that determines the distribution number from the burst pulse width outputted from the burst pulse generating means 122 and then outputs the distribution number N to the frequency dividing means 105a as well as outputs a change-over signal to the frequency setting means 104a. Further, it sets a value of k to the controller 121a. The value of k is determined such that the value (k×N) is made constant so as not to change the control frequency even if the distribution number N changes. The other configurations are the same as those in the embodiment 1 shown in FIG. 2, so that the explanation thereof is omitted here.

Subsequently, the features of the cold cathode tube driving device having the above-mentioned configuration will be explained below. The feature of the present embodiment is that the distribution number N varies (i.e., the distribution cycle varies) in accordance with the burst pulse width, and the number of driving at the same average frequency is simultaneously changed so as not to change the control cycle (i.e., burst pulse cycle) even if the distribution cycle changes.

Figure 10:
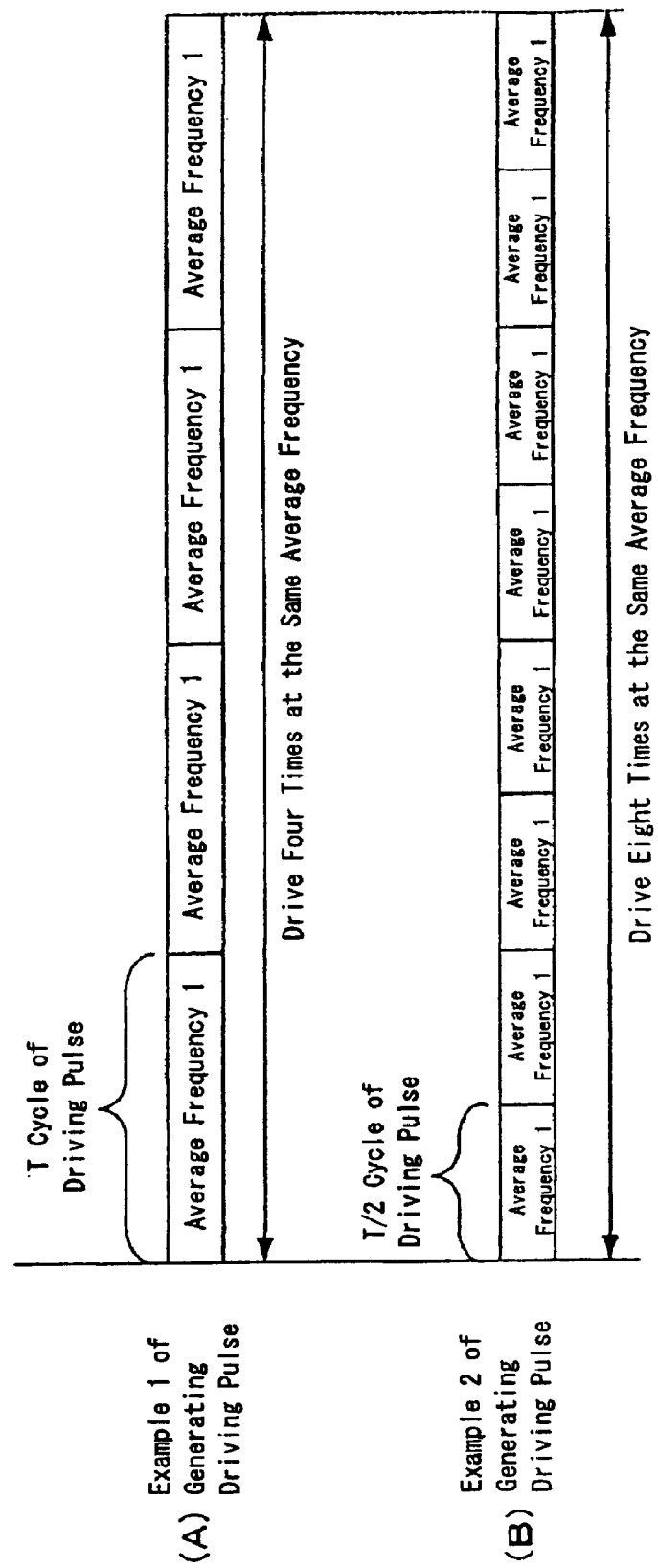
FIG. 10 is a timing chart for explaining an operational concept of the cold cathode tube driving device according to the embodiment 2.

This state is shown in FIG. 10. FIG. 10(A) shows that the frequency dividing ratio is distributed so as to obtain an average frequency accuracy at N cycle of the driving pulse. In this case, driving is performed four times at the same average frequency. FIG. 10(B) shows that the frequency dividing ratio is distributed so as to obtain an average frequency accuracy at N/2 cycle of the driving pulse. In this case, driving is performed eight times at the same average frequency to achieve the same control cycle as the case shown in FIG. 10(A).

In order to correctly detect the average current flowing through the cold cathode tube 4, the detection range for a minimum of one distribution cycle is required as explained in the embodiment 1. In the case of FIG. 10(A), a minimum of 25% of the burst pulse duty is required to assure the detection during one distribution cycle, while 12.5% is enough in the case of FIG. 10(B). On the other hand, the current accuracy is higher as the distribution number is great, so that the current accuracy in FIG. 10(B) is half that in FIG. 10(A).

However, requiring the dimming precision is normally a dimming level of about 50 to 100% used for an image appreciation. A low brightness means does not require the dimming precision compared to a high brightness means. A low brightness mode is used to reduce power consumption when only a stand-by mode or OSD (on-screen display) is displayed. In the case of the low brightness (in case where the burst pulse width is not more than the predetermined value), the distribution number is made small and the number of times for driving with the same frequency increases so as not to change the burst frequency.

As described above, changing the distribution number in accordance with the burst pulse width enables to lower the dimming level, thereby being capable of enlarging the dimming range.

Figure 11:
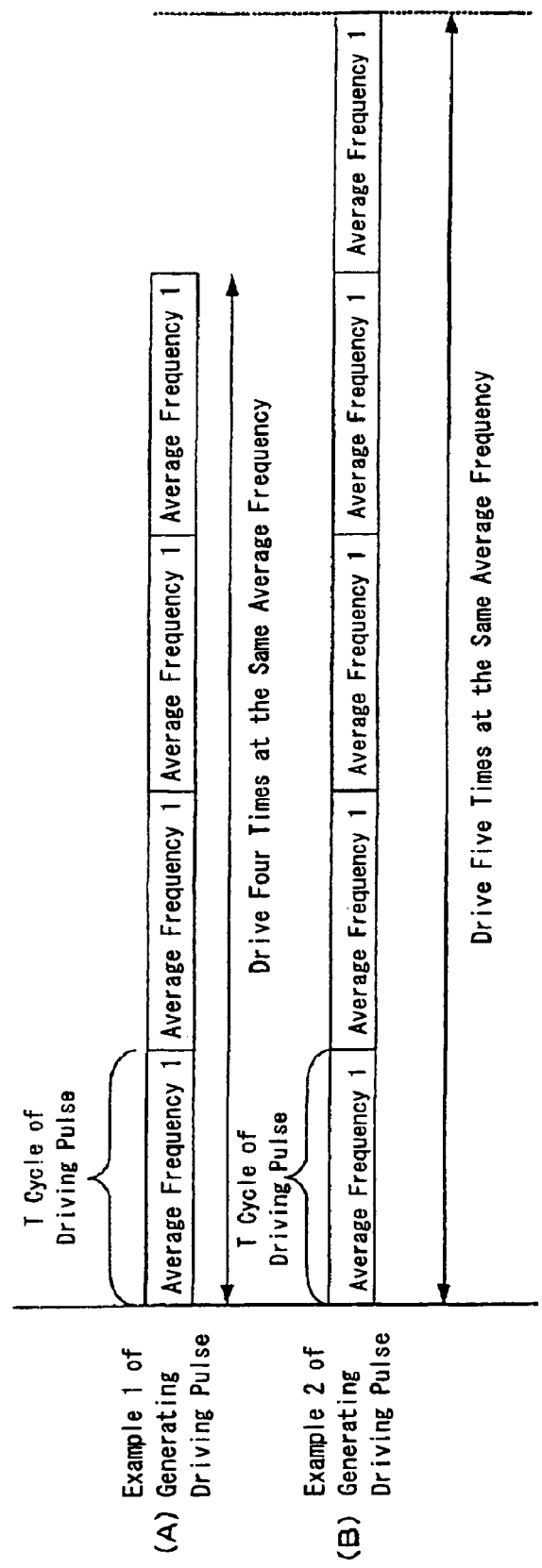
FIG. 11 is a timing chart for explaining other example of the generation of a driving pulse in the cold cathode tube driving device according to the embodiment 2.

Although the explanation is made here as to the method for changing the distribution number in order to lower the dimming level, there is of course a method for changing the burst frequency in case where the flicker caused by the reduction in the burst frequency can be avoided. In this case, the number of times A of the distribution cycle driven at the same frequency may be changed with the distribution number constant as shown in FIG. 11.

Figure 12:
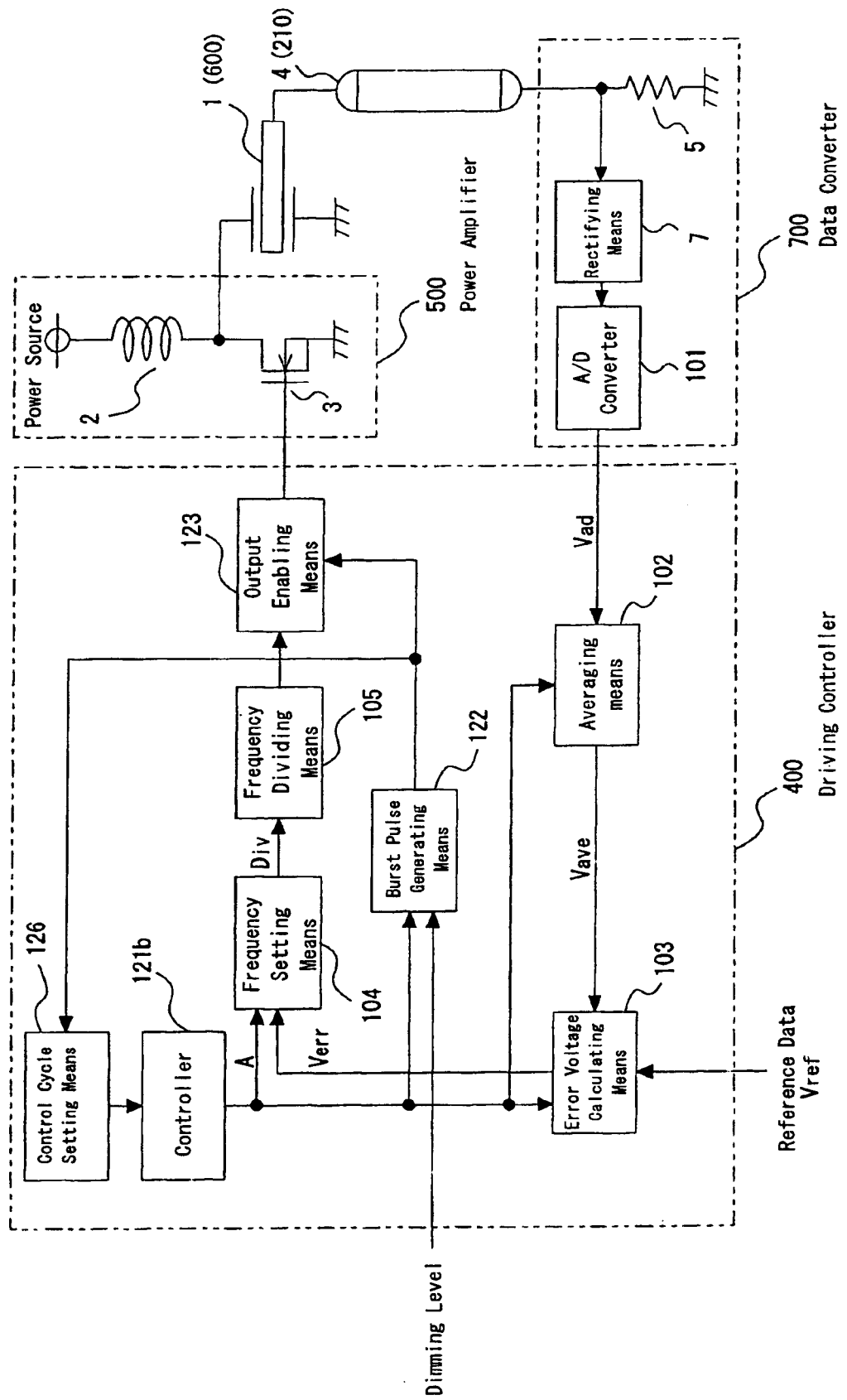
FIG. 12 is a block diagram showing a cold cathode tube driving device according to a modified mode of the embodiment 2.

FIG. 12 shows the embodiment of this case. In FIG. 12, numeral 121b denotes a controller configured such that the number of times A driven at the same frequency can be set from outside of the controller and numeral 126 denotes a control cycle setting means that sets the driving times A of the controller 121b in synchronization with the burst pulse. It increases the amount of A to lower the MIN dimming level in case where the dimming level reaches not more than the predetermined level. The configuration shown in FIG. 12 brings an effect of greatly enlarging the detection range compared to the embodiment 1, although the burst frequency (ON/OFF frequency) varies.

Although special reference is not made here, the present embodiment may adopt a means for changing the detection range according to the duty of the burst pulse or adopt the replacement of the averaging means with a simple filter means as explained in the embodiment 1.

Further, each element constituting the driving controller 400 such as the averaging means 102, error voltage calculating means 103, controller 121, frequency setting means 104a, burst pulse generating means 122, frequency dividing means 105a, output enabling means 123, distribution number adjusting means 125 and control cycle setting means 126 may be achieved by a hardware or software or by a hybrid structure in combination with a hardware and software.

Embodiment 3

Subsequently, a cold cathode tube driving device according to an embodiment 3 of the invention will be explained.

Figure 13:
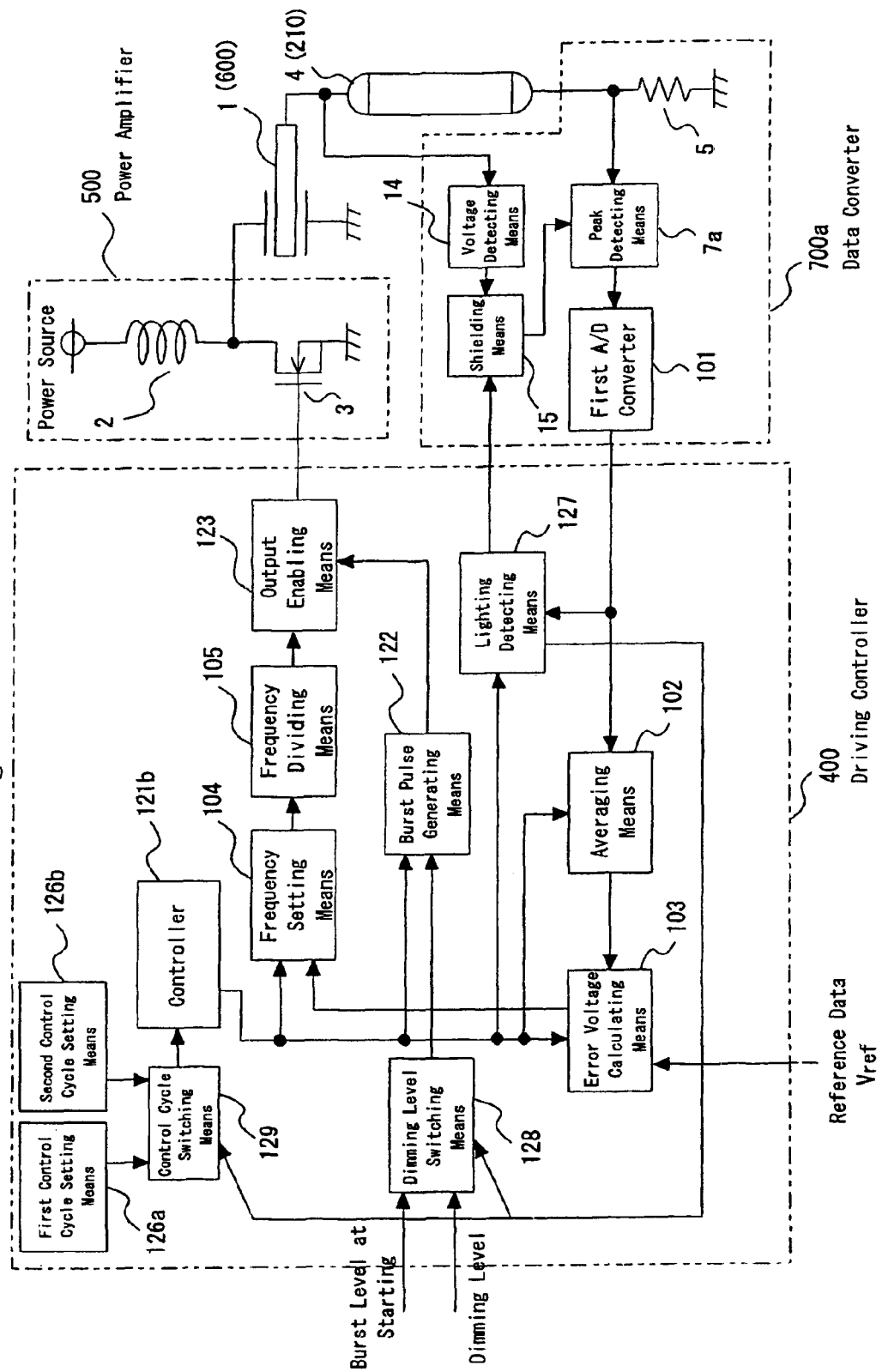
FIG. 13 is a block diagram showing a cold cathode tube driving device according to an embodiment 3 of the invention.

FIG. 13 shows a block diagram showing a configuration of the cold cathode tube driving device according to the embodiment 3 of the invention. This embodiment provides a cold cathode tube driving device that does not deteriorate a lighting performance and lighting quality at the starting even if the dimming level is low.

In FIG. 13, numeral 14 denotes voltage detecting means for detecting an output voltage from the piezoelectric transformer 1, and 15 a shielding means for turning on or off the detected voltage of the piezoelectric transformer 1 detected by the voltage detecting means 14. The shielding means is configured such that the output voltage therefrom becomes at "L" level when the detected voltage is turned off. Numeral 7a denotes a peak detecting means for detecting the output voltage of the piezoelectric transformer 1 outputted from the shielding means 15 and the maximum tube current outputted from the current detector 5. The current detector 5, peak detecting means 7a, voltage detecting means 14, shielding means 15 and A/D converter 101 constitute a data converter 700a that time-sharingly detects the current flowing through the cold cathode tube 4 and the output voltage of the piezoelectric transformer 1 and converts the resultant into digital data. Numeral 127 denotes a lighting detecting means for performing a lighting detection from the digital output data from the A/D converter 101. It executes ON/OFF control of the shielding means 15 at a predetermined period for performing the lighting detection. The lighting detecting means 127 is configured to output a detection switching pulse to the shielding means 15 and output a lighting detection pulse to a dimming level switching means 128 and a control cycle switching means 129 described later. This lighting detecting means 127 will be explained later in detail.

Numeral 128 denotes the dimming level switching means for changing over the dimming level applied to the burst pulse generating means 122 based upon the lighting detection pulse outputted from the lighting detecting means 127. It is configured to output the previously set dimming level at the starting. It is to be noted here that the dimming level at the starting is 100% (continuous driving).

Numeral 121b denotes a controller that can set the number of times A for driving at the same frequency from the outside. This controller is same as that shown in FIG. 12. Numeral 126a denotes a first control cycle setting means for setting a first control cycle of the controller 121b, while numeral 126b denotes a second control cycle setting means for setting a second control cycle of the controller 121b. Numeral 129 denotes the control cycle switching means that performs a change-over between control cycle information outputted from the first control cycle setting means 126a and control cycle information outputted from the second control cycle setting means 126b based upon the lighting detection pulse outputted from the lighting detecting means 127, and outputs the resultant. As described above, the control cycle outputted to the frequency setting means 104 is changed over between at the starting and at the lighting. The first control cycle setting means 126a sets the control cycle at the starting. The control cycle set by the first control setting means 126a is set to correspond to two distribution cycles (the amount of A is 2). The second control cycle setting means 126b sets the control cycle at the lighting. Its cycle is set to correspond to four distribution cycles (the amount of A is 4) like the embodiment 1. The other configurations are the same as those in the embodiment 1 explained by using FIG. 2, so that their explanations are omitted here.

A driving controller 400c is configured by the averaging means 102, error voltage calculating means 103, frequency setting means 104, controller 121b, frequency dividing means 105, burst pulse generating means 122, output enabling means 123, lighting detecting means 127, dimming level switching means 128, first control cycle setting means 126a, second control cycle setting means 126b and control cycle switching means 129, those of which are configured as described above.

Subsequently explained are features of the cold cathode tube driving device of the present embodiment shown in FIG. 13 having the above-mentioned configuration. The features of the present embodiment are as follows.

(1) A continuous driving is performed at the starting that can assure the lighting performance, and after the detection of the lighting, a dimming level is promptly shifted to a desired level.

(2) The detection of the lighting is performed within the burst pulse width at the MIN dimming in order to suppress the variation in the brightness immediately after the lighting.

In order to realize the feature (2), in particular, the control cycle is changed over between at the starting and at the lighting, and the control cycle at the starting is made shorter.

Figure 14:
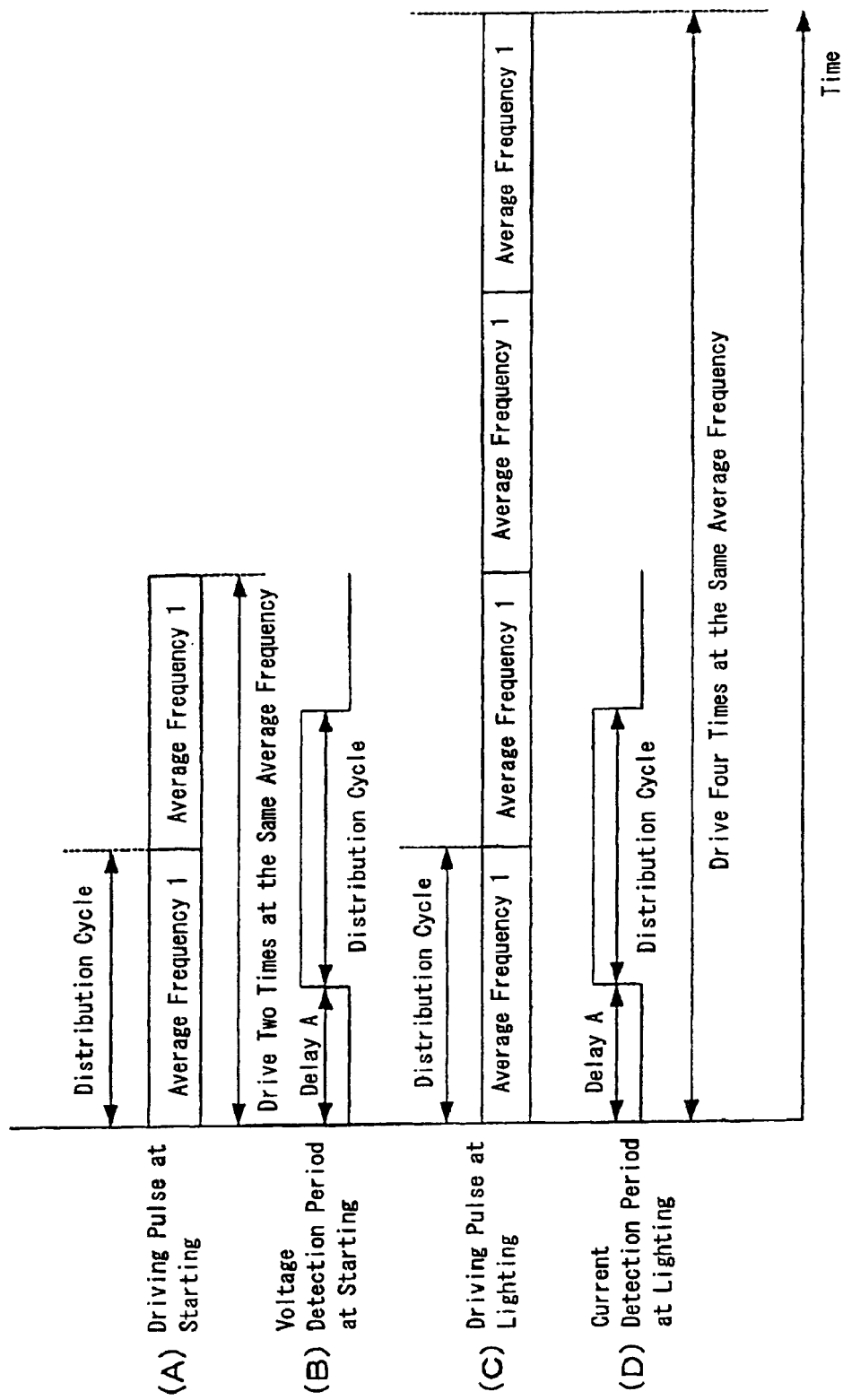
FIG. 14 is a timing chart for explaining an operational concept of the cold cathode tube driving device according to the embodiment 3.

Firstly, FIG. 14 shows control cycles at the starting and lighting. FIG. 14(A) shows a driving pulse during one control cycle at the starting, i.e., driving is performed two times at the same average frequency. FIG. 14(C) shows a driving pulse during one control cycle at the lighting, i.e., driving is performed four times at the same average frequency. FIG. 14(B) shows a voltage (current) detection period at the starting. The detection is made with the delay A shifted. FIG. 14(D) shows a voltage (current) detection period at the lighting. The detection is made with the delay A shifted like the case at the starting.

Figure 15:
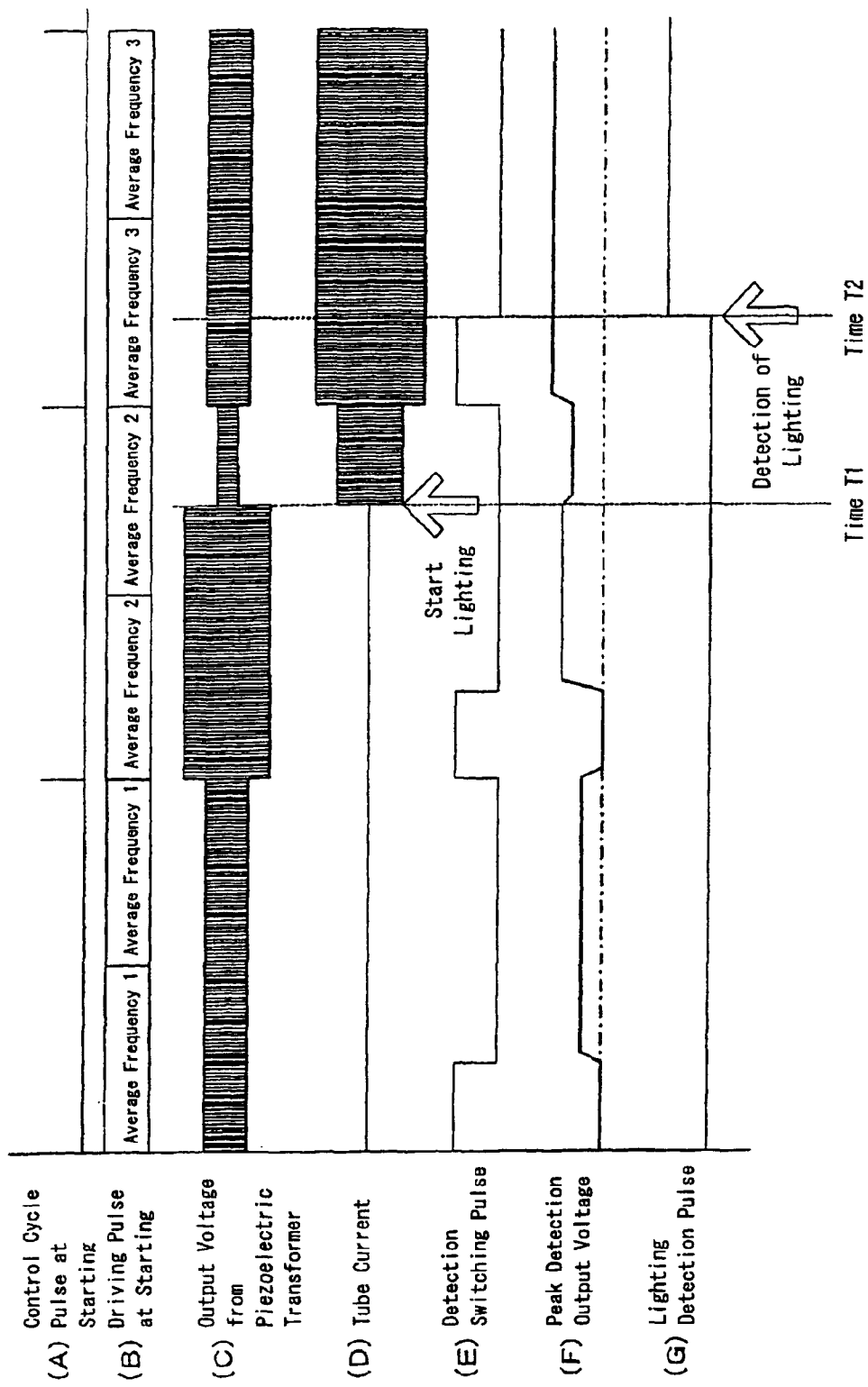
FIG. 15 is a waveform chart showing a lighting detection principle in the cold cathode tube driving device according to the embodiment 3.

Subsequently explained is the operation of the lighting detecting means 127 for making the change-over from the control at the starting to the control at the lighting. FIG. 15 shows the operation of the lighting detecting means 127 at the starting. FIG. 15(C) shows an output voltage detection signal of the piezoelectric transformer 1 outputted from the voltage detecting means 14, while FIG. 15(D) shows a current detection signal outputted from the current detector 5. The current does not flow at the starting since the cold cathode tube 4 is not lit. The control cycle setting means 129 selects the first control cycle setting means 126a, so that the control cycle corresponding to two same driving periods is set. The dimming level switching means 128 selects the dimming level of the continuous driving and outputs the selected resultant to the burst pulse generating means 122.

FIG. 15(E) shows a change-over pulse that is a detection pulse outputted to the shielding means 15 from the lighting detecting means 127 for detecting the lighting. When this change-over pulse is at "H" level, the shielding means is turned OFF, and a peak value of the current detection signal is outputted from the peak detecting means 7a. The detection of the lighting is determined by the output level of the peak detecting means 7a when the change-over pulse is at "H" level. Specifically, the output from the peak detecting means 7a is at zero level at the non-lighting period since the tube current does not flow, while the tube current flows when the lighting is started, so that the voltage corresponding to the tube current is outputted from the peak detecting means 7a. Therefore, if the change-over pulse is at "H" level, the lighting is not executed when the output from the peak detecting means 7a is at "L" level, while the lighting is determined to be performed when the output from the peak detecting means 7a is not less than the predetermined level.

In FIG. 15, the lighting is started at a time T1, whereupon the tube current starts to flow as shown in FIG. 15(D). Next, at a time T2, the output from the peak detecting means 7a becomes to a level correspond to the tube current when the change-over pulse shown in FIG. 15(E) is at "H" level, whereby the lighting is detected. As a result, the lighting detection pulse shown in FIG. 15(G) shifts from "L" level to "H" level.

Figure 16:
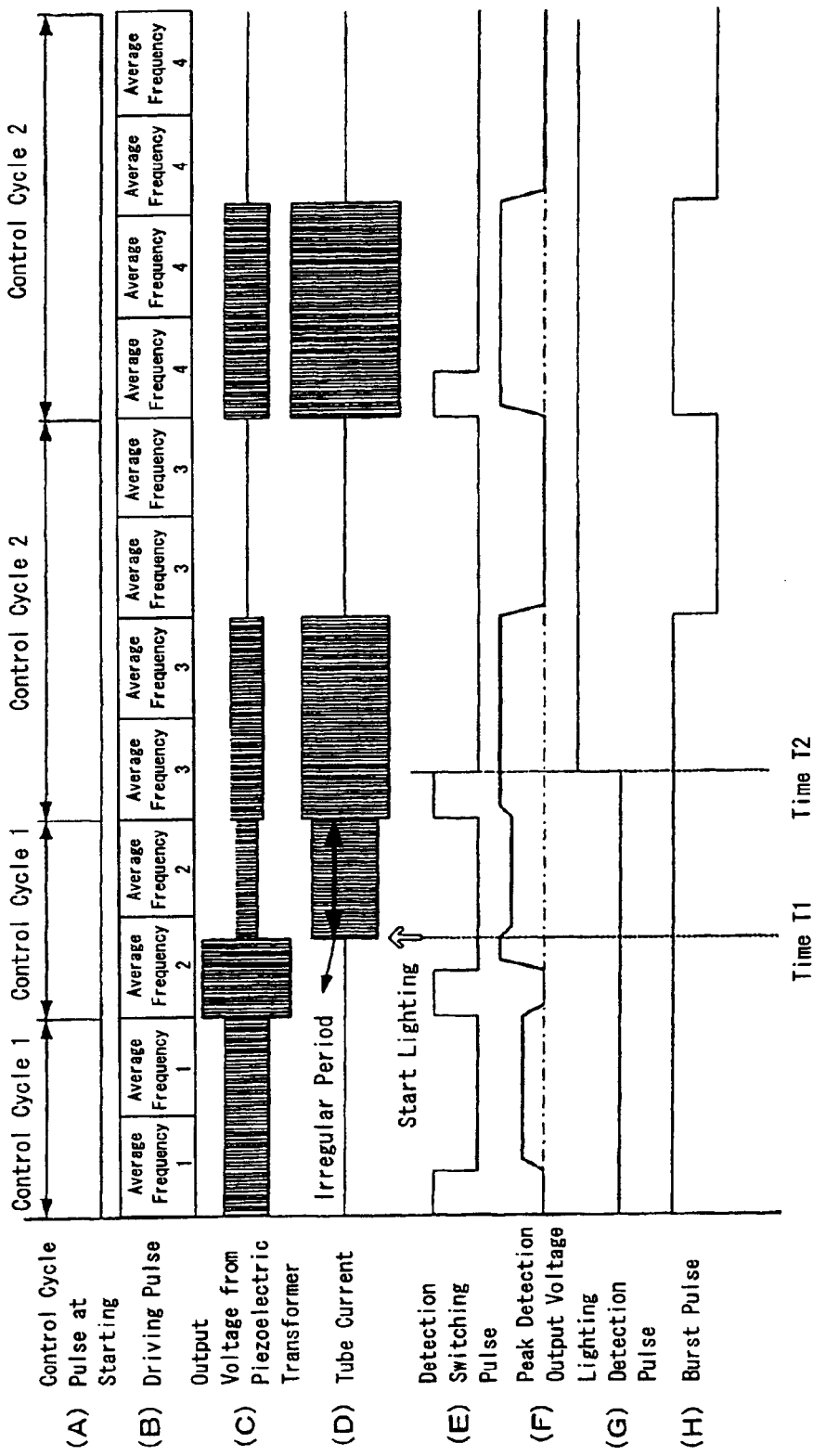
FIG. 16 is a waveform chart for explaining a shift from starting to lighting in the cold cathode tube driving device according to the embodiment 3.

Subsequently, FIG. 16 shows each waveform when the control at the starting is shifted to the control at the lighting.

As shown in FIG. 16, the cold cathode tube 4 starts to light at the time T1, so that the tube current starts to flow. At the time T2 immediately after the time T1, the lighting is detected by the change-over pulse, whereby the lighting detection pulse shifts from "L" level to "H" level.

Figure 17:
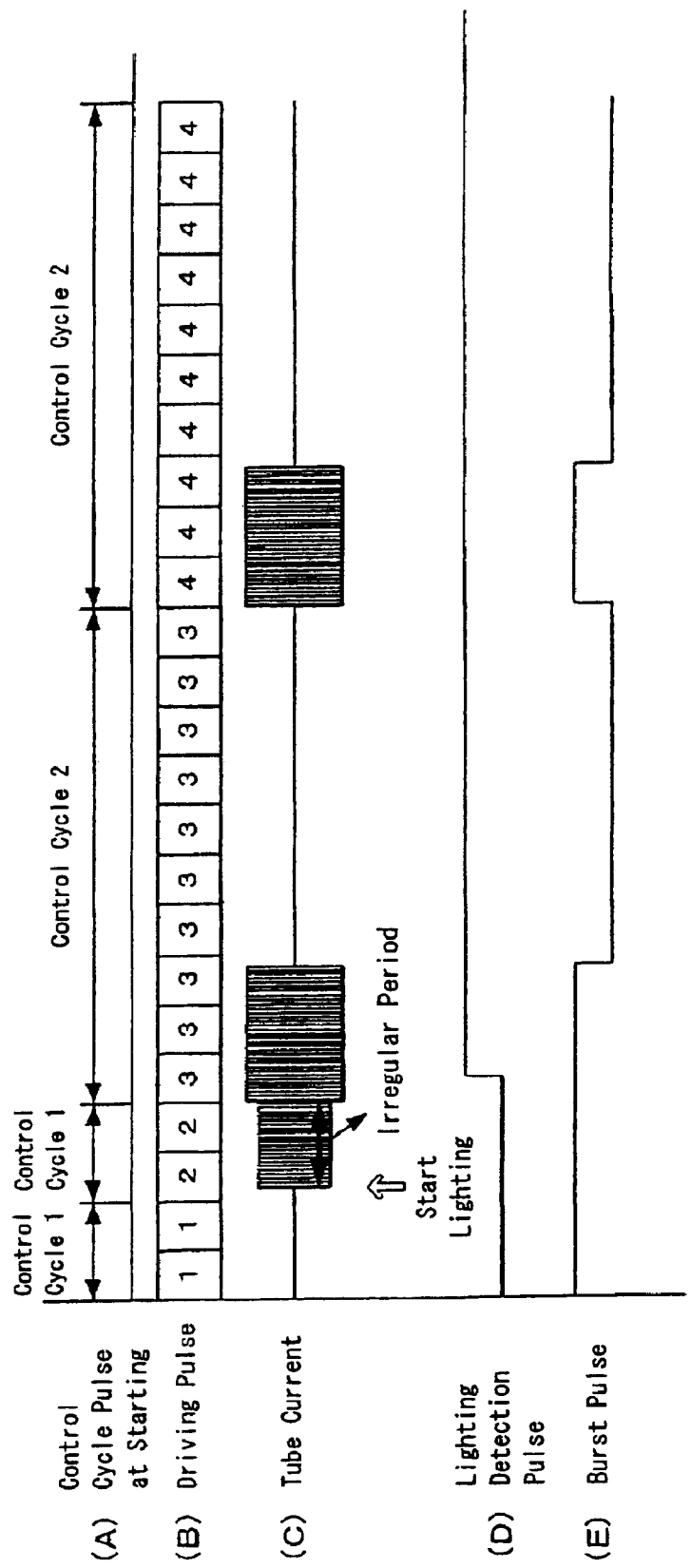
FIG. 17 is a waveform chart for explaining other example of the cold cathode tube driving device according to the embodiment 3.

When the lighting detection pulse is at "H" level at the time T2, the control cycle switching means 129 is switched to a state for selecting the second control cycle setting means 126b. By this, the control cycle is changed from the cycle corresponding to two same driving periods to that corresponding to four same driving periods. Simultaneously, the dimming level switching means 128 changes the dimming level for the continuous driving to the externally applied dimming level, and outputs the resultant to the burst pulse generating means 122. By this operation, the burst pulse is outputted from the time T2 as shown in FIG. 16(H), to thereby change the dimming to the burst dimming. In this process, there is an irregular period in the tube current before and after the lighting as shown in FIG. 16(D), whereby the brightness change corresponding to this irregular period occurs. However, this period is suppressed to as much as 50% of the control cycle at the lighting period, so that the brightness change at the lighting period is greatly improved in the actual use. Further, the control cycle at the lighting period is not actually 4. For example, in case where the burst frequency is 150 Hz, the driving frequency of the piezoelectric transformer 1 is 150 KHz and the distribution number is 100, the distribution frequency (1/distribution cycle) is 150 KHz/100=1.5 KHz. In order to obtain the burst frequency of 150 KHz, the control cycle becomes ten times the distribution cycle. In this case, the maximum irregular period is 20% of the control cycle at the lighting period as shown in FIG. 17. The change in the brightness level at this time can actually be neglected.

Figure 18:
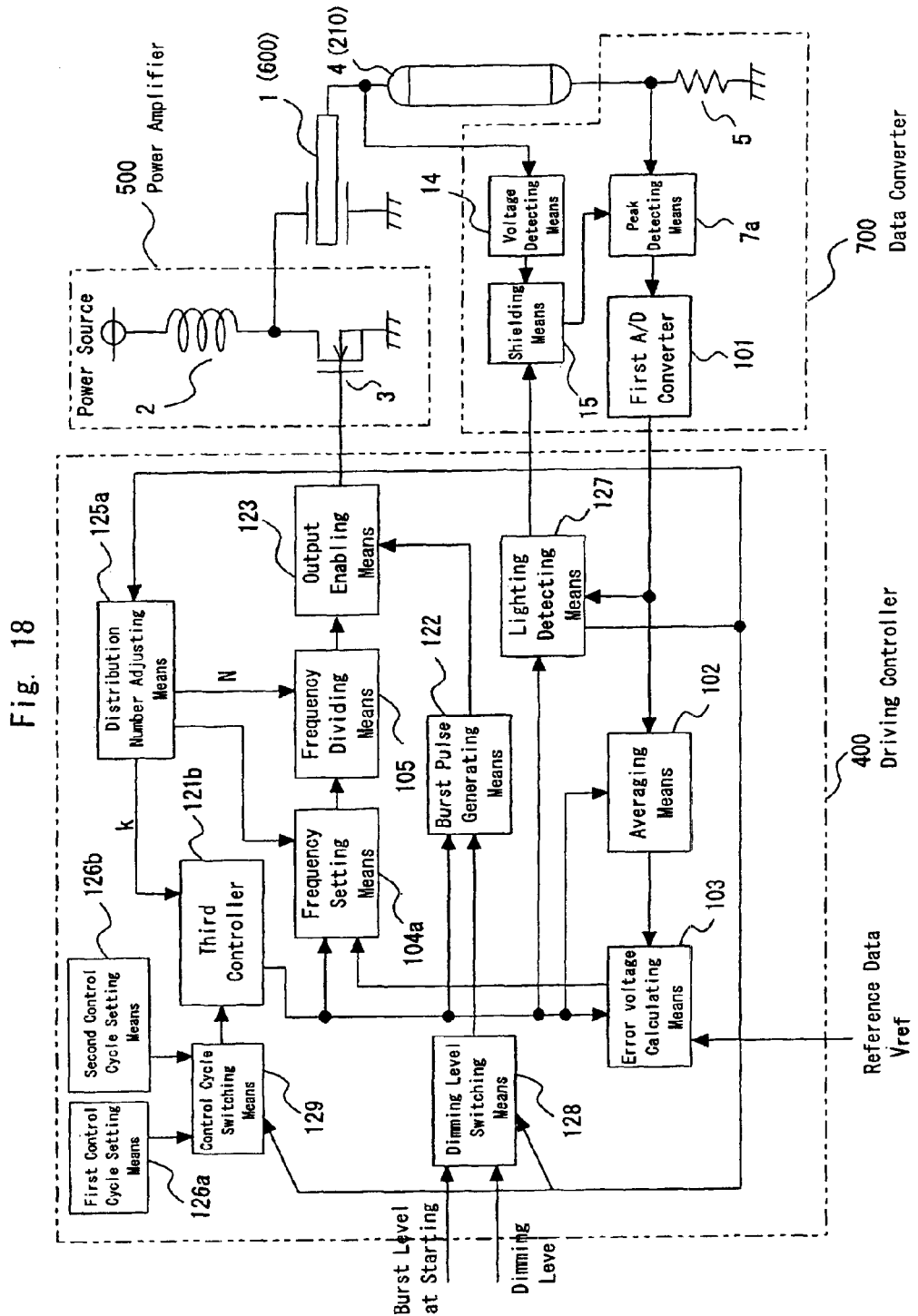
FIG. 18 is a block diagram showing a cold cathode tube driving device according to a modified mode of the embodiment 3.

Further, making the distribution number at the starting smaller than the distribution number at the lighting further shortens the irregular period, to thereby be capable of obtaining a satisfactory lighting performance. FIG. 18 shows this example.

In FIG. 18, numeral 125a denotes a distribution number adjusting means for performing the change-over of the distribution cycle from the frequency setting means 104a. The frequency setting means 104a performs the same operation as the frequency setting means shown in FIG. 9 in the embodiment 2. Specifically, the distribution number changes depending upon the output from the distribution number adjusting means 125a. The different point from the distribution adjustment means 125 shown in FIG. 9 in the embodiment 2 is that the distribution number adjusting means 125a in this embodiment is configured to change the distribution number between at the lighting and at the starting, while the distribution number adjusting means 125 in the embodiment 2 changes the distribution number in accordance with the burst pulse width from the burst pulse generating means 122, i.e., in accordance with the dimming level. Therefore, the lighting detection pulse from the lighting detecting means 127 is inputted to the distribution number adjusting means 125a. The other operations are the same as those shown in FIG. 13.

Figure 19:
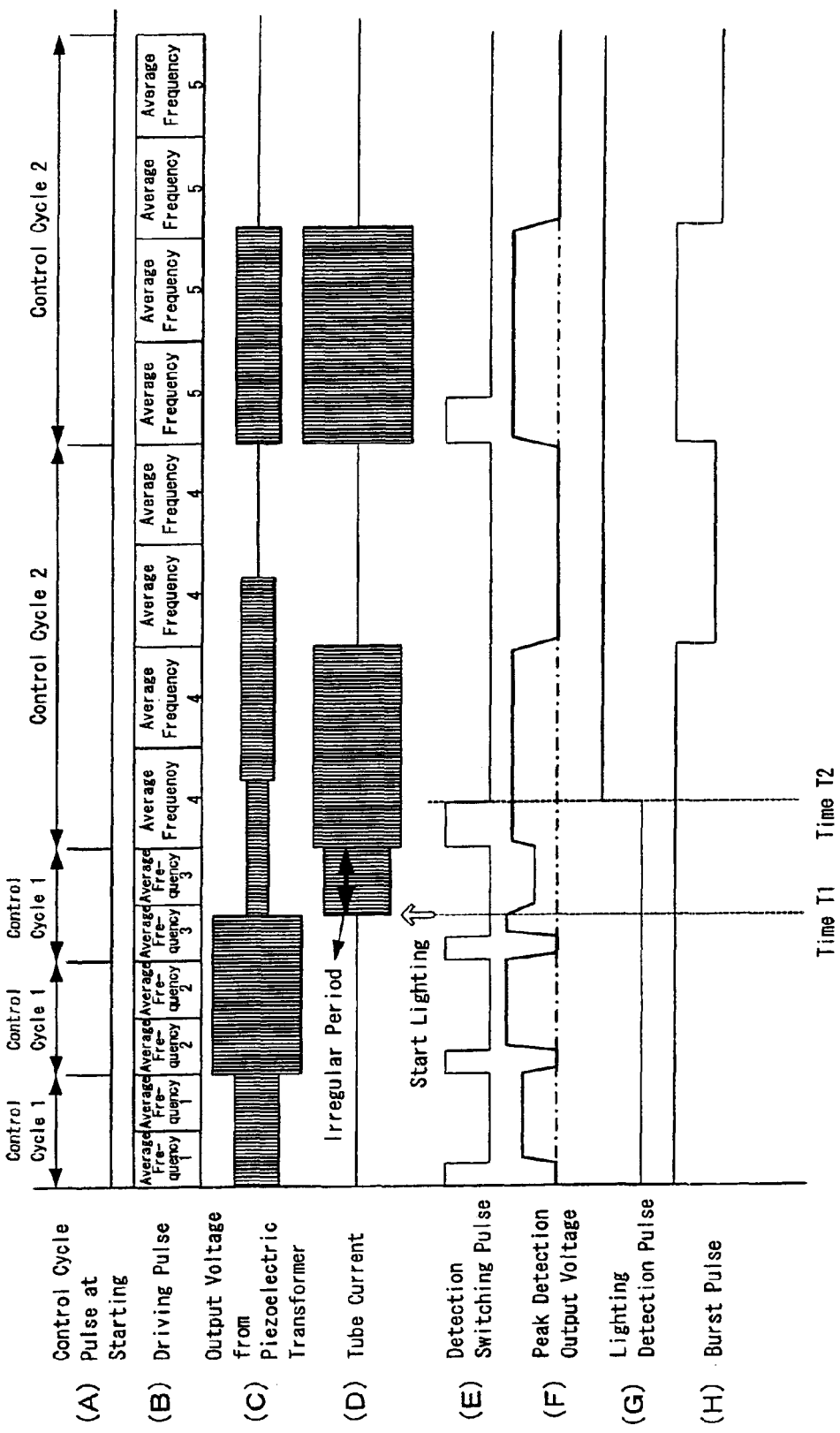
FIG. 19 is a timing chart for explaining an operational concept of the cold cathode tube driving device according to the modified mode of the embodiment 3.

FIG. 19 shows each waveform of each means from the starting to the lighting. The lighting detection period in this embodiment at the starting is one half the period in the embodiment shown in FIG. 13, whereby the irregular period at the starting at the lighting period is a half the period shown in FIG. 13.

As described above, according to the cold cathode tube driving device of the embodiment 3 of the invention, the continuous driving is executed at the starting, thereby being capable of shifting to the burst dimming without deteriorating the lighting performance. Further, changing the control cycle at the starting and at the lighting, or changing the distribution number can improve the brightness change at the lighting to a level almost neglected, thereby giving an effect of remarkably improving the lighting quality.

Each element constituting the driving controller 400c such as the averaging means 102, error voltage calculating means 103, controller 121b, frequency setting means 104, burst pulse generating means 122, frequency dividing means 105, output enabling means 123, lighting detecting means 127, dimming level switching means 128, first control cycle setting means 126a, second control setting means 126b, control cycle switching means 129 and distribution number adjusting means 125a may be achieved by a hardware or software or by a hybrid structure in combination with a hardware and software.

The other features of the above-mentioned embodiments 1 to 3 are that the device may be controlled by a software since the processing by the driving controller can be digitized. Specifically, the control can be achieved by a microcomputer program, to thereby be capable of easily establishing a system.

Figure 20:
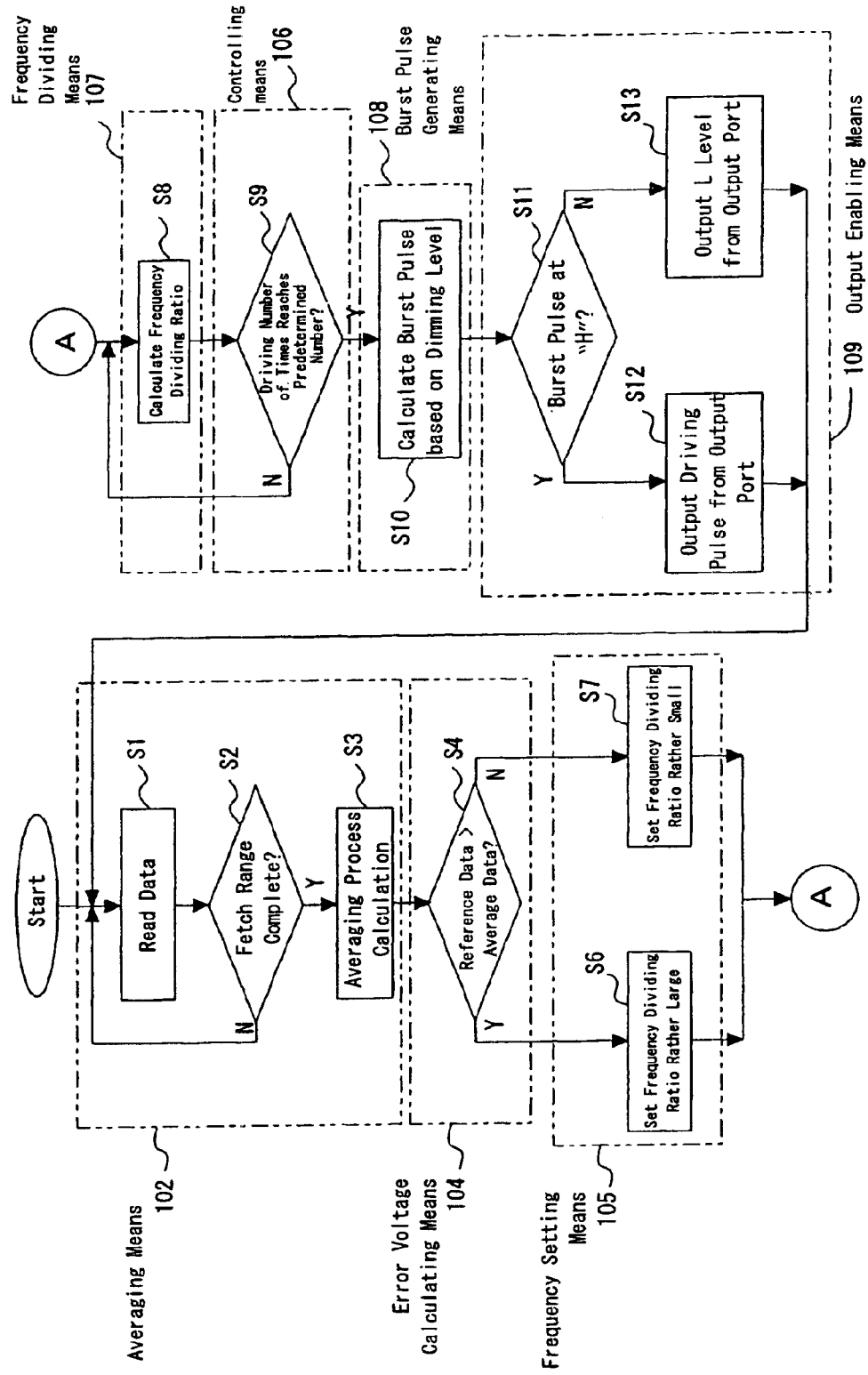
FIG. 20 is a flow chart for explaining a software configuration of the cold cathode tube driving device according to the modified mode of the embodiment 1.

FIG. 20 shows a flow chart taking the case of the embodiment 1 as an example.

In FIG. 20, step S1 shows a data-read process. Step S2 determines whether data-fetch number reaches a predetermined number or not. If it does not reach the predetermined number, the process returns to the step S1 for fetching data again. If it reaches the predetermined number, the average of the data obtained at the step S3 is calculated. The predetermined number means here a driving pulse number that is a multiple of the distribution cycle. These steps S1 to S3 correspond to the averaging means 102 shown in FIG. 2 in the embodiment 1. Step S4 compares externally applied reference data with average data. The step S4 corresponds to the error voltage calculating means 103 in the embodiment 1. If the reference data is greater than the average data, the next frequency dividing ratio is set rather great (so as to reduce the driving frequency) at step S5 in order to increase the current flowing through the cold cathode tube 4. On the other hand, if the reference data is smaller than the average data, the frequency dividing ratio is set rather small at step S6 in order to decrease the current flowing through the cold cathode tube 4. The steps S5 and S6 correspond to the frequency setting means 104 shown in FIG. 2. Step S7 divides a clock (corresponding to a microcomputer clock or a timer formed of the microcomputer clock on a software) at the set frequency dividing ratio. This corresponds to the frequency dividing means 105 shown in FIG. 2. Step S8 counts the number of the divided data (corresponding to the driving pulse) for determining whether the distribution number of times reaches the predetermined number. If it does not reach the predetermined number, the process returns to the step S7 to perform the dividing at the same frequency setting once again. This means corresponds to the controller 121 in FIG. 2. Thereafter, a burst pulse width is calculated at step S9 based upon the externally applied dimming level. When the burst pulse is at "H" level, the above-mentioned divided data is outputted from an output port, while the output port is set to "L" level when the burst pulse is at "L" level. This means corresponds to the burst pulse generating means 122 in FIG. 2. The steps S10 to S12 correspond to the output enabling means 123 in FIG. 2.

The operation on the software was simply explained above by taking the embodiment 1 shown in FIG. 2 as an example. The processing by a software is possible in the other embodiments, although specific examples are not illustrated here.

(B) Cold Cathode Tube Driving Device/Liquid Crystal Display Device wherein Power Supply Voltage Variation is Considered Required to the piezoelectric transformer for driving the cold cathode tube that is the backlight basically are dimming function, low electric power (high power conversion efficiency) or the like. Further, in case where it is used in portable equipment such as a notebook-sized personal computer or a digital video camera, stable lighting and stable power conversion efficiency are desired within a wide range of a power supply voltage considering a battery source from which a stable source cannot be obtained.

In order to improve the above subject, Japanese Unexamined Patent Publication No. HEI8-33349 discloses a method for changing a pulse width (duty ratio) of a driving pulse in accordance with a power supply voltage to cope with a wide power supply voltage range. This method is referred to as a duty control below.

Figure 48:
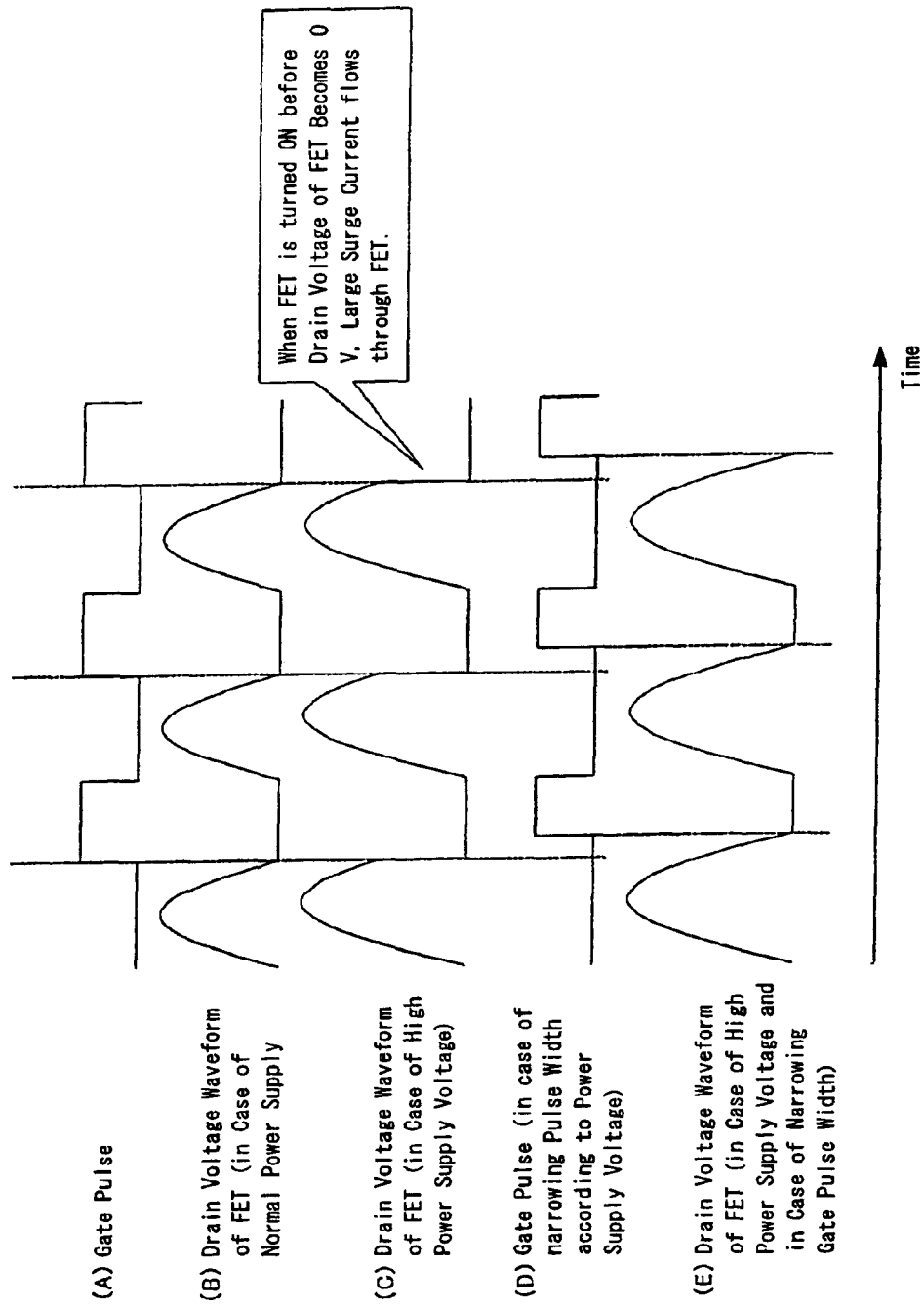
FIG. 48 is a waveform chart for explaining a subject in the conventional piezoelectric transformer driving.

The principle disclosed in the document 3 will briefly be explained with reference to FIGS. 48(A) and 48(B). FIG. 48(A) shows a driving pulse applied to a gate of an FET that is a switching transistor of a piezoelectric transformer, and FIG. 48(B) shows a drain voltage generated by the driving pulse. This drain voltage varies depending upon the power supply voltage. When the power supply voltage rises, the amplitude of the drain voltage increases as shown in (C), whereby the FET is turned ON before the drain voltage becomes 0 V. In this state, great current (surge current) flows by short-circuiting the drain and GND the moment the FET is turned ON. This leads to a breakdown of the FET. When this rapid current flows through the piezoelectric transformer, the piezoelectric transformer may be broken down. Therefore, the driving pulse width is adjusted in accordance with the power supply voltage so as to prevent the rapid surge current from flowing.

FIG. 48(D) shows a driving pulse in case where the power supply voltage increases. This driving pulse is set to have a width smaller than that of the driving pulse shown in (A). By this setting, the FET is turned ON at the drain voltage of 0 V as shown in (E). This method enables a driving with reduced loss even within a wide power supply voltage range.

As described above, the document 3 discloses the method for varying the duty ratio of the driving pulse in accordance with the power supply voltage, to thereby enable the use within a wide power supply voltage range.

However, in case where this method is performed in a digital driving system, the resolution in the duty ratio is rough by a clock of on the order of 10 MHz, whereby a sufficient performance cannot be obtained. (Raising the clock frequency can assure the resolution, but it causes increased circuit power or increased radiated interference, thus unpractical.) Therefore, it is desired that the duty ratio of the driving pulse can be adjusted in intervals of as small as possible for obtaining a satisfactory performance within a wide power supply voltage range. Specifically, the duty ratio can desirably be varied in at least 0.1-V steps of the power supply voltage.

Figure 49:
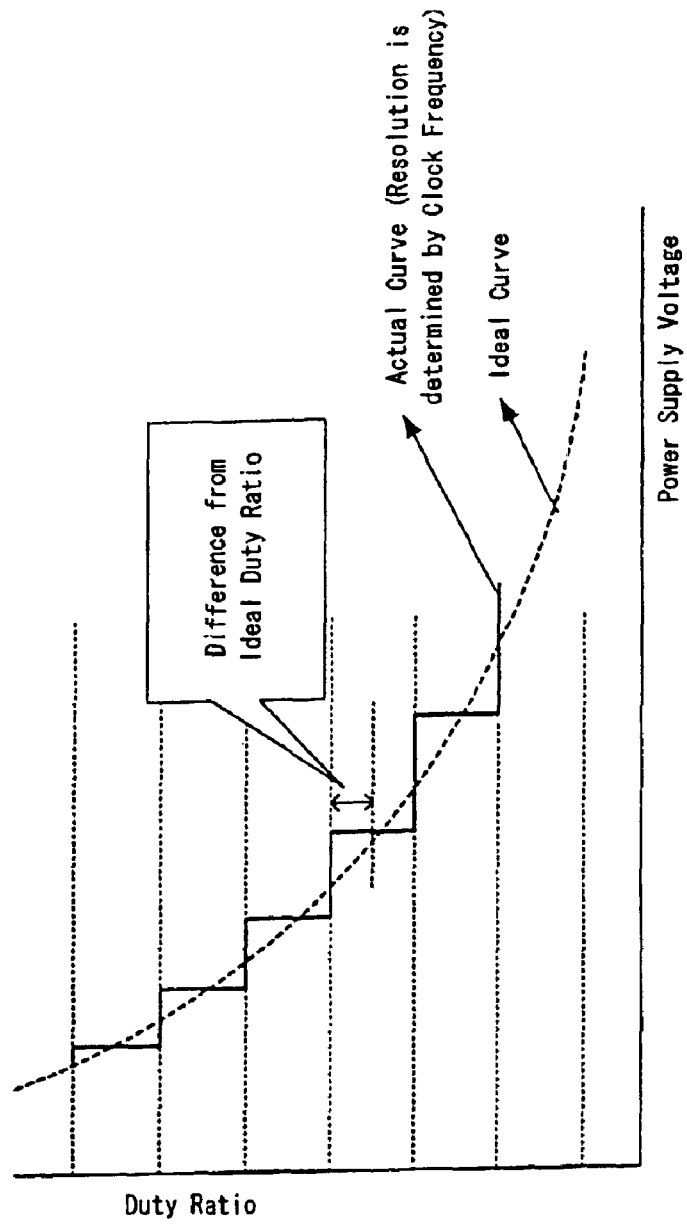
FIG. 49 is a view showing a resolution of a duty ratio adjustment in the conventional digital-type cold cathode tube driving device.

FIG. 49 shows a case wherein the duty ratio is adjusted in a digital driving system. The lower the frequency of the clock becomes, the rougher the resolution becomes, so that there occurs a point greatly deviating from the ideal.

Explanation is made by citing an example. In case where a clock of 10 MHz is divided into 100 to produce a driving pulse having a frequency of 100 kHz, the pulse width of the produced pulse can be adjusted every one cycle from 1 cycle width to 99 cycle widths. Specifically, the duty ratio can be adjusted in 1-% steps.

However, in case where the ideal duty curve has the duty ratio of 30% to 20% at the power supply voltage of 5 V to 10 V, for example, only 10-step adjustment (in 0.5-V steps) can be performed in 1-% steps, that cannot afford a sufficient performance.

An embodiment 4 and the following embodiments of the invention are accomplished in view of the above-mentioned subject, and propose a duty control system in a digital driving system without deteriorating an efficiency for aiming to realize a cold cathode tube driving device coping with a power supply voltage of a wide range.

Embodiment 4

Figure 21:
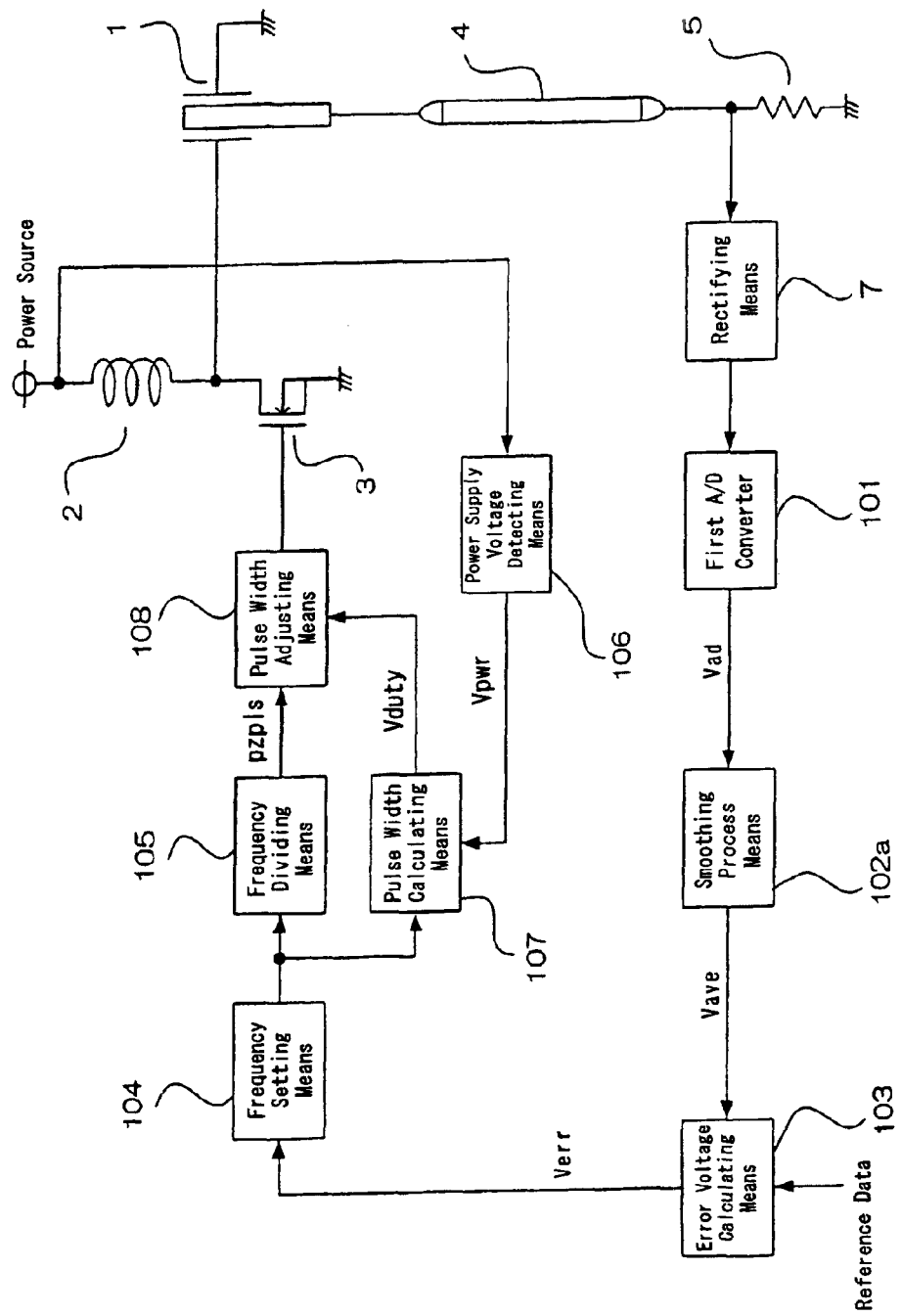
FIG. 21 is a block diagram showing a cold cathode tube driving device according to a modified mode of the embodiment 4.

FIG. 21 is a block diagram showing a configuration of a cold cathode tube driving device according to the embodiment 4 of the invention. In FIG. 21, numeral 1 denotes a piezoelectric transformer, 2 a coil, 3 a switching transistor (FET), 4 a cold cathode tube, and 5 a current detector that detects current flowing through the cold cathode tube 4 and converts the detected result into a voltage signal. Although the current detector 5 is representatively illustrated by a mark of a resistor, it is not necessarily be a resistor. Numeral 7 denotes a rectifying means that rectifies a sinusoidal voltage signal taken out from the current detector 5 and converts the resultant into DC voltage and 101 an A/D converter (a first A/D converter) that converts the voltage outputted from the rectifying means 7 into a digital signal. The A/D converter 101 has a sufficient number of bits in order to obtain a voltage detection accuracy and its sampling clock has a frequency sufficient for assuring a response speed required for the control. An output digital signal from the A/D converter 101 is represented by Vad. Numeral 102 denotes a smoothing process means that performs a smoothing process to a detection voltage Vad outputted from the A/D converter 101 within a predetermined sample number. The output digital signal from the smoothing process means 102a is represented by Vave hereinafter. Numeral 103 denotes an error voltage calculating means that compares the output signal Vave from the smoothing process means 102a with externally set reference data Vref, calculates the difference between them and outputs the resultant as error data Verr. Numeral 104 denotes a frequency setting means for setting a frequency of a driving pulse of the piezoelectric transformer 1. This frequency setting means 104 adds or subtracts the frequency corresponding to the error data Verr to or from the previous frequency setting value Fprev, and outputs M-bit data Fnext. This data Fnext means a frequency dividing ratio for the N cycle of the driving pulse. Numeral 105 denotes a frequency dividing means that distributes the frequency dividing ratio such that the average frequency dividing ratio Div of the driving pulse for N cycle becomes Fnext/N to divide a clock. A driving pulse to the piezoelectric transformer 1 is produced by the frequency dividing means 105. The driving pulse for distributing the frequency dividing ratio outputted from the frequency dividing means 105 is represented by pzpls.

Figure 22:
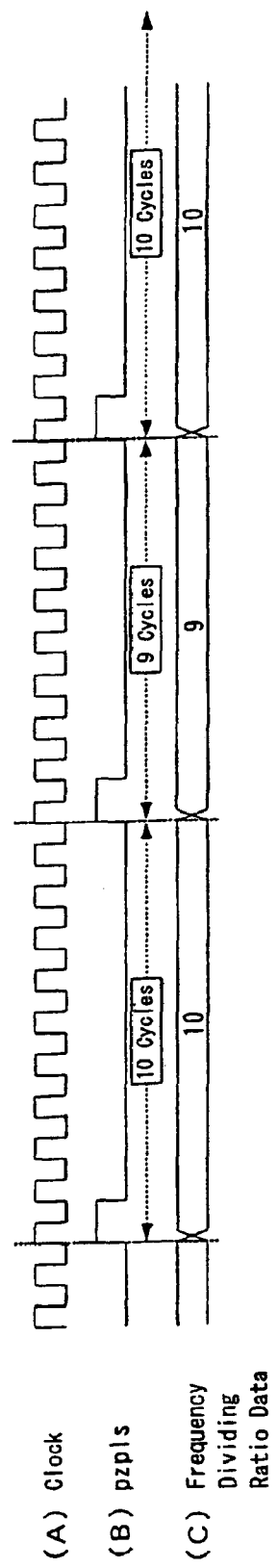
FIG. 22 is a timing chart for explaining an operation of a frequency dividing means in the embodiment 4.

FIG. 22(B) shows an example of the distribution pulse pzpls produced at the frequency dividing means 105, while FIG. 22(C) shows frequency dividing ratio data that is simultaneously obtained. Further, FIG. 22(A) shows a clock.

The configuration described so far is the same as that disclosed in the document 1 (Japanese Unexamined Patent Publication No. 2000-133485), and its operation is the same. The feature of this embodiment is that the device of this embodiment includes the following means 106 to 108.

Figure 23:
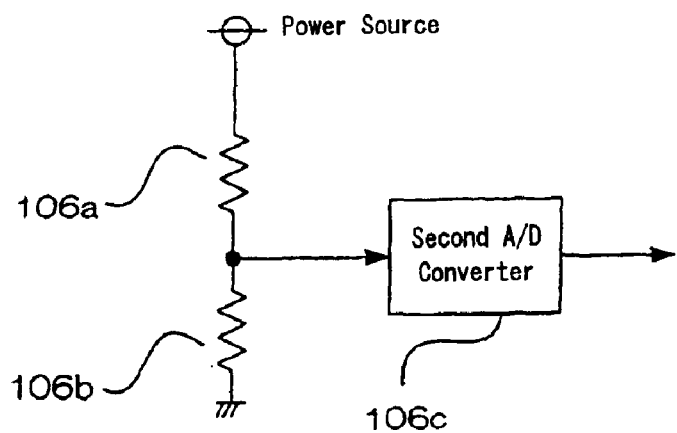
FIG. 23 is a block diagram showing a power supply voltage detecting means in the embodiment 4.

Numeral 106 denotes a power supply voltage detecting means that detects a power supply voltage and outputs the detected voltage as a digital value. The power supply voltage detecting means is configured as shown in FIG. 23, for example. In FIG. 23, numerals 106a and 106b denote resistors that divides the power supply voltage and converts the divided power supply voltage into a voltage that adapts to an input dynamic range of a second A/D converter 106c. The second A/D converter 106c converts the inputted voltage into a digital value. The output signal from the power supply voltage detecting means 106 is represented by Vpwr.

Numeral 107 denotes a pulse width calculating means that calculates a duty value (hereinafter referred to as Vduty) of the driving pulse from the frequency data Fnext obtained at the frequency setting means 104 and the power supply voltage information Vpwr obtained at the power supply voltage detecting means 106 based upon a relationship between a predetermined power supply voltage and duty value of the driving pulse. The duty ratio of the pulse width means a ratio of "H"-level period and "L"-level period. This duty ratio of the pulse width corresponds to pulse width information.

Figure 24:
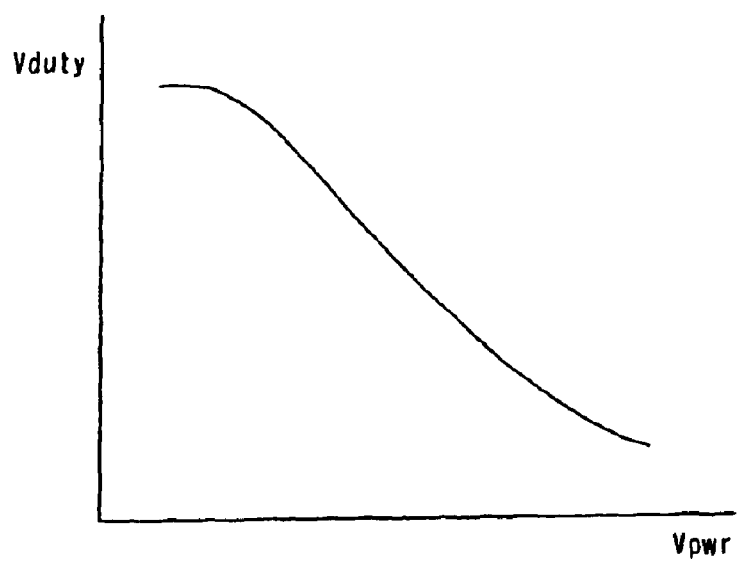
FIG. 24 is a view showing one example of a relationship between a power supply voltage and an optimum duty in the embodiment 4.

For example, FIG. 24 shows one example of a relationship between the power supply voltage and the duty value of the driving pulse. There are various calculation methods of the pulse width calculating means 107, and special limitation is not made here to the calculation method. The various calculation methods include, for example, a ROM method in which the relationship between the power supply voltage Vpwr and the duty value Vduty is stored in advance in a ROM (read-only memory) or a method for calculating a curve shown in FIG. 24 by using a linear approximation.

Numeral 108 denotes a pulse width adjusting means for adjusting the pulse width based upon the duty value Vduty outputted from the pulse width calculating means 107.

Figure 25:
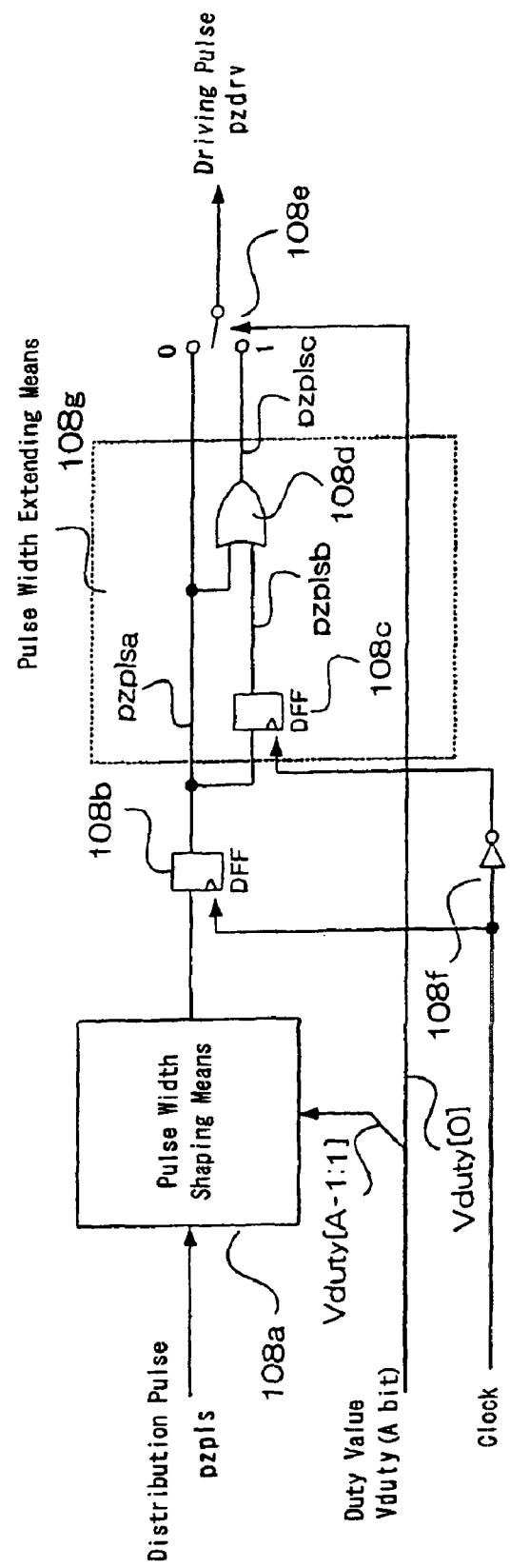
FIG. 25 is a circuit diagram showing a realized example of a pulse width adjusting means in the embodiment 4.

FIG. 25 shows an example of a specific configuration of the pulse width adjusting means 108. In FIG. 25, numeral 108a denotes a pulse width shaping means (decode means) that converts the inputted distribution pulse pzpls into a pulse width according to the duty value Vduty.

When the duty value Vduty is A-bit digital data, data of high-order (A-1)-bit is referred to at the pulse width shaping means 108a and a signal of a pulse width equal to the value of (A-1)-bit is outputted.

The data of the high-order (A-1)-bit from 0th-bit to (A-1)th-bit of the signal Vduty having a bus width of A-bit is represented by Vduty[A-1:1]. The data of the least significant bit is represented by Vduty[0].

Figure 26:
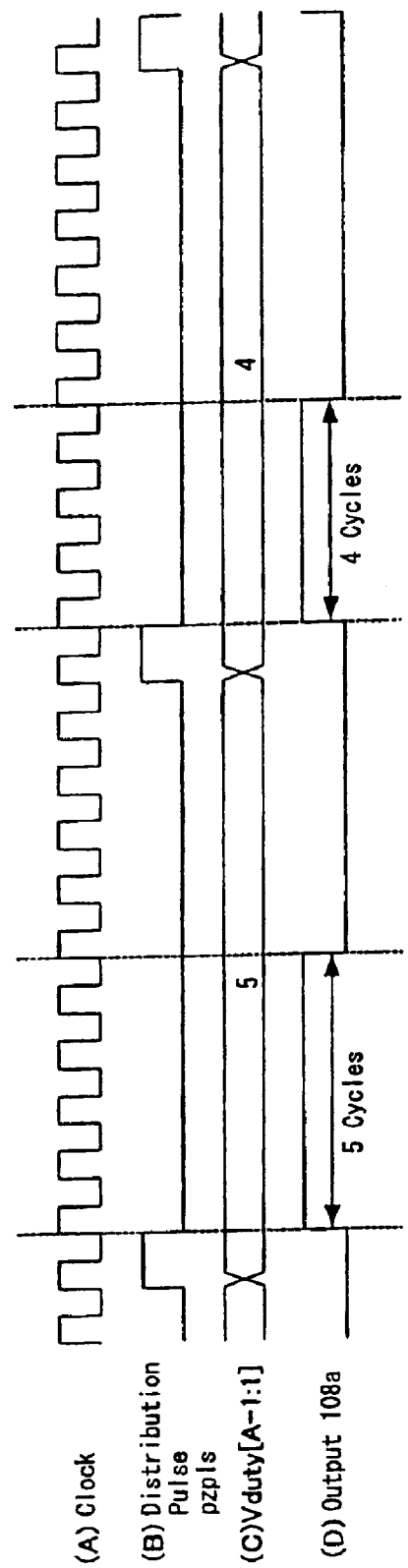
FIG. 26 is a timing waveform chart for explaining an operation of the pulse width adjusting means in the embodiment 4.

FIG. 26 shows input/output waveform of the pulse width shaping means 108a. As shown in FIG. 26(D), the pulse width of the outputted pulse is equal to the value of Vduty[A-1:1] shown in FIG. 26(C).

Numeral 108b denotes a D-type flip-flop (hereinafter referred to as DFF) that latches and outputs an output signal from the pulse width shaping means 108a. This output signal is represented by an initial pulse pzplsa. Numeral 108c denotes a DFF that latches the initial pulse pzplsa at the trailing edge of the clock and outputs the resultant. This output signal is represented by a pulse pzplsb. Numeral 108d denotes an OR gate. The output signal from the OR gate is represented by an extended pulse pzplsc. These DFF 108c and OR gate 108d constitute a pulse width extending means 108g. Specifically, the pulse width is extended by carrying out the logical sum after delaying. Numeral 108e denotes a selector that outputs the extended pulse pzplsc when the Vduty[0] is 1 while outputs the initial pulse pzplsa when the Vduty[0] is 0. The output from the selector 108e becomes a driving pulse pzdrv for driving the FET 3. Numeral 108f denotes an inverter for inverting a clock. Attention has to be paid on a point that the clock is inverted by this inverter 108f and then latched by the DFF 108c at the trailing edge of the clock.

Subsequently explained is the operation of the cold cathode tube driving device having the above-mentioned configuration shown in FIGS. 21 and 25. The operation will be explained centering on the feature of this embodiment.

The feature of the present embodiment is a technique for doubling the resolution in the pulse width of the driving pulse pzdrv by using the trailing edge of the clock.

A normal digital LSI is generally configured by a synchronous circuit in which a process from designing, proving to manufacturing is established. Therefore, such a synchronous circuit does not use a trailing edge of a clock that is an asynchronous processing. However, this asynchronous processing can relatively easily be proved immediately before an output pin of the LSI, so that the processing using the trailing edge can be executed at a final stage of the circuit.

Specifically, the duty value Vduty of the pulse width information outputted from the pulse width calculating means 107 is divided into high-order bits and low-order bits. The high-order bits of the duty value Vduty are used at a first stage to produce a pulse having a predetermined pulse width in the normal synchronous processing. Further, the low-order bits of the duty value Vduty are used at a second stage to increase the resolution by a process using the trailing edge of the clock. After the process of the second stage, the synchronous processing is not performed.

Figure 27:
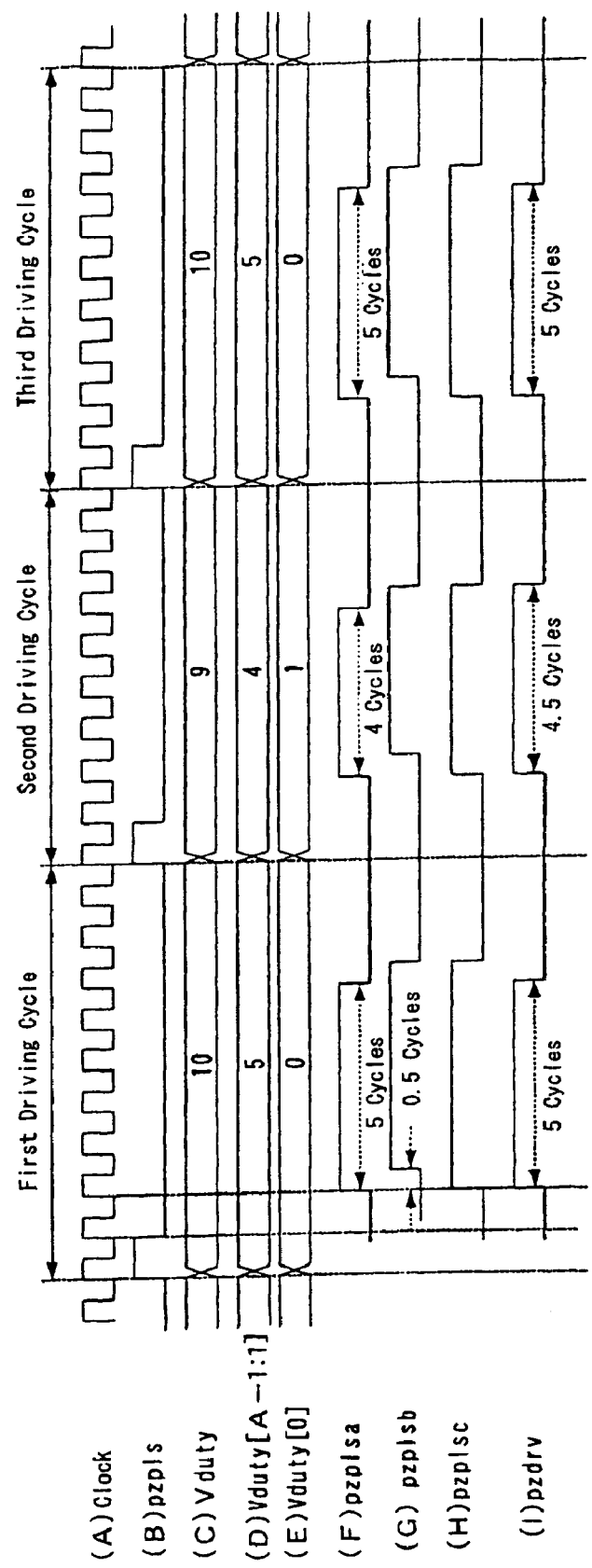
FIG. 27 is a timing waveform chart for explaining an operation of the pulse width adjusting means in the embodiment 4.

FIG. 27 shows waveforms for producing pulse widths in two stages. FIG. 27(A) shows a clock, (B) the distribution pulse pzpls from the frequency dividing means 105, (C) the duty value Vduty, (D) data Vduty[A-1:1] showing high-order (A-1)-bit of the duty value Vduty, and (E) the data Vduty[0] showing the least significant bit of the Vduty.

In case where the Vduty is 10, i.e., $(1010)_2$ in a binary notation, for example, the data Vduty[A-1:A] showing the high-order [A-1]-bit is $(101)_2$ that is 5, while the data Vduty[0] showing the least significant bit is $(0)_2$ that is 0. Further, in case where the Vduty is 9 that is $(1001)_2$ in the binary notation, the data Vduty[A-1:A] showing the high-order (A-1)-bit is $(100)_2$ that is 4, while the data Vduty[0] showing the least significant bit is $(1)_2$ that is 1.

In FIG. 27, (F) shows the initial pulse pzplsa that is obtained by latching the pulse outputted from the pulse width shaping means 108a at the leading edge of the clock, while (G) shows the pulse pzplsb that is obtained by latching the initial pulse pzplsa at the trailing edge of the clock.

Firstly, the first-stage pulse width producing process is performed at the pulse width shaping means 108a. The pulse width at this time is the Vduty[A-1:A] obtained by dividing the Vduty by 2 and discarding the decimals.

For example, the Vduty[A-1:A] is 5 when the Vduty is 10, while the Vduty[A-1:A] is 4 when the Vduty is 9.

The pulse width extending means 108g constituted by the DFF 108c and the OR gate 108d performs a process for extending the pulse width of the initial pulse pzplsa by 0.5 cycles of the clock. FIG. 27(H) shows the extended pulse pzplsc obtained by this process.

Subsequently, the selector 108e outputs the extended pulse pzplsc that is wider by 0.5 cycles when the value of Vduty[0] is 1, i.e., the discarded value is 1. On the other hand, the selector 108e outputs the initial pulse pzplsa when the value of Vduty[0] is 0, i.e., there is no discarded value (the discarded value is 0). By this process, the obtained driving pulse pzdrv has a pulse width according to the value of Vduty, such as a width of 5 cycles, a width of 4.5 cycles, and a width of 5 cycles as shown in FIG. 27(I). Specifically, when the Vduty is 10, the pulse width is 5 that is a half of the Vduty. Likewise, when the Vduty is 9, the pulse width is 4.5 that is a half of the Vduty. A round-off process is not performed, whereby the pulse width correctly corresponds to a half of the Vduty to thereby enhance the resolution.

This driving pulse pzdrv is outputted not via the synchronization circuit but directly from a pin, thereby not bringing a problem upon designing and proving a digital LSI.

As described above, the present embodiment can provide a pulse width resolution with a double precision by using a trailing edge of a clock without deviating from a designing technique of a digital LSI, whereby a driving pulse having an optimum pulse width can be obtained within a wide range of a power supply voltage even in a digital driving system. This leads to reduce a power consumption due to an improvement in efficiency and to prevent a break-down of an FET or piezoelectric transformer because of a surge upon driving the piezoelectric transformer, thereby bringing a great effect.

Although the above-mentioned embodiment utilizes a trailing edge of a clock, a delay element can be combined to be used.

Figure 28:
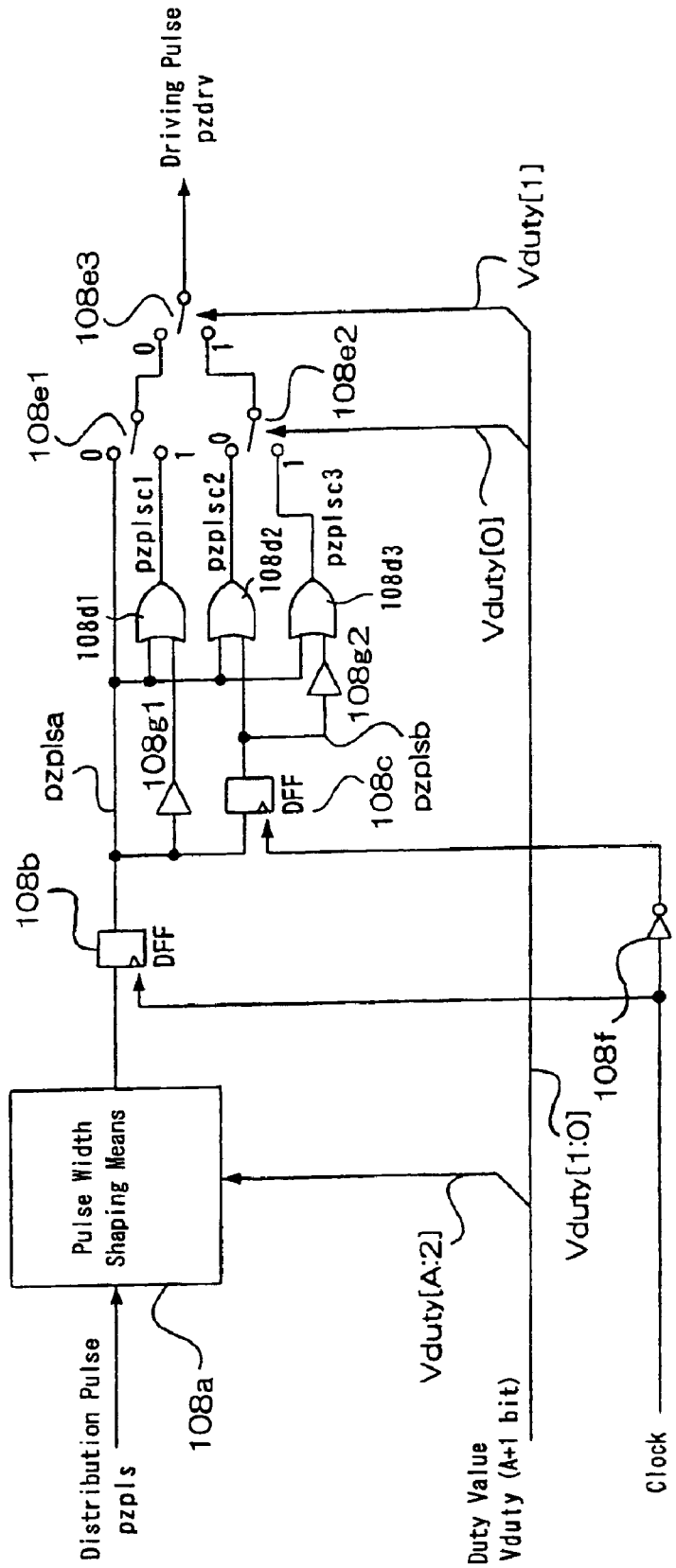
FIG. 28 is a circuit diagram showing another realized example of a pulse width adjusting means in the embodiment 4.

FIG. 28 shows an example of a pulse width adjusting means in which a delay element is used in combination with a method using the trailing edge of the clock.

In FIG. 28, numerals 108g1 and 108g2 denote delay elements. The delay amount of the delay elements is set to a fourth of one cycle of a clock. Numeral 108d1 to 108d3 denote OR gates, and 108e1 to 198e3 selectors. The other configurations are the same as those of the pulse width adjusting means shown in FIG. 25. In FIG. 25, the duty value Vduty is A-bit, Vduty[A-1:1] is inputted to the pulse width shaping means 108a and a fine adjustment of the pulse width is performed by using a trailing edge of a clock at Vduty[0]. On the other hand, in FIG. 28, the duty value Vduty is (A+1)-bit, Vduty[A:2] that is high-order (A-1)-bit is inputted to the pulse width shaping means 108a and a fine adjustment is performed at Vduty[1:0] that is low-order 2-bit of the duty value Vduty.

Figure 29:
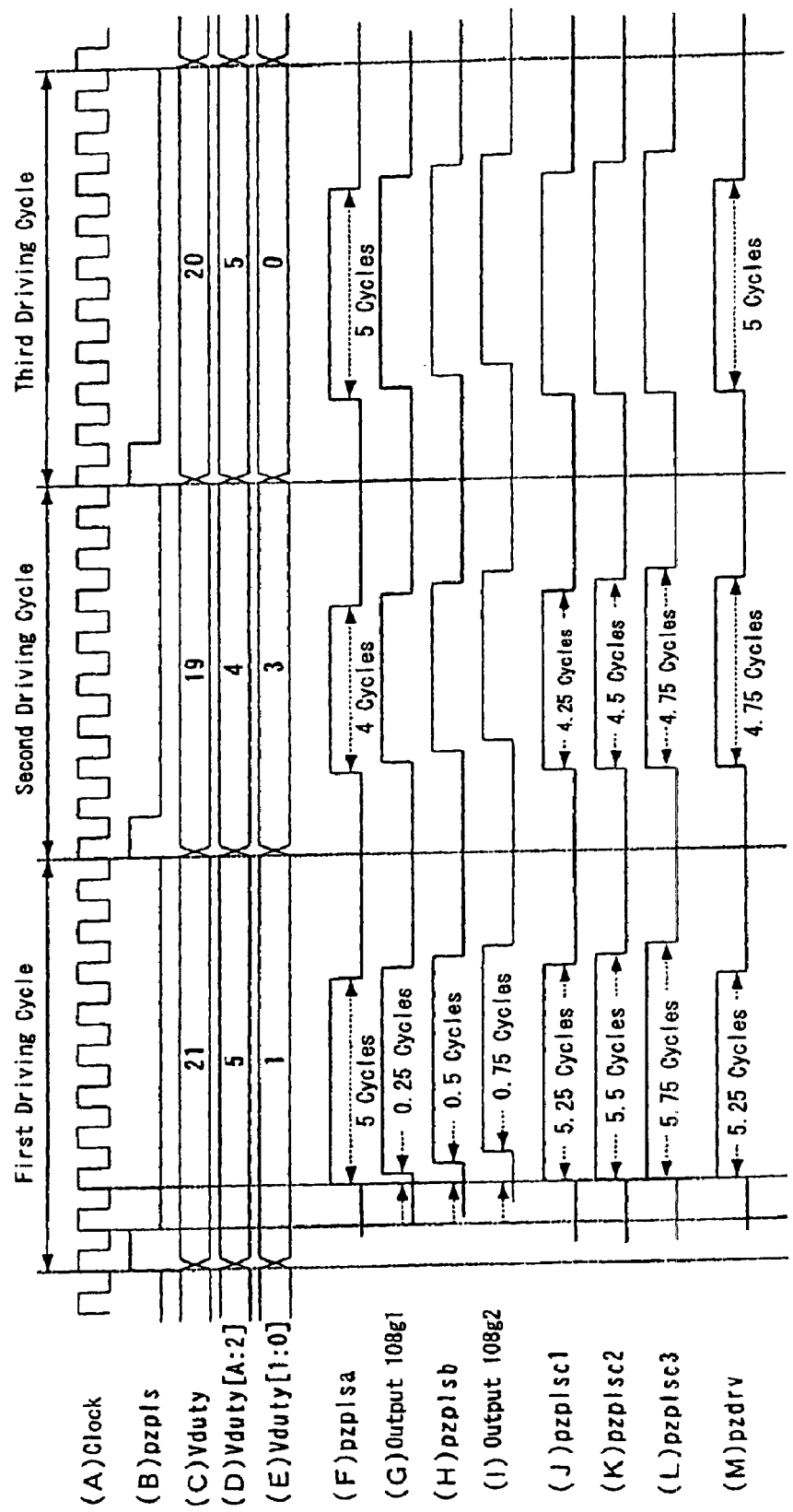
FIG. 29 is a timing waveform chart for explaining an operation of the pulse width adjusting means of the another realized example in the embodiment 4.

This will be explained below with reference to FIG. 29 showing timing waveform charts of each means.

In FIG. 29, (F) shows a pulse pzplsa latched at a leading edge of a clock at the pulse width shaping means 108a generating a driving pulse having a pulse width determined by the value of Vduty[A:2] and then outputted therefrom. This pulse is approximately the same as the one explained in the embodiment 4 with reference to FIG. 25. This pulse pzplsa is delayed by 1/4 cycles of a clock by the delay element 108g1, to thereby obtain a waveform shown in FIG. 29(G). FIG. 29(H) shows a pulse pzplsb obtained by latching the pulse pzplsa at a trailing edge of a clock. This pulse pzplsb is the same as the one explained in FIG. 25. Further, this pulse pzplsb is delayed by the delay element 108g2, whereby a signal shown in FIG. 29(I) delaying by 1/4 cycles of a clock with respect to the pulse pzplsb is obtained. These signals respectively pass through the OR gates 108d1 to 108d3, to thereby obtain three extended pulses pzplsc1, pzplsc2 and pzplsc3, the pulse widths of these pulses becoming gradually wider in this order in steps of a resolution of 1/4 clock cycles with respect to the initial pulse pzplsa as shown in FIGS. 29(J) to (L). The selectors 108e1 to 108e3 perform a change-over between the pulse pzplsa and pulses pzplsc1 to pzplsc3 in accordance with the value of Vduty [1:0] and outputs the resultant to the FET 3. When the Vduty[1:0] is 0, the pulse pzplsa having the narrowest pulse width is selected. When the Vduty[1:0] is 1, the pulse pzplsc1 having the second narrowest pulse width is selected. When the Vduty[1:0] is 2, the pulse pzplsc2 having the third narrowest pulse width is selected. When the Vduty[1:0] is 3, the pulse pzplsc3 having the widest pulse width is selected. FIG. 29(M) shows a driving pulse pzdrv outputted to the FET 3.

Specific examples are illustrated below. When Vduty= $21=(10101)_2$, Vduty[A:2]=$(101)_2$=5 and Vduty[1:0]=$(01)_2$=0. The cycle of the driving pulse pzdrv is 5.25 cycles at this time, that is just equal to the value obtained by dividing 21 by 4. Further, When Vduty=20=$(10100)_2$, Vduty[A:2]=$(101)_{2\,=5}$ and Vduty[1:0]=$(00)_2$=0. The cycle of the driving pulse pzdrv is 5 cycles at this time, that is just equal to the value obtained by dividing 20 by 4. Further, When Vduty= $19=(10011)_2$, Vduty[A:2]=$(100)_2$=4 and Vduty[1:0]=$(11)_2$=3. The cycle of the driving pulse pzdrv is 4.75 cycles at this time, that is just equal to the value obtained by dividing 19 by 4. Although not shown in the figure, when Vduty 18 $(10010)_2$, Vduty[A:2]=$(100)_2$=4 and Vduty[1:0]=$(10)_2$=2. The cycle of the driving pulse pzdrv is 4.5 cycles at this time, that is just equal to the value obtained by dividing 18 by 4.

The configuration shown in FIG. 28 provides, in addition to the enhancement in the resolution of pulse width by using a trailing edge of a clock, the resolution double the former resolution by using the delay elements 108g1 and 108g2 that delay a pulse by 1/4 cycles of a clock. Therefore, this configuration can provide a resolution having a fourfold precision, thereby enabling a control of pulse width with higher precision.

The method using the delay element needs the following attentions. The delay cycle generally varies depending upon a temperature or power supply voltage. Therefore, uniform resolution cannot be obtained when a temperature or power supply voltage varies. For example, the delay cycle may vary like "0.1", "0.5", "0.6", "1.0", . . . that must originally be varied like "0.25", "0.5", "0.75", "1.0", . . . .

The delay amount of the delay element is set to 1/4 cycles of a clock in this technique. However, when the clock frequency changes, the delay amount does not change in synchronization with this change. Accordingly, the following processes are required such that the delay element is used with a fixed clock frequency, or a plurality of delay elements are provided and switched over between them depending upon the clock frequency.

Although there are the above-mentioned restrictions in the method using the delay element, it assuredly enhances the resolution. Therefore, this method is effective for the case where a sufficient effect cannot be obtained by using the trailing edge of the clock.

The method using the trailing edge of a clock can provide a uniform resolution even if conditions are changed, since the delay amount does not change depending upon a temperature or power supply voltage in this method.

Although FIG. 28 shows an example obtained by combining a process by a trailing edge of a clock with a delay element, a configuration using only a delay element, not using a trailing edge of a clock can provide an effect, since the process by the trailing edge of a clock has the same function as the delay element.

Each element such as the averaging means 102a, error voltage calculating means 103, frequency setting means 104, frequency dividing means 105, pulse width calculating means 107 and pulse width adjusting means 108 may be achieved by a hardware or software or by a hybrid structure in combination with a hardware and software.

Embodiment 5

Subsequently explained is a cold cathode tube driving device according to an embodiment 5 of the invention. The embodiments shown in FIGS. 25 and 28 are effective to produce a pulse width having high resolution. However, they cannot be utilized as they are in case where the dividing ratio utilizes a trailing edge of a clock to enhance the resolution of the driving frequency as disclosed in Japanese Unexamined Patent Publication No. 2000-139081 (Document 4). Accordingly, the present embodiment provides a technique capable of effectively enhancing the resolution in a pulse width of a driving pulse even in case where the dividing ratio utilizes a trailing edge of a clock.

Figure 30:
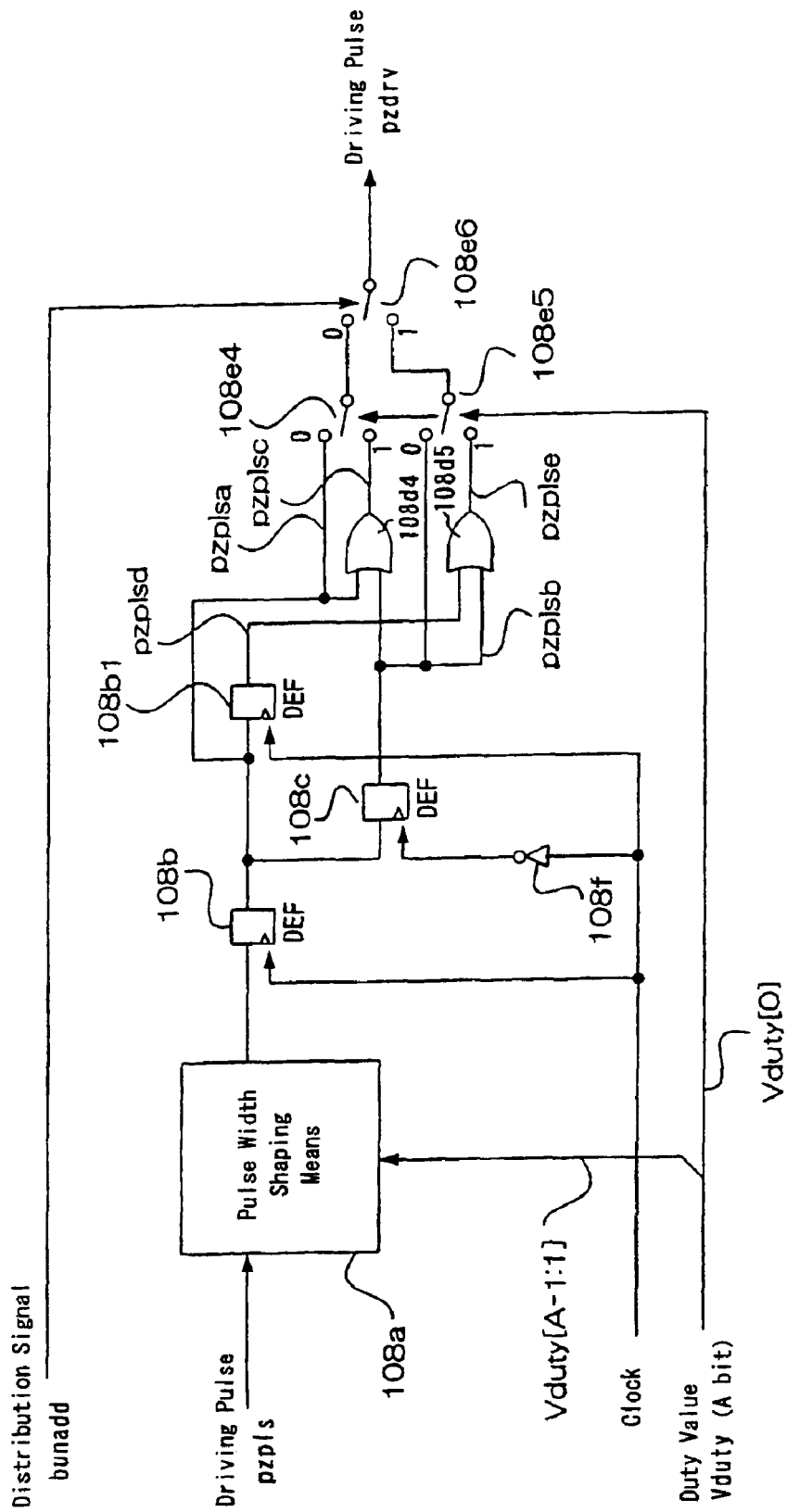
FIG. 30 is a block diagram showing a configuration of a pulse width adjusting means of a cold cathode tube driving device according to an embodiment 5 of the invention.

FIG. 30 is a block diagram showing a configuration of a pulse width adjusting means of a cold cathode tube driving device in the embodiment 5 of the invention. The configurations other than the pulse width adjusting means are the same as those shown in FIG. 21.

In FIG. 30, numeral 108b1 denotes a DFF that latches an initial pulse pzplsa outputted from a DFF 108b at a leading edge of a clock and then outputs the same, numerals 108d4 and 108d5 are OR gates, numeral 108e4 denotes a selector that outputs an output signal of the OR gate 108d4 when Vduty[0] is 1, while outputs the initial pulse pzplsa when it is 0, numeral 108d5 denotes a selector that outputs an output signal of the OR gate 108d5 when Vduty[0] is 1, while outputs an extended pulse pzplsb when it is 0, and numeral 108e6 denotes a selector that outputs an output signal of the selector 108e5 when a signal (hereinafter referred to as bunadd that will be explained in detail later) sent from the frequency dividing means 105 is 1, while outputs an output signal of the selector 108e4 when it is 0.

Upon explaining the operation of this embodiment, a method for enhancing the resolution by a process in which the frequency dividing ratio utilizes a trailing edge of a clock will briefly be explained, since it is important.

Figure 50:
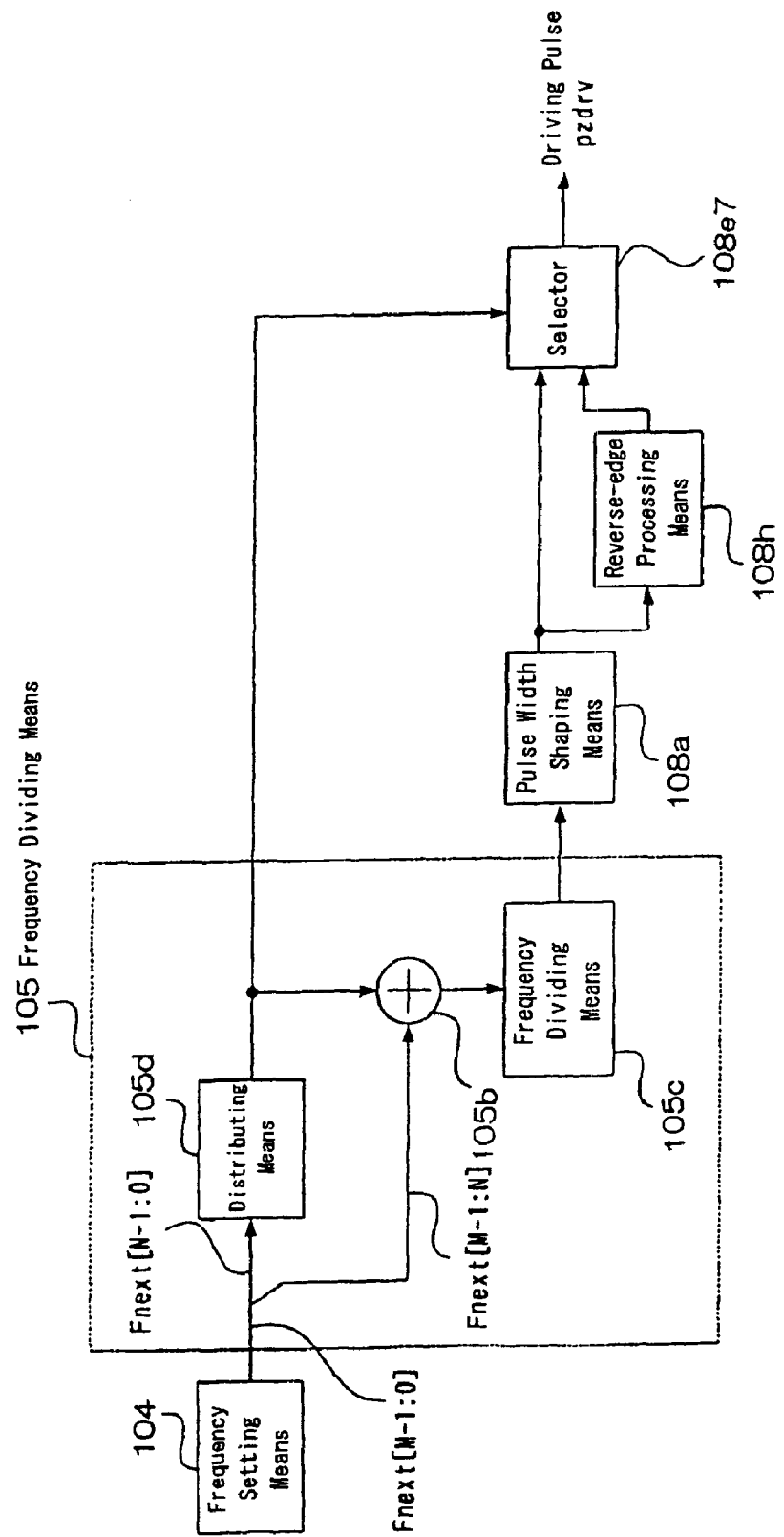
FIG. 50 is a block diagram realizing a high resolution of a frequency dividing ratio in the conventional digital-type cold cathode tube driving device.

FIG. 50 shows a configuration of a system for enhancing a frequency resolution of a driving pulse by using a trailing edge of a clock disclosed in the Document 4 (Japanese Unexamined Patent Publication No. 2000-139081). Numeral 105a denotes a distributing means that inputs low-order N-bit data among the frequency data Fnext outputted from the frequency dividing means 105a and outputs 1 the times applied at Fnext[N−1:0] during cycle of nth root of 2 of a driving pulse. The timing that the distributing means 105d outputs 1 is determined by a separately established distribution technique, that is not especially explained since it is out of the purpose of the invention.

Numeral 105b denotes an adder that adds Fnext[M−1:N] to the output signal from the distributing means 105d and outputs the resultant. Since the output from the distributing means 105d is either 1 or 0, all outputs from the adder 105b are only Fnext[M−1:N] or Fnext[M−1:N]+1. Numeral 105c denotes a frequency dividing means that divides a clock only by a value shown by the output signal from the adder 105b. These components 104a, 105b and 105c constitute the frequency dividing means 105.

Numeral 108a is the pulse width adjusting means (pulse width decoding means) explained in the embodiments shown in FIGS. 25 and 28. Although the pulse width adjusting means 108a is included in the frequency dividing means 105c in the Document 4, it is separated from the frequency dividing means for the sake of the convenience. Numeral 108h denotes a reverse-edge processing means that latches the output signal from the pulse width shaping means 108a at the trailing edge of the clock and outputs the resultant. Although the Document 4 refers the trailing edge of a clock as a reverse edge, the meanings of them are the same. The specific configuration of the reverse-edge processing means 108h is the same as that of the DFF 108c in FIG. 25. Numeral 108e7 denotes a selector that outputs an output signal from the reverse-edge processing means 108h when the value of the distributing means 105d is 1, while outputs an output signal from the pulse width shaping means 108a when it is 0. The output signal from the selector 108e7 becomes a driving pulse pzdrv. In this configuration, the output signal from the distributing means 105d is the distribution signal bunadd in the embodiment shown in FIG. 30.

Figure 51:
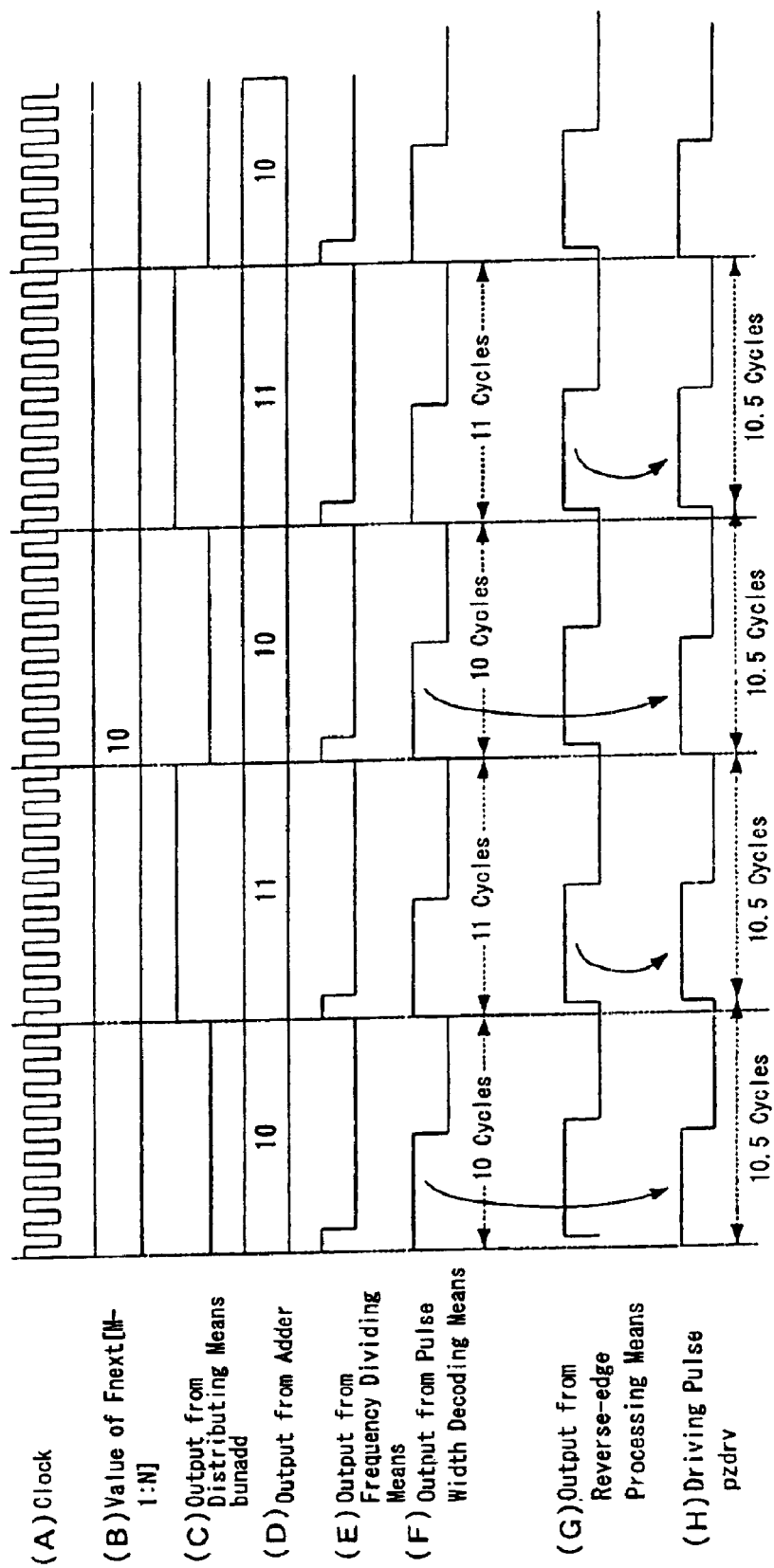
FIG. 51 is a waveform chart for explaining an operation for achieving a high resolution of a frequency dividing ratio in the conventional digital-type cold cathode tube driving device.

FIG. 51 shows a timing waveform chart briefly showing the operation for enhancing the resolution in the dividing ratio by the clock reverse-edge processing shown in the Document 4. FIG. 51 shows a state where the frequency data Fnext[M−1:N] (shown in (B)) outputted from the frequency setting means 104 is added to the output value (shown in (C)) from the distributing means 105d in which the added value becomes the frequency dividing ratio (shown in (D)), and a pulse is outputted from the frequency dividing means 105c (shown in (D)).

The frequency of the driving pulse adjusted to have a suitable pulse width by the pulse width shaping means 108a has a resolution every one cycle of a clock such as 10 cycles, 11 cycles, 10 cycles, 11 cycles, . . . shown in (F).

The driving pulse is delayed by 0.5 cycles by the reverse-edge processing means 108h and the selector 108e7 at the time when the distribution signal bunadd that is the output from the distributing means 105d is 1, whereby this driving pulse is converted into a driving pulse having a resolution of every 0.5 cycles shown in (H). The point of this technique is that, only by delaying the driving pulse by 0.5 cycles in synchronization with the distributing means 105d when the output from the distributing means 105d is 1, this driving pulse can be converted into a driving pulse having a resolution of 0.5-cycle steps.

Subsequently explained is a method for combining this technique with the method for enhancing the pulse width resolution using a trailing edge of a clock shown in the above-mentioned embodiment.

Figure 31:
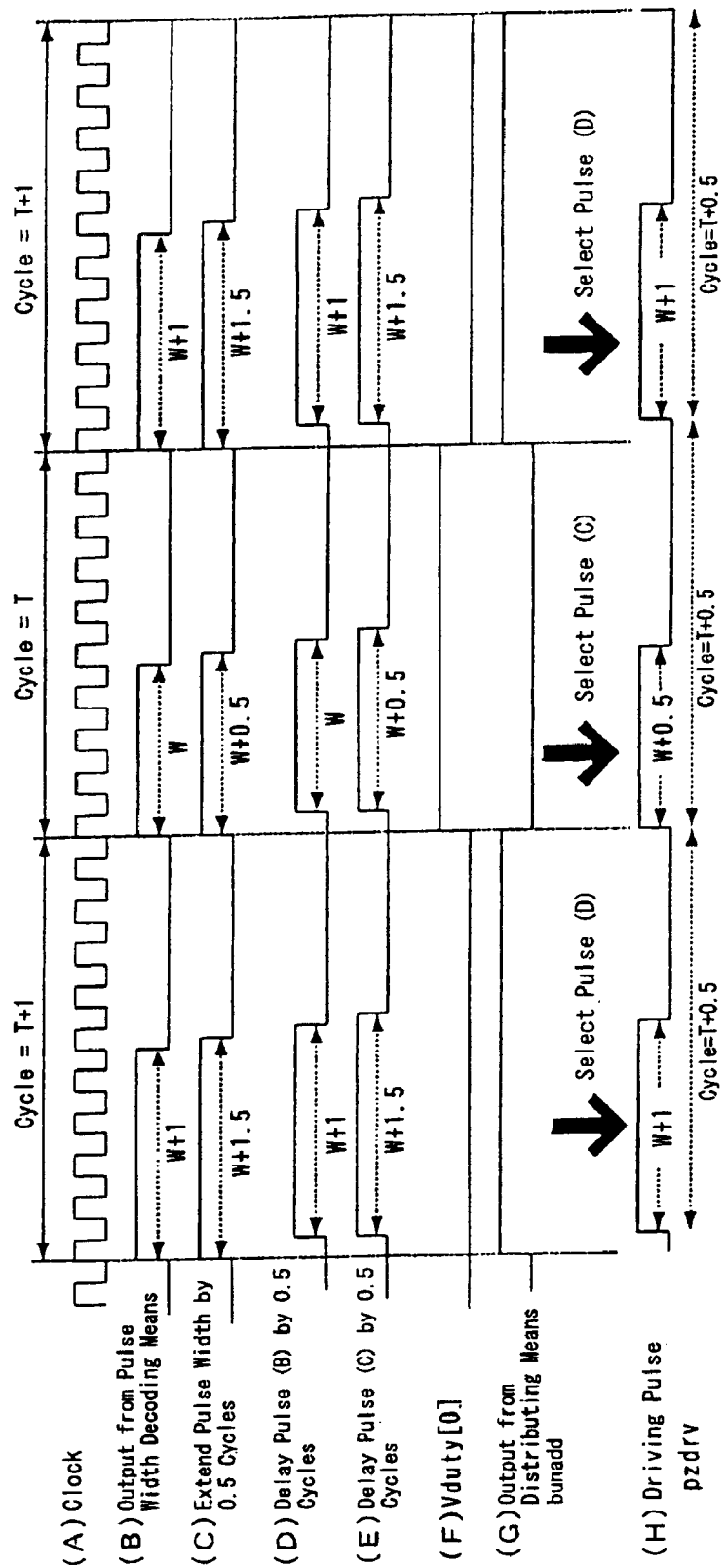
FIG. 31 is a timing chart for explaining an operational concept of the cold cathode tube driving device according to the embodiment 5.

Prepared at first are, as shown in FIG. 31, a pulse (shown in (C)) having a pulse width obtained by extending by 0.5 cycles of a clock the pulse width of the driving pulse having a pulse width W and pulse width W+1 (this pulse is outputted from the pulse width shaping means 108a and shown in FIG. 31(B)), and pulses obtained by delaying these two pulses respectively by 0.5 cycles (shown in (D) and (E)).

When the Vduty[0] shown in FIG. 30 is 1, the pulse having the pulse width extended by 0.5 cycles is selected. In other words, the pulse shown in (C) or (E) is selected. When the Vduty[0] is 0, the pulse shown in (B) or (D) is contrarily selected. This logic is as stated in the embodiment shown in FIG. 25.

When the distribution signal bunadd that is the output from the distributing means 105d is 1, the driving pulse delayed by 0.5 cycles is selected. In other words, the pulse shown in (D) or (E) is selected. When the bunadd signal is 0, the pulse shown in (B) or (C) is contrarily selected. The above-mentioned logic is arranged as follows.

(1) When Vduty=0 and bunadd=0, the output from the pulse width shaping means 108a is outputted as it is (see FIG. 31(B)).

(2) When Vduty=0 and bunadd=1, the output from the pulse width shaping means 108a is outputted by delaying by 0.5 cycles (see FIG. 31(D)).

(3) When Vduty=1 and bunadd=0, the output from the pulse width shaping means 108a is outputted by extending by 0.5 cycles (see FIG. 31(C)).

(4) When Vduty=1 and bunadd=1, the output from the pulse width shaping means 108a is outputted by extending by 0.5 cycles as well as by delaying by 0.5 cycles (see FIG. 31(E)).

The pulse width adjusting means shown in FIG. 30 is configured on this logic. Specifically, the initial pulse pzplsa outputted from the DFF 108b corresponds to the pulse shown in FIG. 31(B), the extended pulse pzplsc outputted from the OR gate 108d4 corresponds to the pulse shown in FIG. 31(C), the delayed pulse pzplsb outputted from the DFF 108c corresponds to the pulse shown in FIG. 31(D) and the delayed and extended pulse pzplse outputted from the OR gate 108d5 corresponds to the pulse shown in FIG. 31(E). The selectors 108e4 to 108e6 are for performing a change-over and output on the above-mentioned logic.

By this configuration, the driving pulse shown in FIG. 31(H) can be obtained, to thereby be capable of achieving both an enhancement in a pulse width resolution by utilizing a trailing edge of a clock and an enhancement in a frequency resolution of a driving pulse.

As explained above, even in case where the frequency dividing ratio of the driving pulse has already aimed to enhance the precision by using the trailing edge of a clock, the cold cathode tube driving device of this embodiment can finely adjust the pulse width of the driving pulse by effectively using the trailing edge of a clock without hindering the effect of this case, to thereby obtaining an optimum pulse width in accordance with a power supply voltage. This configuration can bring a highly efficient driving (reduced power consumption). Further, this technique is not deviated from a designing rule of a digital LSI, so that there is no special problem occurring on making the device as an LSI. Therefore, the device of the invention can be provided as a cheap digital LSI.

Embodiment 6

A cold cathode tube driving device according to an embodiment 6 of the invention will be explained below. This embodiment provides a system capable of further enhancing a resolution in pulse width control. The adjustment in pulse width of a driving pulse is desirably performed with a resolution set as small as possible. More preferably, a desirable resolution is the one with which the adjustment can be performed in a minimum of 0.1-V steps of a power supply voltage. As already explained in the subjects taking specific examples, obtaining a resolution in about 0.1-V steps within 5 V to 10 V of the power supply voltage requires a resolution of 50 in this range. If the duty is intended to be changed by 20 to 30% in this range, the duty has to be changed in 0.2-% steps.

If the sensitivity to the efficiency to the duty value is less so as to be neglected, a small resolution is naturally all right. The resolution in the embodiment shown in FIG. 25 is in 0.5-% steps of duty (resolution in the case of producing a driving pulse by 100-dividing), while the resolution of the configuration utilizing a delay element shown in FIG. 28 is in 0.25-% steps. There may be a case that such resolution is insufficient. The resolution enhances when the delay amount of the delay element is set not to 1/4 cycles but to less cycle in FIG. 28, but there is a limit considering the non-uniform delay amount due to a temperature characteristic or power supply voltage.

Figure 32:
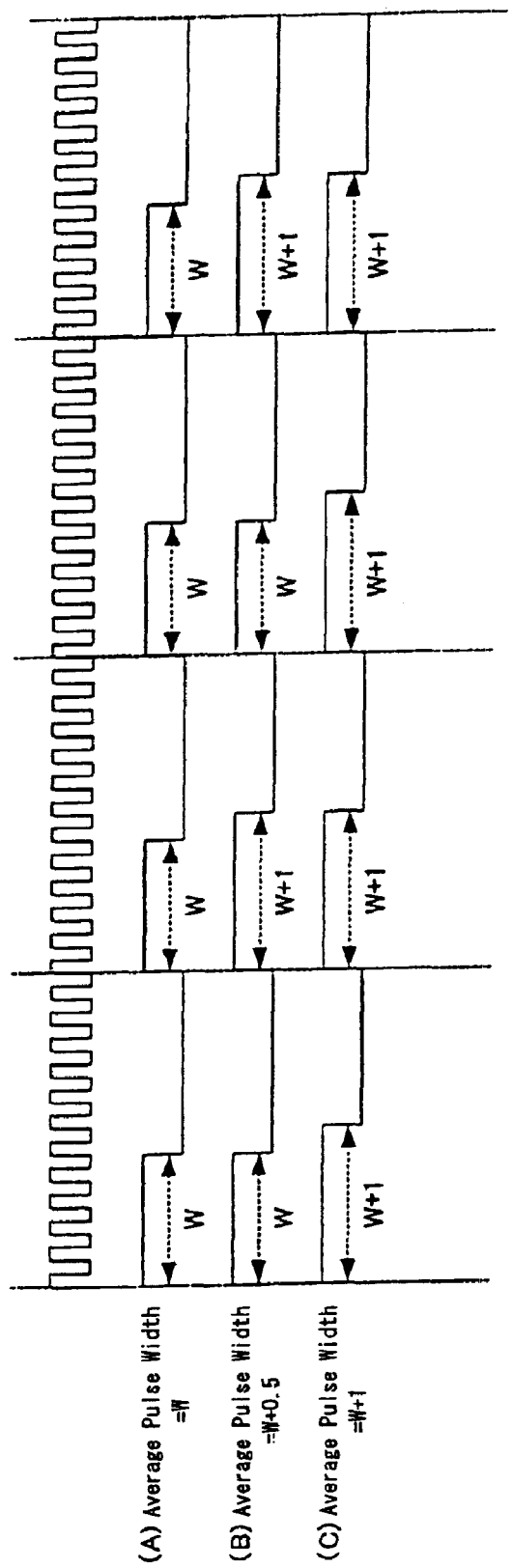
FIG. 32 is a waveform chart showing a principle of the cold cathode tube driving device in the embodiment 5.

In view of this, the present embodiment provides a method that adopts a frequency distribution method disclosed in the Document 1 (Japanese Unexamined Patent Publication No. 2000-133485) for enhancing a resolution by increasing a dummy resolution of a duty ratio by distributing a duty ratio as shown in FIG. 32. It is to be noted that, since the frequency dividing ratio of a driving pulse is already distributed in a digital system, a uniform waveform cannot be obtained by simply distributing the duty ratio, to thereby not obtaining a sufficient efficiency. The point of this embodiment is that, even in case where a frequency dividing ratio of a driving pulse is already distributed, a distribution of a pulse width is effectively incorporated therein.

Figure 33:
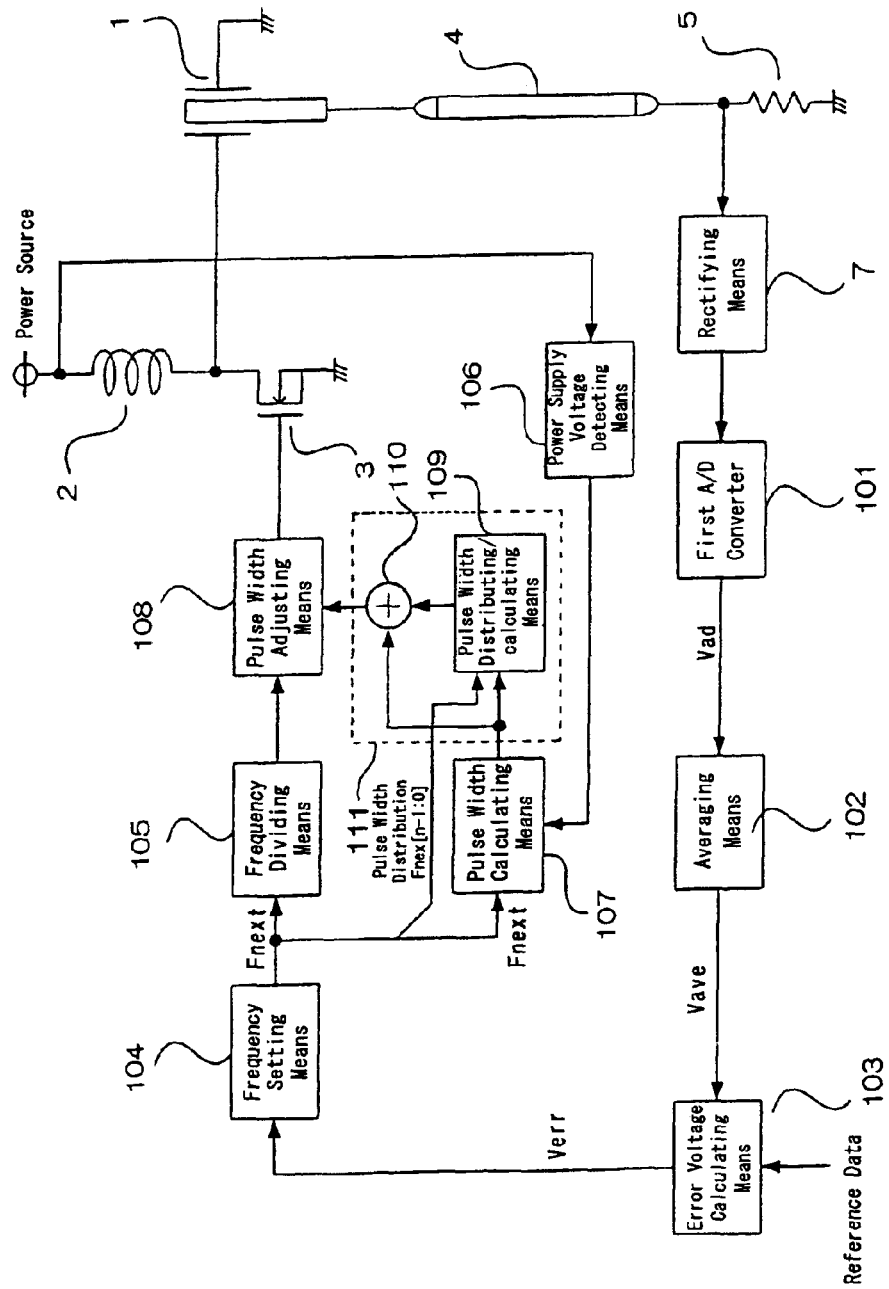
FIG. 33 is a block diagram showing a configuration of a cold cathode tube driving device according to an embodiment 6 of the invention.

The method of the embodiment will be explained below. FIG. 33 is a block diagram showing a configuration of a cold cathode tube driving device according to an embodiment 6 of the invention.

In FIG. 33, numeral 109 denotes a pulse width distributing/calculating means that inputs Vduty[n-1:0] that is low-order n-bit of the Vduty outputted from the pulse width calculating means 107 and Fnext[n-1:0] that is low-order n-bit of the Fnext outputted from the frequency setting means 104 and outputs 1 the times applied by Vduty[n-1:0] at nth root of 2 of a driving pulse.

For example, in case n=4 and Vduty[n-1:0]=1, it outputs 1 only once during 16 cycles of a driving pulse. In this case, there are 16 positions to which 1 is outputted (in case where 1 is outputted at the first cycle to in case where 1 is outputted at 16th cycle). The output position is an important point of the present invention, so that it will be explained in detail below. The value of n is a distribution number of a driving pulse.

Numeral 110 denotes an adder that adds the value of Vduty[A-1:n] of the A-bit output Vduty outputted from the pulse width calculating means 107 to the output value from the pulse width distributing/calculating means 109 and outputs the added value to the pulse width adjusting means 108. The output value from the adder 110 is pulse width data. The pulse width distributing/calculating means 109 and the adder 110 constitute the pulse width distributing means 111. The other configurations and operations are the same as those in the embodiment 4 shown in FIG. 21. It is to be noted here that, for simplifying the explanation, the pulse width adjusting means 108 is simply configured by the pulse width shaping means 108a so that the attempt to enhance a resolution by using a trailing edge of a clock is not performed. Specifically, the output value from the adder 110 becomes a pulse width as it is. In the present embodiment, the device is configured such that the output from the distributing means 105d (corresponding to a dividing ratio distributing means in claims) of the frequency dividing means 105 at $(P_0 \cdot 2^0 + P_1 \cdot 2^1 + \ldots + P_{n-1} \cdot 2^{n-1}$ (wherein $P_X$ is a numerical value of 0 or 1))th cycle becomes $P_0 \cdot Q_{n-1} + \_P_0 \cdot P_1 \cdot Q_{n-2} + \ldots + \_P_0 \cdot P_1 \ldots \_P_{n-2} \cdot P_{n-1} \cdot Q_0$ (wherein $\_P_X$ denotes the inversion of $P_X$) from the low-order n-bit data $(Q_0 \cdot 2^0 + Q_1 \cdot 2^1 + \ldots + Q_{n-1} \cdot 2^{n-1}$ (wherein $Q_X$ is a numerical value of 0 or 1)) among M-bit data outputted from the frequency setting means 104 during nth root of 2 of a driving pulse of a piezoelectric transformer. A formula representing this distribution is defined as formula 1.

Figure 34:
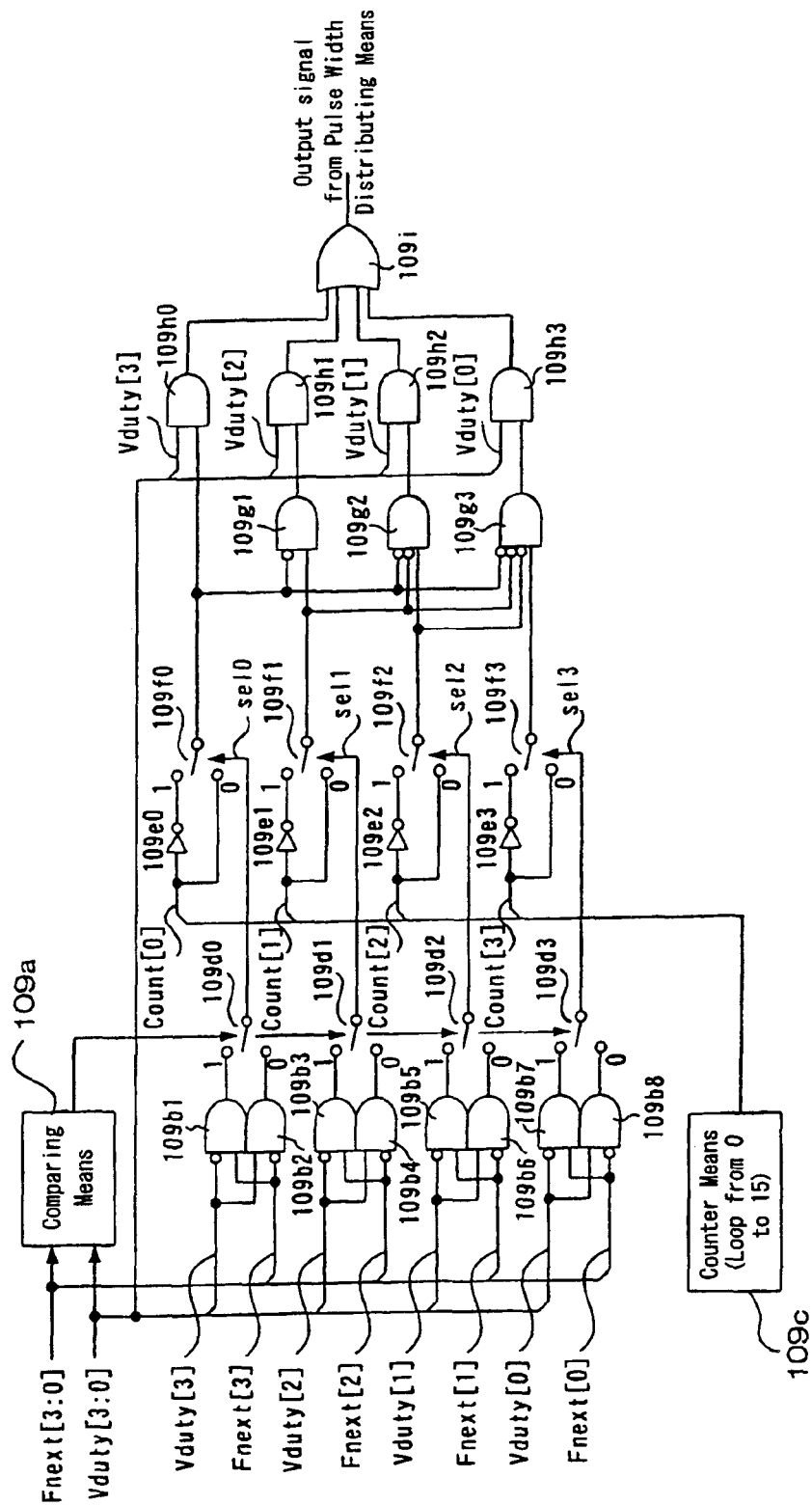
FIG. 34 is a circuit diagram showing a realized example of pulse width distributing/calculating means in the embodiment 6.

The specific configuration of the pulse width distributing/calculating means 109 that is the point of the invention is shown in FIG. 34. FIG. 34 shows a block diagram in case where n is 4. In FIG. 34, numeral 109a denotes a comparing means that compares low-order n-bit data (referred to as Fnext[3:0] since n=4) of the data Fnext outputted from the frequency setting means 104 with low-order n-bit data (referred to as Vduty[3:0] since n=4) of the data Vduty outputted from the pulse width calculating means 107 and outputs 1 when Fnext[3:0]≧Vduty[3:0]. Numerals 109b1 to 109b8 denote AND gates each having a negative logic input. Numeral 109c denotes a counter means that counts a number of driving pulses outputted from the frequency dividing means 105. This counter means is configured to count from 0 to $2^n-1$. Since n=4, it is a 4-bit counter for repeatedly counting from 0 to 15. The output from the 4-bit counter is represented by Count here, and sth bit signal of the Count is represented by Count [s]. Numeral 109d0 denotes a selector that selects the output from the AND gate 109b1 when the output from the comparing means 109a is 1, while selects the output from the AND gate 109b2 when the output from the comparing means 109a is 0. Numerals 109d1 to 109d3 denote selectors performing similar operations. Numeral 109e0 denotes an inverter for inverting the Count[0]. Numerals 109e1 to 109e3 are inverters performing the same operations. Numeral 109f0 denotes a selector that selects the output from the inverter 109e0 when the output from the selector 109d0 is 1 while selects the Count[0] when 0. Numerals 109f1 to 109f3 are selectors performing the same operations. Numeral 109g1 to 109g3 denote AND gates each having negative logical input, numerals 109h0 to 109h3 denote AND gates and 109e OR gate.

The circuit operation shown in FIG. 34 is illustrated as follows. When the output from the dividing ratio distributing means is represented by the formula 1, this circuit is configured such that the output from the pulse width distributing/calculating means 109 at $(P_0 \cdot 2^0 + P_1 \cdot 2^1 + \ldots + P_{n-1} \cdot 2^{n-1}$ (wherein $P_X$ is a numerical value of 0 or 1))th cycle becomes $S_0 \cdot R_{n-1} + \_S_0 \cdot S_1 \cdot R_{n-2} + \ldots + \_S_0 \cdot S_1 \ldots \_S_{n-2} \cdot S_{n-1} \cdot R_0$ (wherein $\_S_X$ denotes the inversion of $S_X$, in which $S_X = (Q_{n-1-X} \cdot \_R_{n-1-X}) \cdot \_P_X + \_Q(Q_{n-1-X} \cdot \_R_{n-1-X}) \cdot P_X$ when low-order n-bit data among the M-bit data of the frequency dividing ratio is greater than low-order n-bit data of the A-bit pulse width information, while $S_X = (\_Q_{n-1-X} \cdot R_{n-1-X}) \cdot \_P_X + \_(\_Q_{n-1-X} \cdot R_{n-1-X}) \cdot P_X$ when the low-order n-bit data among the M-bit data of the frequency dividing ratio is smaller than low-order n-bit data of the A-bit Vduty) from the low-order n-bit data $(R_0 \cdot 2^0 + R_1 \cdot 2^1 + \ldots + R_{n-1} \cdot 2^{n-1}$ (wherein $R_X$ is a numerical value of 0 or 1)) of the A-bit output Vduty.

Figure 35:
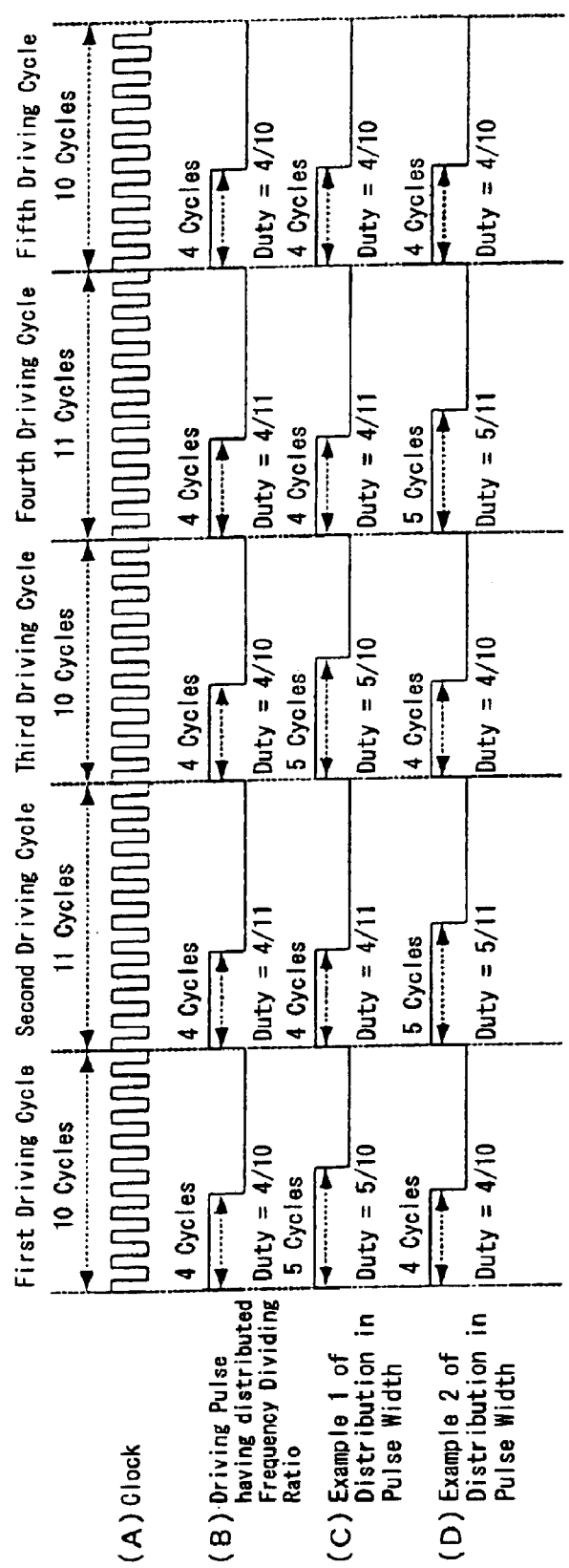
FIG. 35 is a waveform chart for explaining a distribution technique of the pulse width distributing/calculating means in the embodiment 6.

Before explaining the circuit operation shown in FIG. 34, the basic idea of the present invention will be explained, and then, the explanation is made the way the circuit shown in FIG. 34 functions in order to realize this idea. FIG. 35 shows a waveform of a driving pulse for explaining the point of the invention.

FIG. 35(B) shows an example of the driving pulse having a distributed frequency dividing ratio. The frequency dividing ratio of the first driving cycle is 10, the frequency dividing ratio of the second driving cycle is 11, the frequency dividing ratio of the third driving cycle is 10, the frequency dividing ratio of the fourth driving cycle is 11, and the frequency dividing ratio of the fifth driving cycle is 10. The average frequency dividing ratio of 5 cycles of the driving pulse is 10.4. Further, the pulse width in the waveform (B) is not distributed but fixed to 4 cycles. In this case, the duty value of 4/10 and 4/11 are present in each driving cycle. FIG. 35(C) and FIG. 35(D) show examples of the case where the pulse width in only 2 cycles is extended by 1 cycle during 5 cycles of the driving pulse.

The example of (C) illustrates the case where the pulse width is extended by 1 cycle at the first and third driving cycles. In this case, there are duty values of 4/10, 5/10 and 4/11, apparently not showing a uniform duty compared to the case of (B).

The example of (D) illustrates the case where the pulse width is extended by 1 cycle at the second and fourth cycles. In this case, the duty values are 5/11 and 4/10, showing a uniform duty compared to the case of (C).

In case where the pulse width is distributed to obtain a resolution at the average pulse width, the pulse width may be extended by 1 cycle at the driving cycle wherein the frequency dividing ratio is made greater by 1 cycle for preventing the non-uniformity to obtain a duty ratio as uniform as possible. Specifically, the pulse width may be extended at the second and fourth driving cycles that are 11 cycles in the example shown in FIG. 35. It is needless to say that either case can afford an effect for improving a resolution due to the pulse width distribution, but the distribution in (D) is desirable for obtaining a greater effect. The first point of this embodiment is that the cycle in which the pulse width is extended by 1 cycle is selected among the cycles in which the frequency dividing ratio is made greater by 1 cycle when the pulse width is distributed.

In case where the frequency dividing ratio of the driving pulse is distributed based upon the formula 1, the pulse width may not simply be distributed based upon the same formula, but some idea is required. This is the second point of the present invention.

Figure 36:
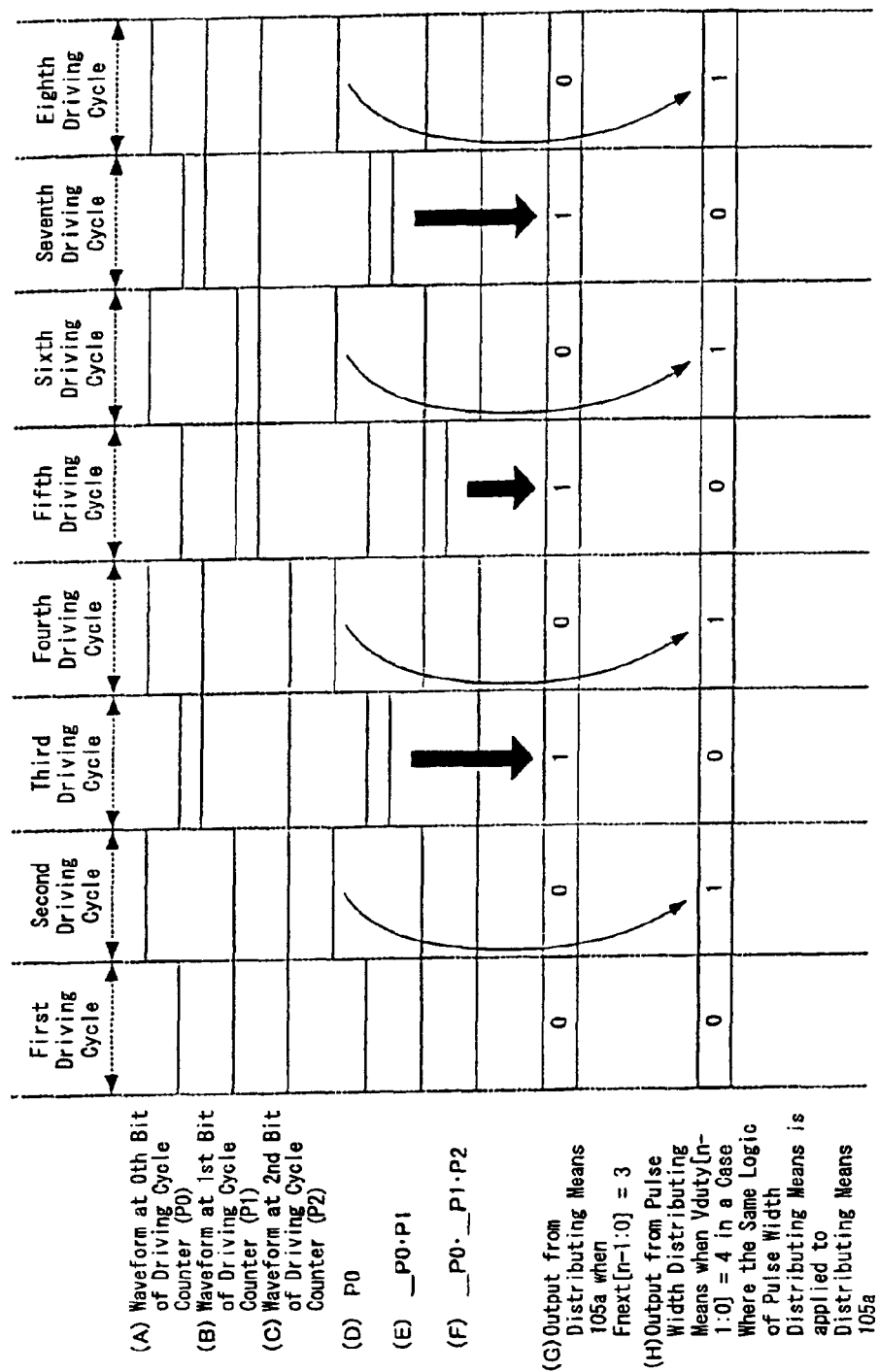
FIG. 36 is a waveform chart showing a first distribution example of the pulse width distributing/calculating means in the embodiment 6.

FIG. 36 shows an example of the case where the pulse width is distributed by the same system (system of the formula 1), wherein n=3 (i.e., distributing during 8 cycles of the driving pulse), Fnext[n-1:0]=3 (i.e., the frequency dividing ratio is made great by 1 cycle at 3 cycles among 8 cycles of the driving pulse), and Vduty[n-1:0]=4 (i.e., the pulse width is extended by 1 cycle at 4 cycles among 8 cycles of the driving pulse).

In FIG. 36, (A) to (C) show output waveforms of the counters (not shown) counting the cycle of the driving pulse, wherein (A) corresponds to $P_0$ in the formula 1, (B) corresponds to $P_1$ and (C) corresponds to $P_2$. (D) to (F) in FIG. 36 show each coefficient of $Q_X$ in the formula 1.

FIG. 36(G) shows the output (solution obtained from the formula 1) from the distributing means 105d. In case where Fnext[n-1:0]=3 (that is 011 in binary notation so that $Q_2=0$, $Q_1=1$ and $Q_{0=1}$ in the formula 1), the logical sum of (E) and (F) is shown in (G). Further, in case where the distribution of the pulse width is performed with the same logic, the pulse width is distributed as shown in FIG. 36(H) when Vduty[n-1:0]=4 ($Q_2=1$, $Q_1=0$ and $Q_0=0$). In this way, even if both distribution logics are the same, the cycle wherein the pulse width is extended by 1 cycle by the distribution of the pulse width is not always selected priorly from the cycles where the frequency dividing ratio is made great by 1 cycle.

The present invention avoids this problem by the following technique. This technique is firstly explained in the case where Fnext[n-1:0]≧Vduty[n-1:0]. Considering the case where n=4, Fnext[3:0]=11 (1011 in binary notation) and Vduty[3:0]=5 (0101 in binary notation). FIGS. 37(A) to 37(D) show waveforms of the counters counting the cycle of the driving pulse like those shown in FIGS. 36(A) to 36(C).

The cycles where the frequency dividing ratio is made greater by 1 cycle are shown by · marks in (E) to (H), when Fnext[3:0]=11. Since the value of Vduty[3:0] is 5 (0101), the pulse width is extended by 1 cycle at the positions marked by Δ in FIGS. 37(E) to 37(F) when the distribution is the same as the distribution of the frequency dividing ratio. On the other hand, if the value of $P_0$ is inverted as shown in FIGS. 37(I) to 37(L), the pulse width is extended by 1 cycle at the positions marked by Δ in FIGS. 37(I) to 37(L), that match to the distribution positions of the frequency dividing ratio (the positions where the frequency dividing ratio is made greater by 1 cycle is referred to as the distribution position below). This is apparent since the distribution is always executed at $P_0$=0 of the waveform shown in FIG. 37(A) in case where Vduty[3:0] is 7 or below. In this case, $P_0$ may be inverted. On the other hand, the value of $P_1$ is inverted when Fnext[3:0]=14 (1110) and Vduty[3:0]=10 (1010), for example. Specifically, since the most significant bit of Fnext [3:0] and the most significant bit of Vduty[3:0] are both 1, the distribution positions match with each other with respect to this means. The remaining each bit is compared with each other, i.e., Fnext[2:0] (=110) is compared with Vduty[2:0] (=010). In this case, the distribution is executed at $P_1$=0 of the waveform shown in FIG. 37(B) like the above-mentioned case. Further, the distribution position at Fnext[2:0] includes the position at $P_1$=1 since Fnext[2]=1, whereby the distribution position of the pulse width is certainly selected from the distribution position of the dividing ratio by inverting the value of $P_1$ in the distribution at Vduty[2:0].

As described above, in case where Fnext[n-1:0]≧Vduty[n-1:0], Fnext[n-1:0] is compared with Vduty[n-1:0] for searching Xmax that is the maximum value of x satisfying Fnext[x]=1, and the values at (n-1-Xmax)th bit of the distribution cycle counters (corresponding to those shown in FIGS. 37(A) to 37(D)) are inverted to be applied to the formula 1, resulting in that the distribution positions of the pulse width are certainly selected from the distribution positions of the frequency dividing ratio. Although only the signals at (n-1-Xmax) th bit of the counters may be inverted, all the bits of the counters corresponding to all x satisfying Fnext[x]=1 may be inverted. This is because inverting the signals at (n-1-Xmax)th bit includes all the distribution positions corresponding to the signals at the following bits. Further, the circuit is simply configured by inverting each bit of the counters corresponding to all x. This is because the circuit for searching the maximum value of x is unnecessary. Therefore, the circuit shown in FIG. 34 is configured to invert bits corresponding to all x.

The following formula is obtained in case where the values at (n-1-Xmax)th bit of the distribution counters (corresponding to those shown in FIGS. 37(A) to 37(C)) are inverted.

The output on the $(P_0 \cdot 2^0 + P_1 \cdot 2^1 + \ldots + P_{n-1} \cdot 2^{n-1})$th cycle (wherein $P_X$ is a numerical value of 0 or 1) becomes $S_0 \cdot R_{n-1} + \_S_0 \cdot S_1 \cdot R_{n-2} + \ldots + \_S_0 \cdot S_1 \ldots \_S_{n-2} \cdot S_{n-1} \cdot R_0$ (wherein $\_S_X$ denotes the inversion of $S_X$ in which $S_X = \_P_X$ with respect to only the maximum value of n-1-X satisfying $Q_{n-1-X} \_ R_{n-1-X} 1$ and $S_X = P_X$ with respect to the others when low-order n-bit data among the M-bit data of the frequency dividing ratio is greater than low-order n-bit data of the A-bit pulse width information, while $S_X = \_P_X$ with respect to only the maximum value of n-1-X satisfying $Q_{n-1-X} \_ R_{n-1-X} = 1$ and $S_X = P_X$ with respect to the others when the low-order n-bit data among the M-bit data of the frequency dividing ratio is smaller than low-order n-bit data of the A-bit Vduty) from the low-order n-bit data $(R_0 \cdot 2^0 + R_1 \cdot 2^1 + \ldots + R_{n-1} \cdot 2^{n-1}$ (wherein $R_X$ is a numeric value of 0 or 1) of the A-bit output Vduty.

The explanation so far is made concerning the case where Fnext[n-1:0]≧Vduty[n-1:0]. The way this system operates in the circuit shown in FIG. 35 will firstly be explained before explaining the system when Fnext[n-1:0]<Vduty[n-1:0].

The comparing means 109*a* compares Fnext[n-1:0] with Vduty[n-1:0] and outputs 1 when Fnext[n-1:0]≧Vduty[n-1:0]. In this case, the output from the comparing means 109*a* is 1 since Fnext[n-1:0]≧Vduty[n-1:0]. Therefore, outputs from AND gates 109*b*1, 109*b*3, 109*b*5 and 109*b*7 are selected at the selectors 109*d*0 to 109*d*3. These AND gates outputs 1 when Fnext[x]=1 and Vduty[x]=0, while outputs 0 when Fnest[x] is not 1 and Vduty[x] is not 0. In other words, these AND gates search x satisfying Fnext[x]=1 and Vduty [x]=0.

The counter 109*c* is a driving cycle counter. Whether each bit of this counter is inverted or not is performed by the inverters 109*e*0 to 109*e*3 and selectors 109*f*0 to 109*f*3. If Fnext[2]=1 and Vduty[2]=0, the signal sell in FIG. 34 becomes 1, so that the Count[1] at the first bit of the counter means 109*c* is inverted.

Figure 37:
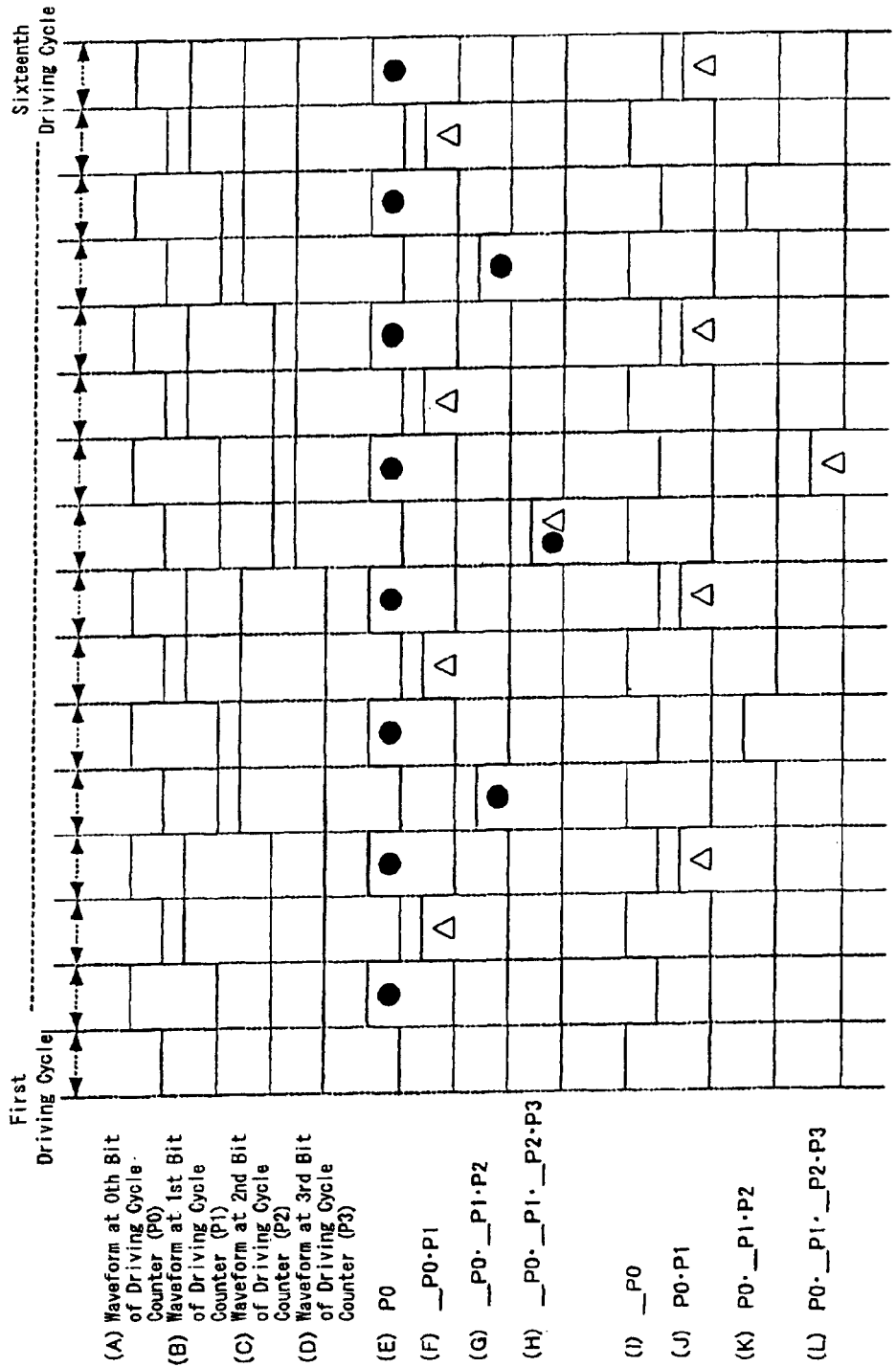
FIG. 37 is a waveform chart showing a second distribution example of the pulse width distributing/calculating means in the embodiment 6.

The AND gates 109*g*1 to 109*g*3 serve to making signals of (I) to (L) in FIG. 37. Further, the AND gates 109*h*0 to 109*h*3 and OR gate 109*i* select the meanss marked with Δ in the waveforms (I) to (L) in the example shown in FIG. 37. By this operation, the distribution position of the pulse width is certainly selected from the distribution position of the frequency dividing ratio.

Subsequently explained is the case where Fnext[n-1:0]<Vduty[n-1:0]. The logic in this case is contrary. Specifically, the distribution position of the pulse width is certainly selected from the distribution position of the frequency dividing ratio when Fnext[n-1:0]≧Vduty[n-1:0]. On the other hand, the distribution position of the frequency dividing ratio may certainly be selected from the distribution position of the pulse width when Fnext[n-1:0]<Vduty[n-1:0]. This can be achieved only by searching the value of x satisfying Vduty[x]=1 and Fnext[x]=0 contrary to the above-mentioned case where the value of x satisfying Vduty[x]=0 and Fnext[x]=1 is searched. This operation can be realized by the AND gates 109*b*2, 109*b*4, 109*b*6 and 109*b*8 in the circuit shown in FIG. 34.

Figure 38:
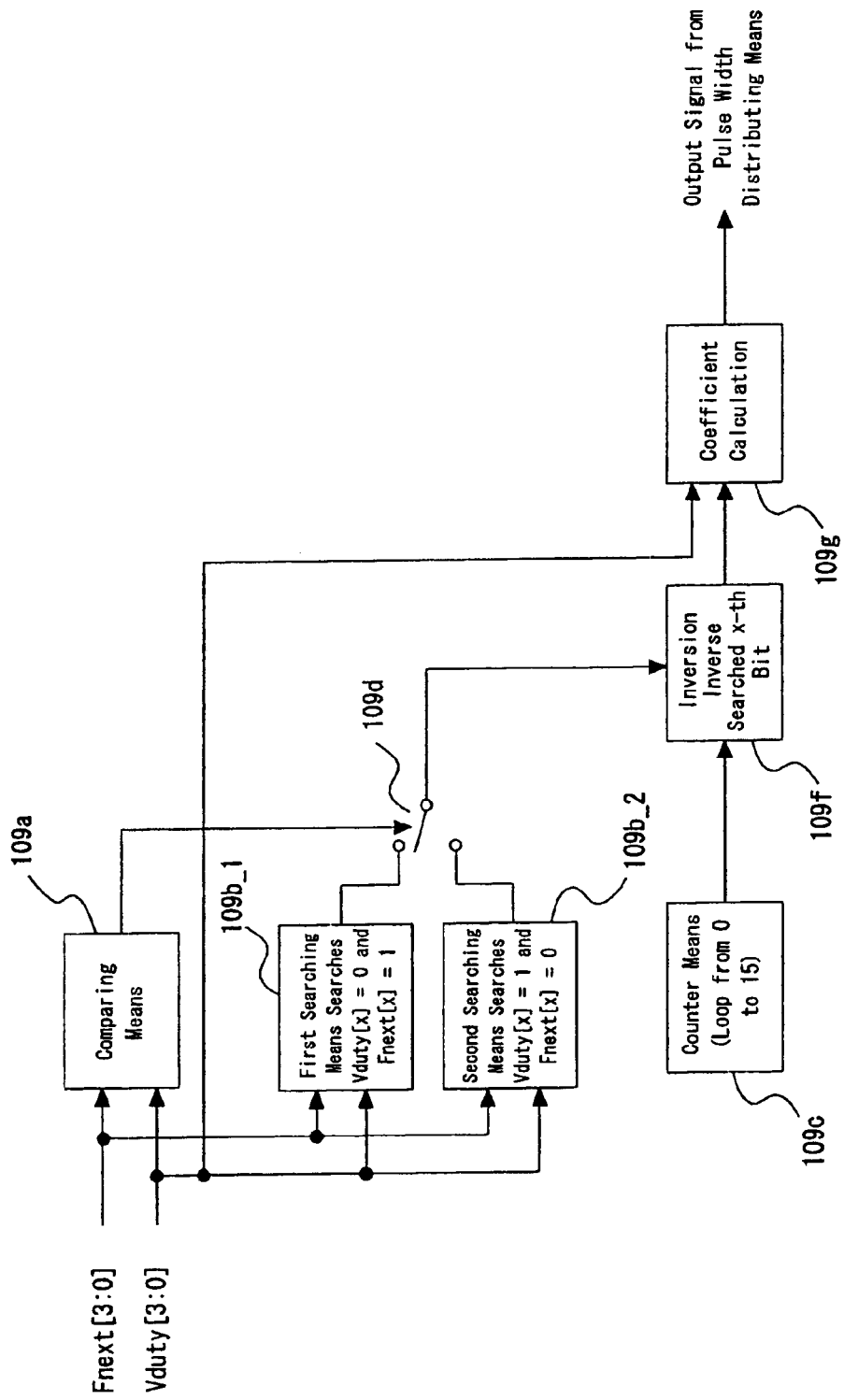
FIG. 38 is a block diagram obtained by simplifying the pulse width distributing/calculating means (FIG. 34) in the embodiment 6.

FIG. 38 is a block diagram simply showing the circuit of FIG. 34. In FIG. 38, numeral 109*b*_1 denotes a first searching means for searching x satisfying Fnext[x]=1 and Vduty[x]=0, 109*b*_2 denotes a second searching means for searching x satisfying Fnext[x]=0 and Vduty[x]=1, and 109*d* denotes a selector that performs a change-over between the search results of the first searching means 109*b*_1 and the second searching means 109*b*_2 from the result of the comparison from the comparing means 109*a*. The selector 109*d* outputs the search result from the first searching means 109*b*_1 when Fnext[x]≧Vduty[x], while outputs the search result from the second searching means 109*b*_2 when Fnext[x]<Vduty[x]. The first searching means 109*b*_1 corresponds to the AND gates 109*b*1, 109*b*3, 109*b*5 and 109*b*7 in FIG. 34, while the second searching means 109*b*_2 corresponds to the AND gates 109*b*2, 109*b*4, 109*b*6 and 109*b*8 in FIG. 34. The selector 109*d* corresponds to the selectors 109*d*0 to 109*d*3 in FIG. 34. Numeral 109*f* in FIG. 38 denotes an inverting means for inverting a predetermined bit of the counter means 109*c* from the search result outputted from the selector 109*d*. Specifically, the inverting means inverts the output from the counter means 109*c* with respect to the bit satisfying the search condition of the first searching means 109*b*_1 or the second searching means 109b_2. This inverting means 109f corresponds to the inverters 109e0 to 109e3 and selectors 109f0 to 109f3 in FIG. 34. Numeral 109g denotes a coefficient calculation means that outputs the final pulse width distribution signal from the output of the inverting means 109f and corresponds to the AND gates 109g1 to 109g3, 109h0 to 109h3 and 109i.

Figure 39:
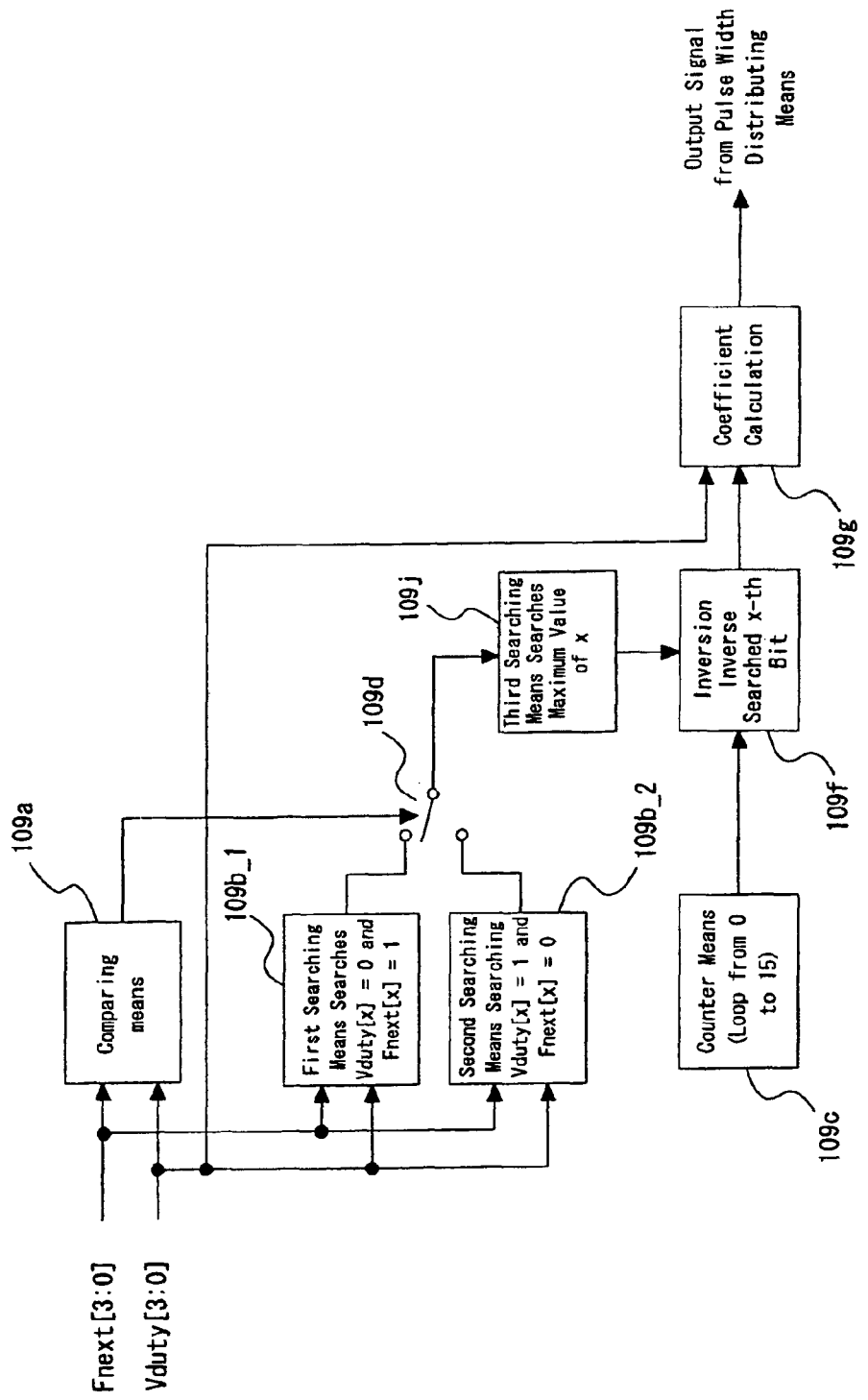
FIG. 39 is a block diagram of another mode obtained by simplifying the pulse width distributing/calculating means (FIG. 34) in the embodiment 6.
Figure 40:
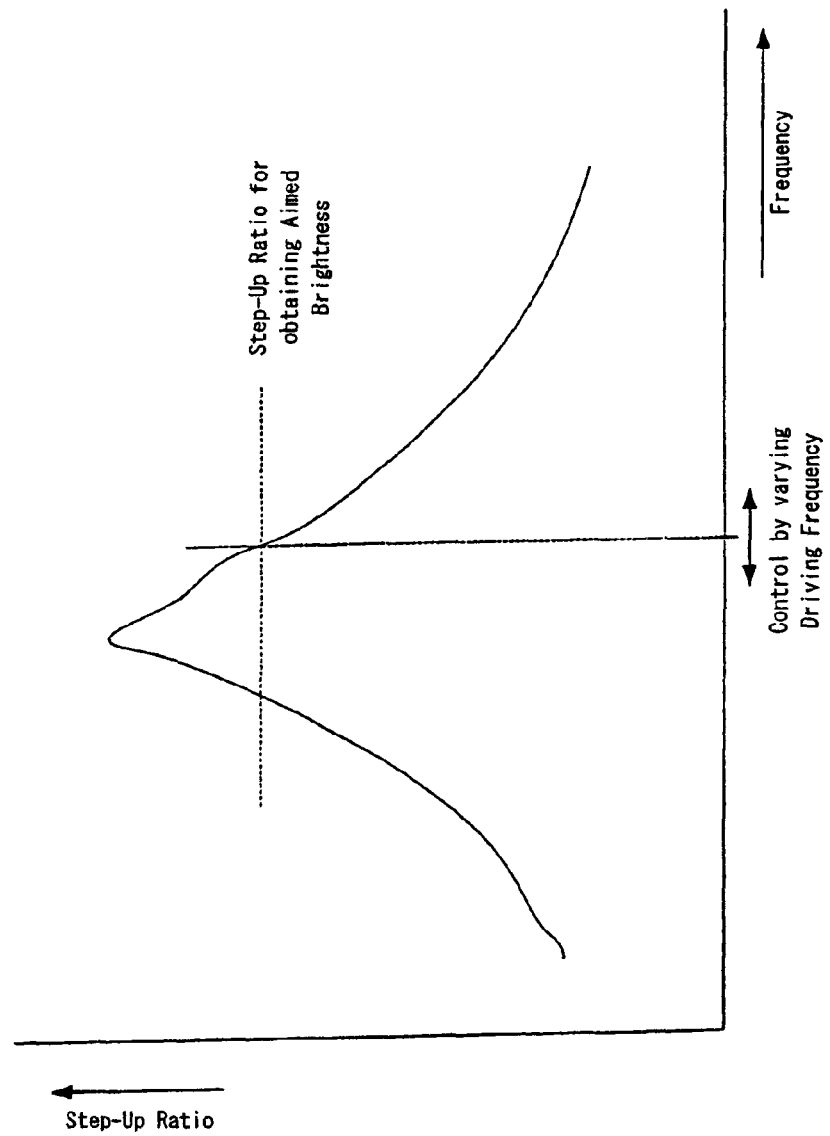
FIG. 40 is a view showing frequency characteristic of a piezoelectric transformer.
Figure 41:
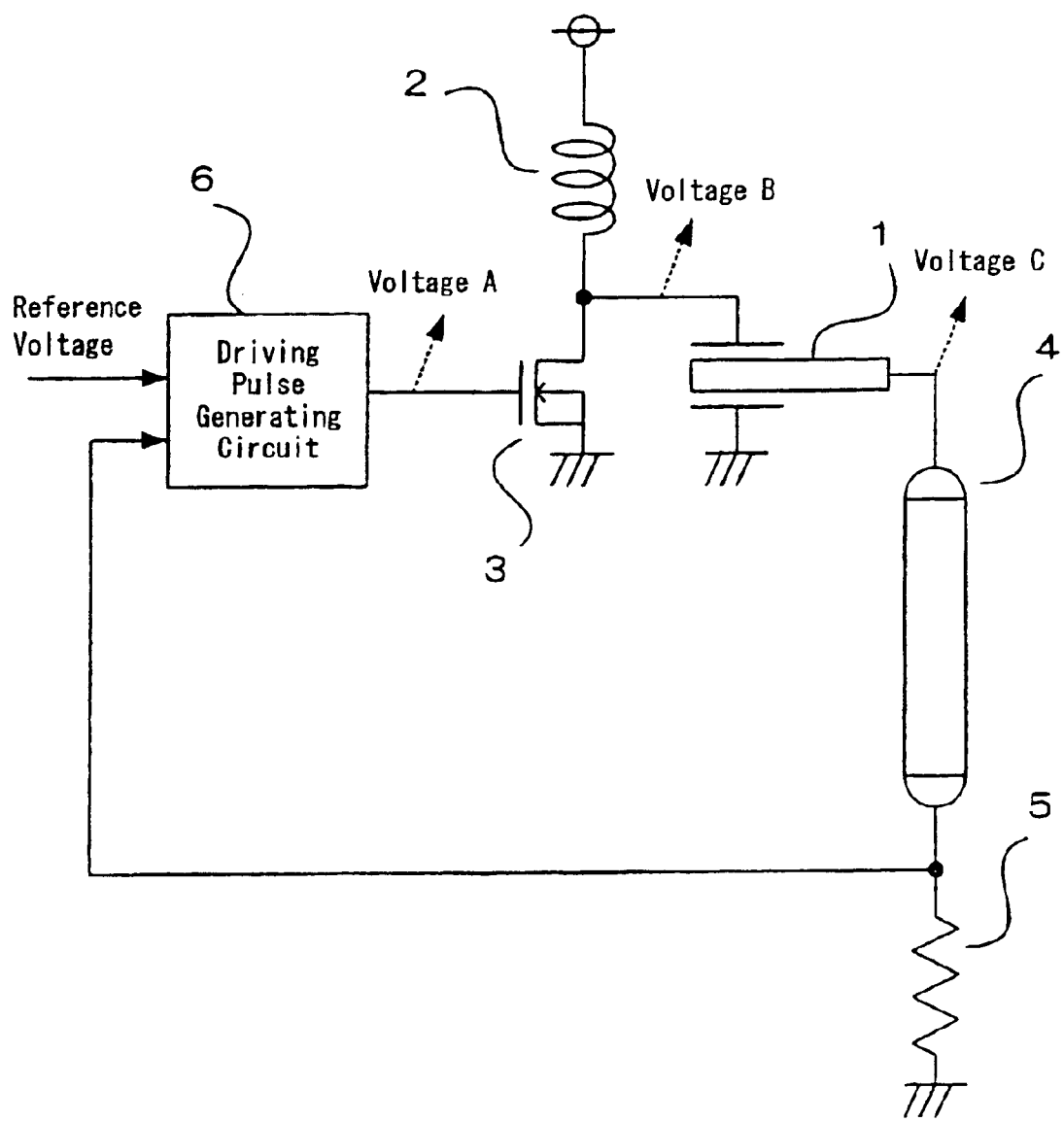
FIG. 41 is a principle view of a conventional driving of a piezoelectric transformer.
Figure 42:
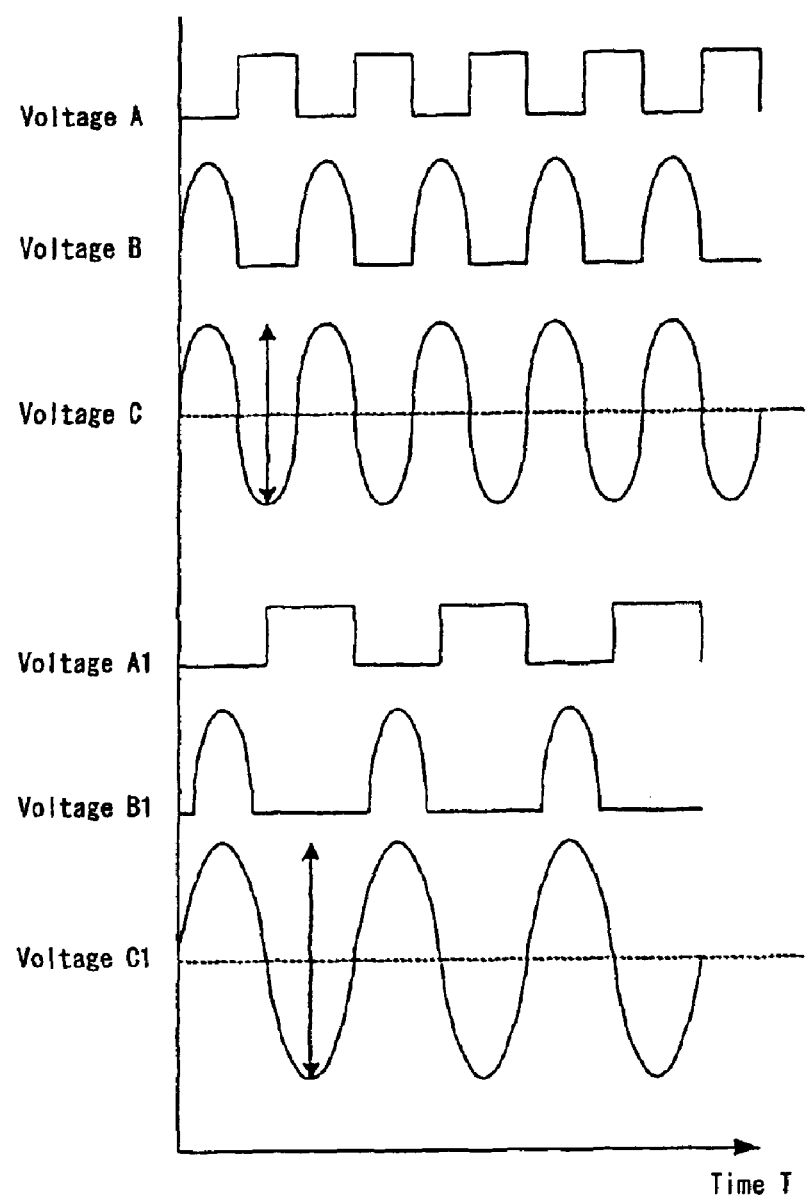
FIG. 42 is a waveform chart of each means of the conventional piezoelectric transformer driving.
Figure 43:
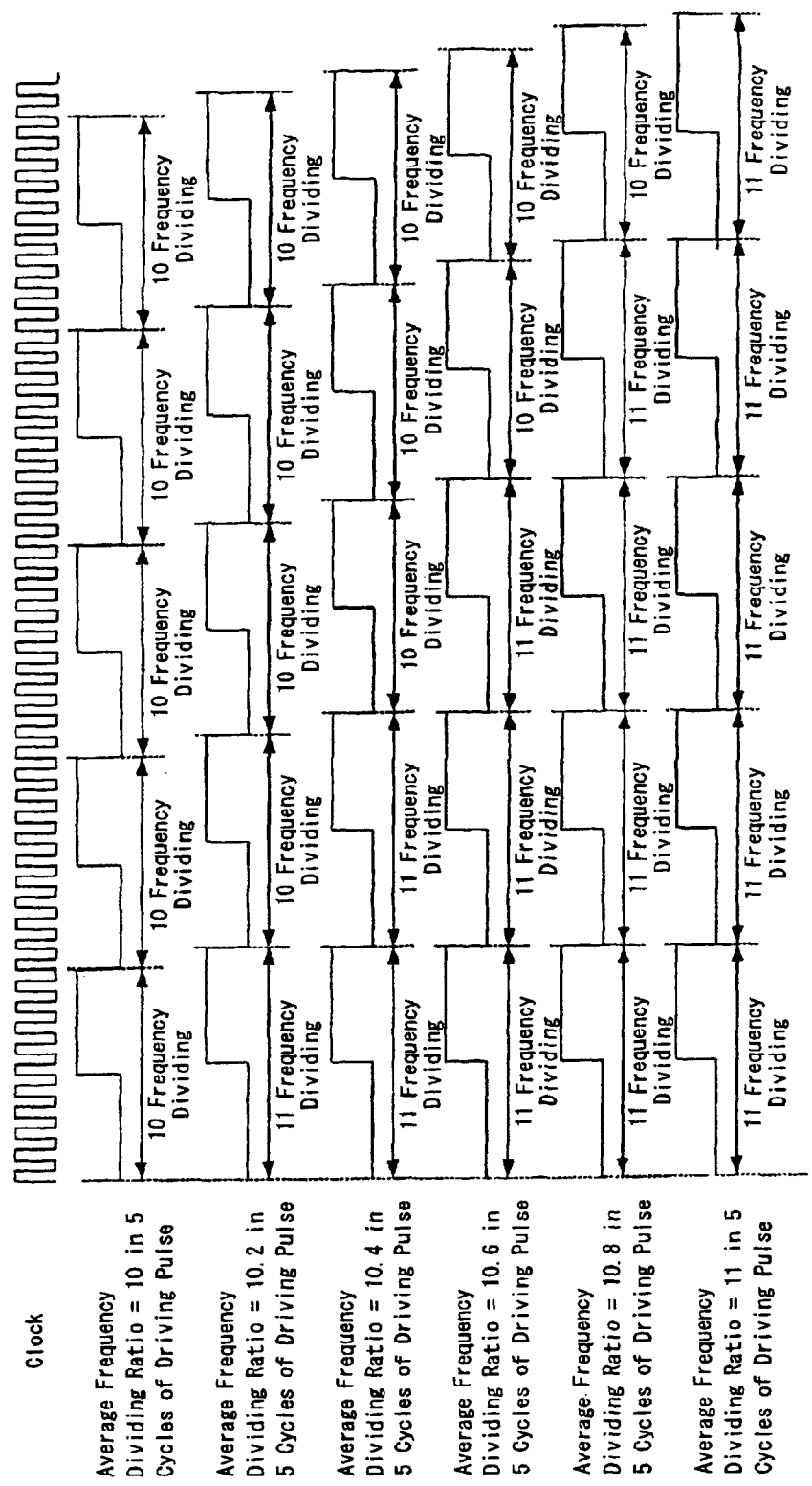
FIG. 43 is a waveform chart for explaining a conventional digital driving system.
Figure 44:
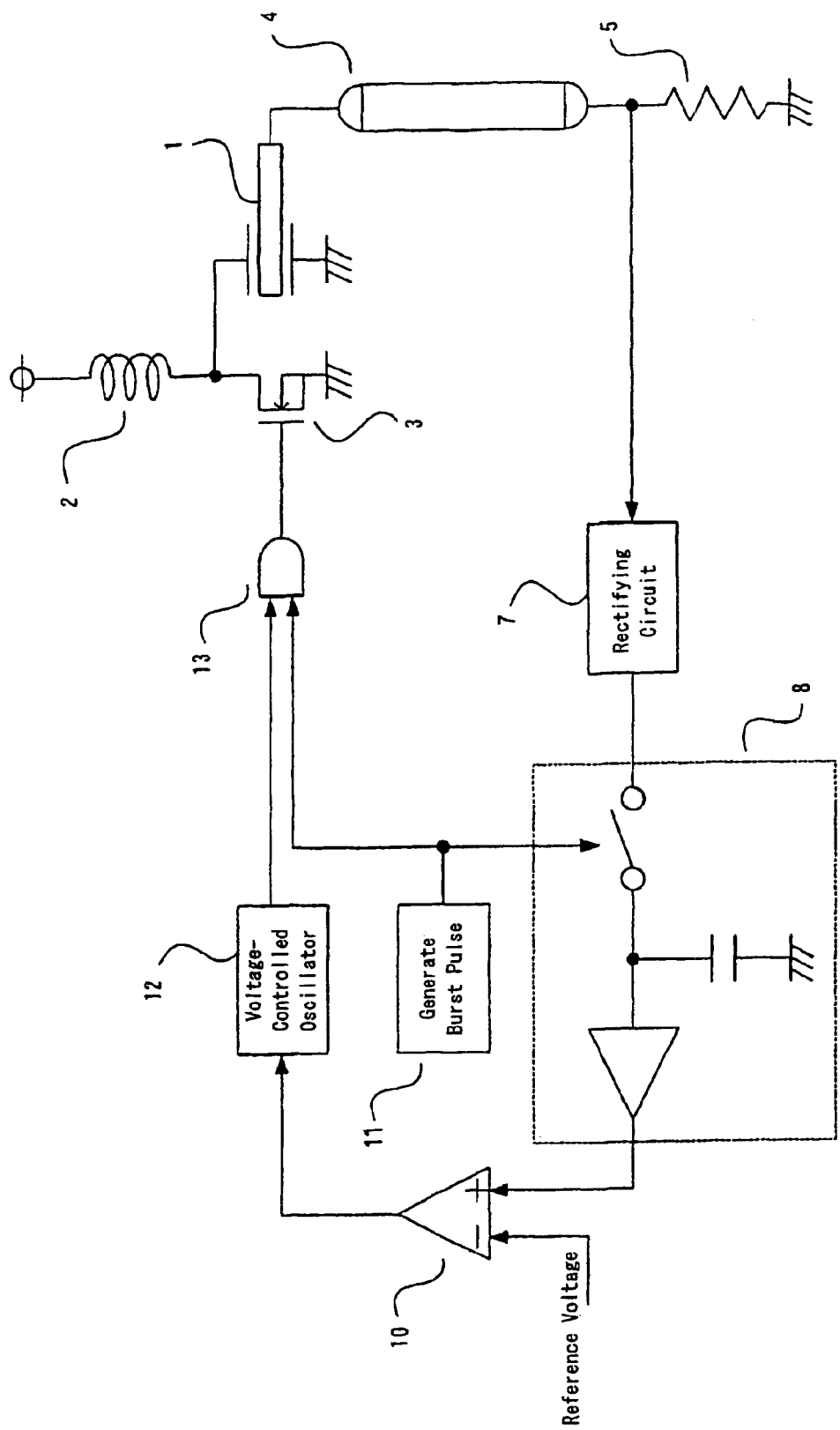
FIG. 44 is a block diagram realizing a conventional burst dimming.
Figure 45:
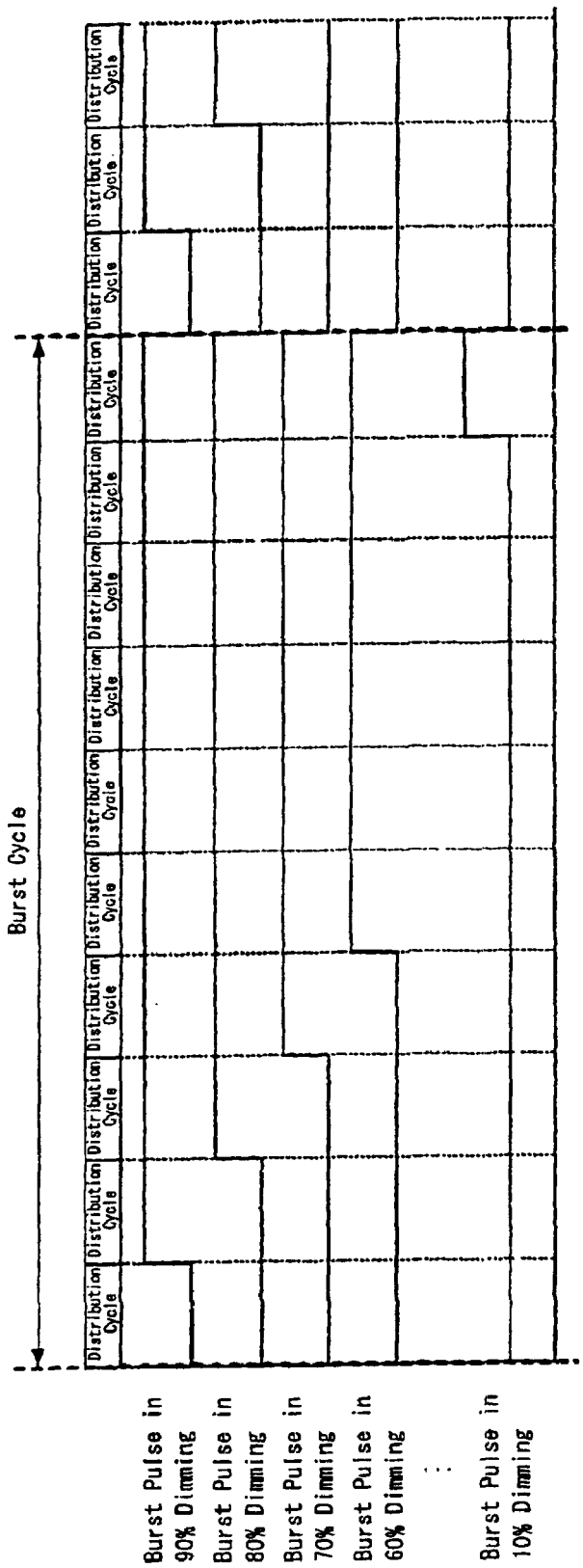
FIG. 45 is a view for explaining the conventional burst dimming.
Figure 46:
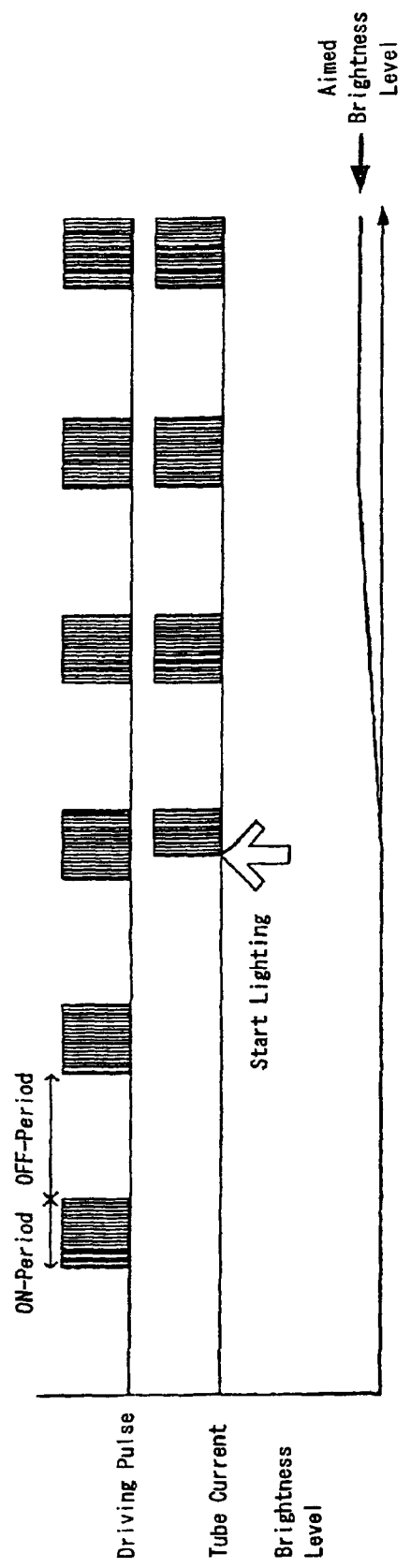
FIG. 46 is a waveform chart for explaining a starting method in the conventional burst dimming.
Figure 47:
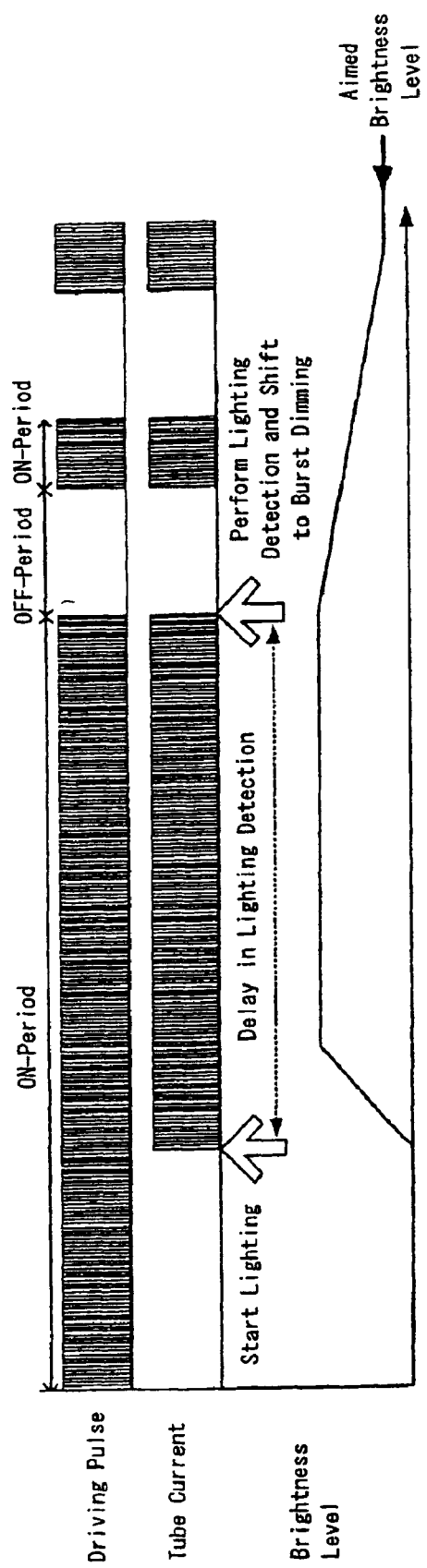
FIG. 47 is a waveform chart for explaining another starting method in the conventional burst dimming.

FIG. 39 is a block diagram showing the case where Fnext [x] is compared with Vduty[x] for searching the maximum value xmax satisfying Vduty[x]=0 and Fnext[x]=1, and only the value at (n-1-xmax)th bit of the counter means 109c is inverted. In FIG. 39, numeral 109j denotes a third searching means that outputs the maximum value xmax among the searched value x based upon the search result outputted from the selector 109d. The other configurations and operations are the same as those in the block diagram shown in FIG. 38, so that the effect is also the same.

As described above, the present embodiment provides a system wherein a pulse width is distributed to obtain a resolution of a pulse duty at an average pulse width among driving pulses during a predetermined cycle. Therefore, the pulse width resolution can remarkably be enhanced compared to the systems shown in FIGS. 25, 28 and 30. Accordingly, this system enables to perform a smooth duty control with respect to a power supply voltage, thereby improving a driving efficiency of the piezoelectric transformer. This greatly contributes to power reduction at a backlight means.

Further, the distribution form is approximately uniform in this system, thereby obtaining an effect that the disadvantage (e.g., brightness flicker) caused by concentrating the distribution positions on a specific position can almost be neglected.

Although a synchronization with the systems shown in FIGS. 25, 28 and 30 is not especially illustrated in the figure, this system can be used together with the Systems in the embodiments 4 and 5 for enhancing the resolution by using a trailing edge of a clock, since the pulse width information (signal outputted from the adder 110 in FIG. 33) obtained in the embodiment 6 and having the distributed pulse width has a meaning same as the output signal from the pulse width calculating means 107, for example, shown in FIG. 21 in the embodiment 4.

Each element of the averaging means 102, error voltage calculating means 103, frequency setting means 104, frequency dividing means 105, pulse width calculating means 107, pulse width adjusting means 108, pulse width distributing/calculating means 109, pulse width distributing means 111, comparing means 109a, first searching means 109b_1, second searching means 109b_2, third searching means 109b_3, counter means 109c, inverting means 109f and coefficient calculation means 109g may be achieved by a hardware or software or by a hybrid structure in combination with a hardware and software.

INDUSTRIAL APPLICABILITY

As explained in detail, according to the first means to solve the subjects, the control cycle is set to a cycle A times (A: natural integer) the driving pulse N cycle (distribution cycle) for driving A times at the same average frequency, and the sampling number N at the averaging means 102 becomes equal to the sampling number during the distribution cycle. Therefore, the burst dimming can be realized in the digital driving system using the frequency distribution of the driving pulse. Consequently, the present invention can provide a cold cathode tube driving device using a digital system that is advantageous in reducing cost and saving space because of one-chip formation with the other LSIs, to thereby bring a great effect to a further miniaturization of a small-sized imaging equipment.

Further, according to the second means to solve the subjects, changing the distribution number in accordance with the burst pulse width enables to lower the dimming level, thereby being capable of enlarging the dimming range.

Moreover, according to the third means to solve the subjects, the continuous driving is executed at the starting, thereby being capable of shifting to the burst dimming without deteriorating the lighting performance even in the burst dimming. Further, changing the control cycle at the starting and at the lighting, or changing the distribution number can improve the brightness change at the lighting to a level almost neglected, thereby giving an effect of remarkably improving the lighting quality.

Additionally, the fourth means to solve the subjects can provide a pulse width resolution with a double precision by using a trailing edge of a clock without deviating from a designing technique of a digital LSI, whereby a driving pulse having an optimum pulse width can be obtained within a wide range of a power supply voltage even in a digital driving system. This leads to reduce power consumption due to an improvement in efficiency and to prevent a break-down of a FET or piezoelectric transformer because of a surge upon driving the piezoelectric transformer, thereby bringing a great effect.

Further, according to the fifth means to solve the subjects, even in case where the frequency dividing ratio of the driving pulse has already aimed to enhance the precision by using the trailing edge of a clock, the cold cathode tube driving device of this embodiment can finely adjust the pulse width of the driving pulse by effectively using the trailing edge of a clock without hindering the effect of this case, to thereby obtaining an optimum pulse width in accordance with a power supply voltage. The other effects such as an effect of reduced power consumption due to an improvement in efficiency and an effect for preventing a break-down due to a surge can be obtained similar to the fourth means.

Moreover, the sixth means to solve the subjects provides a system wherein a pulse width is distributed to obtain a resolution of a pulse duty at an average pulse width among driving pulses during a predetermined cycle. Therefore, the pulse width resolution can remarkably be enhanced compared to the systems shown in FIGS. 25, 28 and 30. Accordingly, this system enables to perform a smooth duty control with respect to a power supply voltage, thereby improving a driving efficiency of the piezoelectric transformer. This greatly contributes to power reduction at a backlight means. Further, this system can be utilized in synchronization with the above-mentioned fourth and fifth means, thereby not ruining a conventional effect. Additionally, this system can be used together with the fourth and fifth means. It is needless to say that the combination of these systems effectively contributes to further improvement in efficiency.

Additionally, a means to perform a driving control of a backlight can digitally be realized in a liquid crystal display device, whereby a liquid crystal driving means and back light driving means are integrally formed with an LSI to achieve various effects such as a backlight dimming in synchronization with an image, reduced cost, saved space or the like.

What is claimed is:

1. A cold cathode tube driving device comprising:
a piezoelectric transformer which outputs an output voltage varying depending upon a frequency of an input voltage to a cold cathode tube which is a load;
a data converting device which detects electric current flowing through said cold cathode tube and converts the detected current amount into digital data;
a smoothing process device which smoothes output data from said data converting device at a predetermined timing;
an error voltage calculating device which compares smoothing data obtained from said smoothing process device with reference data and outputs error data corresponding to its difference;
a frequency setting device which sets a frequency of said driving pulse on the basis of said error data;
a frequency dividing device which divides a clock of a predetermined frequency and generates a driving pulse of an average frequency corresponding to the frequency data outputted from said frequency setting device in a distribution cycle which is N cycle period of said driving pulse;
a controller which controls a control cycle so as to perform the same driving for predetermined number of times A ($A \geq 2$) at said average frequency;
a burst pulse generating device which generates a pulse having a duty width in accordance with a dimming level externally applied thereto and having a frequency outputted from said controller;
an output enabling device which turns on or off the output of the driving pulse from said frequency dividing device in accordance with the output value from said burst pulse generating device; and
a power amplifying device which performs inversion with a switching by the driving pulse from said output enabling device and then outputs to said piezoelectric transformer.

2. A cold cathode tube driving device according to claim 1, wherein
said smoothing process device is configured such that an acquisition range of the data to be smoothed is variable in a unit of multiple of said distribution cycle in accordance with the pulse width of the burst pulse generated by said burst pulse generating device.

3. A cold cathode tube driving device according to claim 1, wherein
said smoothing process device is configured to perform an averaging process.

4. A cold cathode tube driving device according to claim 1, wherein
a controlling process device including said smoothing process device, said error voltage calculating device, said frequency setting device, said frequency dividing device, said controller, said burst pulse generating device and said output enabling device is configured by software.

5. A liquid crystal display device comprising:
a liquid crystal panel;
a cold cathode tube which is a backlight of said liquid crystal panel; and
the cold cathode tube driving device according to claim 1, wherein
the piezoelectric transformer in said cold cathode tube driving device is connected to said cold cathode tube.

6. A cold cathode tube driving device comprising:
a piezoelectric transformer which outputs an output voltage varying depending upon a frequency of an input voltage to a cold cathode tube which is a load;
a data converting device which detects electric current flowing through said cold cathode tube and converts the detected current amount into digital data;
a smoothing process device which smoothes output data from said data converting device at a predetermined timing;
an error voltage calculating device which compares smoothing data obtained from said smoothing process device which reference data and outputs error data corresponding to its difference;
a frequency setting device which sets a frequency of said driving pulse on the basis of said error data;
a frequency dividing device which divides a clock of a predetermined frequency and generates a driving pulse of an average frequency corresponding to the frequency data outputted from said frequency setting device in a distribution cycle which is N cycle period of said driving pulse;
a controller which controls a control cycle so as to perform the same driving for a predetermined number of times A×k ($A \geq 2$, k is a variable value according to said distribution cycle) at said average frequency;
a burst pulse generating device which generates a pulse having a duty width in accordance with a dimming level externally applied thereto and having a frequency outputted from said controller;
a distribution number adjusting device which sets said values of N and k determining said distribution cycle in conjunction with the burst pulse outputted from the burst pulse generating device;
an output enabling device which turns on or off the output of the driving pulse from said frequency dividing device in accordance with the output value from said burst pulse generating device; and
a power amplifying device which performs inversion with a switching by the driving pulse from said output enabling device and then outputs to said piezoelectric transformer.

7. A cold cathode tube driving device according to claim 6, wherein
said smoothing process device is configured such that an acquisition range of the data to the smoothed is variable in a unit of multiple of said distribution cycle in accordance with the pulse width of the burst pulse generated by said burst pulse generating device.

8. A cold cathode tube driving device according to claim 6, wherein
said smoothing process device is configured to perform an averaging process.

9. A cold cathode tube driving device according to claim 6, wherein
said distribution number adjusting device is configured to determine said value of k such that the control cycle by said controller is made constant regardless of said value of N.

10. A cold cathode tube driving device according to claim 6, wherein
said distribution number adjusting device is configured to adjust said value of A of said controller in conjunction with the duty of the burst pulse outputted from said burst pulse generating device.

11. A cold cathode tube driving device according to claim 6, wherein
a controlling process device including said smoothing process device, said error voltage calculating device, said frequency setting device, said frequency dividing device, said controller, said burst pulse generating device, said distribution number adjusting device and said output enabling device is configured by software.

12. A liquid crystal display device comprising:
a liquid crystal panel;
a cold cathode tube which is a backlight of said liquid crystal panel; and
the cold cathode tube driving device according to claim 6, wherein
said piezoelectric transformer in said cold cathode tube driving device is connected to said cold cathode tube.

13. A cold cathode tube driving device comprising:
a piezoelectric transformer which outputs an output voltage varying depending upon a frequency of an input voltage to a cold cathode tube which is a load;
a data converting device which detects electric current flowing through said cold cathode tube and an input voltage of said cold cathode tube and converts each of the detected current amounts into digital data;
a lighting detecting device which detects a lighting from the output from said data converting device;
a smoothing process device which smoothes output data from said data converting device at a predetermined timing;
an error voltage calculating device which compares smoothing data obtained from said smoothing process device with reference data and outputs error data corresponding to its difference;
a frequency setting device which sets a frequency of said driving pulse on the basis of said error data;
a frequency dividing device which divides a clock of a predetermined frequency and generates a driving pulse of an average frequency corresponding to the frequency data outputted from said frequency setting device in a distribution cycle which is N cycle period of said driving pulse;
a controller which controls a control cycle so as to perform the same driving for a predetermined number of times $A(A \geqq 2)$ at the average frequency;
a control cycle switching device which switches said number of times A in conjunction with a lighting detection pulse outputted from said lighting detecting device;
a dimming level switching device which switches between an externally applied dimming level and a separately set dimming level in conjunction with the lighting detection pulse outputted from said lighting detecting device;
a burst pulse generating device which generates a pulse having a duty width in accordance with the output from said dimming level switching device and having a frequency outputted from said controller;
an output enabling device which turns on or off the output of the driving pulse from said frequency dividing device in accordance with the output value from said burst pulse generating device; and
a power amplifying device which performs inversion with a switching by the driving pulse from said output enabling device and then outputs to said piezoelectric transformer.

14. A cold cathode tube driving device according to claim 13, wherein
the number of times A representing the control cycle set at said control cycle switching device is set such that the number of times at the starting is smaller than that at the lighting.

15. A cold cathode tube driving device according to claim 13, wherein
the distribution cycle of said frequency dividing device is switched in conjunction with the lighting detection pulse outputted from said lighting detecting device and is set such that the distribution number at the starting is smaller than that at the fill lighting.

16. A cold cathode tube driving device according to claim 13, wherein
said dimming level switching device is configured to output a dimming level representing 100% continuous driving when the light ing detection pulse outputted from said lighting detecting device has a value showing a non-lighting state.

17. A cold cathode tube driving device according to claim 13, wherein
a controlling process device including said smoothing process device, said error voltage calculating device, said frequency setting device, said frequency dividing device, said controller, said control cycle switching device, said dimming level switching device, said burst pulse generating device and said output enabling device is configured by software.

18. A liquid crystal display device comprising:
a liquid crystal panel;
a cold cathode tube which is a backlight of said liquid crystal panel; and
the cold cathode tube driving device according to claim 13, wherein
said piezoelectric transformer in said cold cathode tube driving device is connected to said cold cathode tube.

19. A cold cathode tube driving device which generates a driving pulse obtained by dividing a clock of a predetermined frequency in accordance with a frequency dividing ratio corresponding to a difference between an electric amount in a cold cathode tube which is a load of a piezoelectric transformer and a reference electric amount and outputs the generated pulse to said piezoelectric transformer, comprising:
a frequency setting device which obtains dividing ratio information as to said driving pulse from the information of said difference;
a frequency dividing device which generates a distribution pulse which is a pulse in a state of distributing a frequency dividing ratio on the basis of said dividing ratio information;
a power supply voltage detecting device which detects a power supply voltage and outputs power supply voltage information;
a pulse width calculating device which calculates pulse width information of said distribution pulse on the basis of said power supply voltage information and said dividing ratio information; and
a pulse width adjusting device which generates an extended pulse having a pulse width obtained by extending said pulse width of said distribution pulse on the basis of said pulse width information as well as switches between said distribution pulse and said extended pulse on the basis of said pulse width information and then outputs the resultant to a driving element of the piezoelectric transformer.

20. A cold cathode tube driving device according to claim 19, wherein said pulse width calculating device is configured to output the pulse width information, as to said distribution pulse, obtained from said power supply voltage information from said power supply voltage detecting device and said dividing ratio information from said frequency setting device as data including decimal means corresponding to one cycle or less of a clock; and said pulse width adjusting device is configured to include:

a pulse width shaping device which shapes the pulse width of said distribution pulse outputted from said frequency dividing device into a value corresponding to an integer means of said pulse width information;

at least one pulse width extending device which converts the output from said pulse width shaping device into the extended pulse having an extended pulse width; and a switching device which switches between the output from said pulse width extending device and the output from said pulse width shaping device in accordance with the value of the decimal means of said pulse width information and outputs the resultant.

21. A cold cathode tube driving device which generates a driving pulse obtained by dividing a clock of a predetermined frequency in accordance with a frequency dividing ratio corresponding to a difference between an electric amount in a cold cathode tube which is a load of a piezoelectric transformer and a reference electric amount and outputs the generated pulse to said piezoelectric transformer, comprising:

a frequency setting device which obtains dividing ratio information as to said driving pulse from the information of said difference;

a frequency dividing device which generates a distribution pulse having a dividing ratio of D+1 for L times (L<N) at a period of K cycles of said driving pulse with respect to the reference dividing ratio D;

a power supply voltage detecting device which detects a power supply voltage;

a pulse width calculating device which outputs the pulse width information, as to said distribution pulse, obtained from said power supply voltage information from said power supply voltage detecting device and said dividing ratio information from said frequency setting device as data including decimal means corresponding to one cycle or less of a clock;

a pulse width shaping device which shapes the pulse width of said distribution pulse outputted from said frequency dividing device into a value corresponding to an integer means of said pulse width information;

at least one pulse width extending device which converts the output from said pulse width shaping device into the extended pulse having an extended pulse width; and a switching device which switches between the output from said pulse width extending device and the output from said pulse width shaping device in accordance with the value of the decimal means of said pulse width information and outputs the resultant to a driving element of the piezoelectric transformer.

22. A cold cathode lube driving device according to claim 20 or 21, wherein said pulse width extending device has a delay fine-adjusting device which converts the output from said pulse width shaping device into an extended pulse having a pulse width extended with the respective delay difference set shorter than one cycle of said clock.

23. A cold cathode tube driving device according to claim 22, wherein said delay fine-adjusting device is configured by a flip-S flop which latches at a trailing edge or a clock.

24. A cold cathode tube driving device which generates a driving pulse obtained by dividing a clock of a predetermined frequency in accordance with a frequency dividing ratio corresponding to a difference between an electric amount in a cold cathode tube which is a load of a piezoelectric transformer and a reference electric amount and outputs the generated pulse to said piezoelectric transformer, comprising:

a frequency setting device which obtains dividing ratio information as to said driving pulse from the information of said difference;

a frequency dividing device which generates a distribution pulse being in a state of distributing a frequency dividing ratio on the basis of said dividing ratio information;

a power supply voltage detecting device which detects a power supply voltage of an input;

a pulse width calculating device which calculates pulse width information of said distribution pulse on the basis of said power supply voltage information and said dividing ratio information; and a pulse width adjusting device which generates an extended pulse having a pulse width obtained by extending the pulse width of said distribution pulse by 0.5 cycles, generates a delayed pulse and delayed and extended pulse each having a pulse width obtained by delaying said distribution pulse and said extended pulse by 0.5 cycles on the basis of said pulse width information from the pulse width calculating device, switches among said distribution pulse, said extended pulse, said delayed pulse and said delayed and extended pulse on the basis of the pulse width information, and then outputs the resultant to a driving element of the piezoelectric transformer.

25. A cold cathode lube driving device according to claim 24, wherein said pulse width calculating device is configured to output the pulse width information of said distribution pulse, obtained from said power supply voltage information from said power supply voltage detecting device and said dividing ratio information from said frequency setting device as data including decimal means corresponding to one cycle or less of a clock; and said pulse width adjusting device is configured to include:

a pulse width shaping device which shapes the pulse width of said distribution pulse outputted from said frequency dividing device into a value corresponding to an integer part of said pulse width information;

a 1-clock-cycle delaying device which latches the output from said pulse width shaping device at the leading edge of a clock;

a 0.5-clock-cycle delaying device which latches the output from said pulse width shaping device at the trailing edge of a clock; and a switching device which, to the driving element of the piezoelectric transformer, outputs the output from said pulse width shaping device when low-order 1-bit value of said A-bit pulse width information is at low level and said dividing ratio is D, outputs the output from said 0.5-clock-cycle delaying device when low-order 1-bit value of said A-bit pulse width information is at low level and said dividing ratio is D+1, outputs a logical sum of the output from said 0.5-clock-cycle delaying device and the output from said pulse width adjusting device when low-order 1-bit value of said A-bit pulse width information is at high level and said dividing ratio is D, and outputs a logical sum of the output from said 0.5-clock-cycle delaying device and the output from said 1-clock-cycle delaying device when low-order 1-bit value of said A-bit pulse width information is at high level and said dividing ratio is D+1.

26. A cold cathode tube driving device which generates a driving pulse obtained by dividing a clock of a predetermined frequency in accordance with a frequency dividing ratio corresponding to a difference between an electric amount in a cold cathode tube which is a load of a piezoelectric transformer and a reference electric amount, and then outputs the generated pulse to said piezoelectric transformer, comprising:

a frequency setting device which obtains dividing ratio information as to said driving pulse from the information of said difference;

a frequency dividing device which produces a distribution pulse having a dividing ratio of D+1 at L times (L<K) during K cycles of said driving pulse with respect to the reference dividing ratio D;

a power supply voltage detecting device which detects a power supply voltage of an input;

a pulse width calculating device which outputs the pulse width information obtained from said power supply voltage information from said power supply voltage detecting device and said dividing ratio information from said frequency setting device as data including decimal device corresponding to one cycle or less of a clock;

a pulse width shaping device which shapes the pulse width of said distribution pulse outputted from said frequency dividing device into a value corresponding to an integer means of said pulse width information;

a 1-clock-cycle delaying device which latches the output from said pulse width shaping device at the leading edge of a clock;

a 0.5-clock-cycle delaying device which latches the output from said pulse width shaping device at the trailing edge of a clock; and a switching device which, to the driving element of the piezoelectric transformer, outputs the output from said pulse width shaping device when low-order 1-bit value of said A-bit pulse width information is at low level and said dividing ratio is D, outputs the output from said 0.5-clock-cycle delaying device when low-order 1-bit value of said A-bit pulse width information is at low level and said dividing ratio is D+1, outputs a logical sum of the output from said 0.5-clock-cycle delaying device and the output from said pulse width adjusting device when low-order 1-bit value of said A-bit pulse width information is at high level and said dividing ratio is D, and outputs a logical sum of the output from said 0.5-clock-cycle delaying device and the output from said 1-clock-cycle delaying device when low-order 1-bit value of said A-bit pulse width information is at high level and said dividing ratio is D+1.

27. A cold cathode tube driving device which generates a driving pulse obtained by dividing, a clock of a predetermined frequency in accordance with a frequency dividing ratio corresponding to a difference between an electric amount in a cold cathode lube which is a load of a piezoelectric transformer and a reference electric amount and outputs the generated pulse to said piezoelectric transformer, comprising:

a frequency setting device which obtains dividing ratio information as to the driving pulse from the information of said difference;

a frequency dividing device which produces a distribution pulse which is a pulse for distributing a frequency dividing ratio based upon said dividing ratio information;

a power supply voltage detecting device which detects a power supply voltage of an input:

a pulse width calculating device which calculates pulse width information of said distribution pulse based upon the power supply voltage information and said dividing ratio information;

a pulse width distributing device which inputs the pulse width information from said pulse width calculating device, increases said pulse width information at a predetermined timing and outputs said increased information; and a pulse width adjusting device which adjusts the pulse width of said distribution pulse according to the output from said pulse width distributing device and outputs the adjusted pulse width to a driving element of the piezoelectric transformer.

28. A cold cathode tube driving device according to claim 27, wherein said pulse width calculating device is configured to output said pulse width information as A-bit data based upon said power supply voltage information and the dividing ratio information obtained at said frequency dividing device, and said pulse width distributing device is configured to output data obtained by adding 1 to the high-order (A-n)-bit data of said A-bit pulse width information during nth root of 2 of the distribution pulse the times represented by the low-order n-bit of said A-bit pulse width information.

29. A cold cathode tube driving device which generates a driving pulse obtained by dividing a clock of a predetermined frequency in accordance with a frequency dividing ratio corresponding to a difference between an electric amount in a cold cathode tube which is a load of a piezoelectric transformer and a reference electric amount and outputs the generated pulse to said piezoelectric transformer, including:

a frequency setting device for obtaining dividing ratio information as to said driving pulse from the information of said difference;

a frequency dividing device which produces a distribution pulse having a dividing ratio of D+1 for L times (L<K) during K cycles of said driving pulse with respect to the reference dividing ratio D;

a power supply voltage detecting device which detects a power supply voltage of an input;

a pulse width calculating device which outputs said pulse width information as A-bit data based upon said power supply voltage information and the dividing ratio information obtained at said frequency dividing device; and a pulse width distributing device which outputs data obtained by adding 1 to the high-order (A-n)-bit data of said A-bit pulse width information during nth root of 2 of the distribution pulse the times represented by the low-order n-bit of said A-bit pulse width information.

30. A cold cathode tube driving device according to any of claims 27 to 29, wherein said pulse width distributing device is configured to distribute a distribution pulse such that the duty ratio of the pulse width of said distribution pulse becomes approximately constant, said frequency dividing device is configured to include:

a frequency dividing device which divides a clock having a predetermined frequency with the dividing ratio D represented by high-order (M-n)-bit data of said M-bit dividing ratio information in order to make the duty ratio of said pulse width of the distribution pulse approximately constant; and a dividing ratio distributing device which outputs 1 during nth root of 2 of said distribution pulse the times represented by the low-order n-bit of said M-bit dividing ratio information to make said dividing ratio of the frequency dividing device D÷1, and said pulse width distributing device is configured to add 1 to the high-order (A-n)-bit data of said A-bit pulse width information when the output from said dividing ratio distributing device is 1.

31. A cold cathode tube driving device according to any of claims 27 to 29, wherein said pulse width distributing device is configured such that, in order to add 1 to the high-order (A-n)-bit data of said A-bit pulse width information when the output from the dividing ratio distribution data is 1, the output on the $(P_0 \cdot 2^0 + P_1 \cdot 2^1 + \ldots + P_{n-1} \cdot 2^{n-1})$th cycle of the distribution pulse becomes $(P_0 \cdot Q_{n-1} + \_P_0 \cdot P_1 \cdot Q_{n-2} + \ldots + \_P_0 \cdot P_1 \ldots \_P_{n-2} \cdot P_{n-1} \cdot Q_0)$ from the low-order a-bit data $(Q_0 \cdot 2^0 + Q_1 \cdot 2^1 + \ldots + Q_{n-1} \cdot 2^{n-1})$ among the M-bit data outputted from said frequency setting device, and is configured to include:

a comparing device which compares the tow-order n-bit data of the dividing ratio distribution data with the low-order n-bit data of the pulse width information on the condition which the adding value of the pulse width on the $(P_0 \cdot 2^0 + P_1 \cdot 2^1 + \ldots - P_{n-1} \cdot 2^{n-1})$th cycle of said pulse width distribution satisfies $S_X = (Q_{n-1-X} \_ R_{n-1-X}) \cdot \_P_X + \_Q(Q_{n-1-X} \_ R_{n-1-X}) \cdot P_X$ when low-order n-bit data among said M-bit data of the frequency dividing ratio is greater than low-order n-bit data of said A-bit pulse width information, while satisfies $S_X = (\_Q_{n-1-X} \cdot R_{n-1-X}) \cdot \_P_X + (\_Q_{n-1-X} \cdot R_{n-1-X}) \cdot P_X$ when the low-order n-bit data among said M-bit data of the frequency dividing ratio is smaller than low-order n-bit data of said A-bit pulse width information, wherein $P_X$, $Q_X$ and $R_X$ are 0 or 1 and $\_P_X$, $\_Q_X$ and $\_R_X$ respectively represent the inversions of $P_X$, $Q_X$ and $R_X$;

a first searching device for searching a bit where said low-order n-bit of the dividing ratio distribution data is 1 and the low-order n-hit data of said pulse width information is 0;

a second searching device for searching a bit when said low-order n-bit of the dividing ratio distribution data is 0 and the low-order n-bit data of said pulse width information is 1;

a switching device which outputs the result from said first searching device when the low-order n-bit of the dividing ratio distribution data is greater than said low-order n-bit data of the pulse width information in said comparing device, while output the result from said second searching device when smaller;

a counter device which counts a period corresponding to a cycle of nth root of 2 of said driving pulse; and an inverting device which inverts a predetermined bit of said counter device according to the output from said switching device, whereby said value $S_X$ is obtained.

32. A cold cathode tube driving device according to any of claims 27 to 29, wherein said pulse width distributing device is configured such that, in order to add 1 to the high-order (A-n)-bit data of said A-bit pulse width information when the output from said dividing ratio distribution data is 1, the output on the $(P_0 \cdot 2^0 + P_1 \cdot 2^1 + \ldots + P_{n-1} \cdot 2^{n-1})$th cycle of the distribution pulse becomes $(P_0 \cdot Q_{n-1} + \_P_0 \cdot P_1 \cdot Q_{n-2} + \ldots + \_P_0 \cdot P_1 \ldots \_P_{n-2} \cdot P_{n-1} \cdot Q_0)$ from the low-order n-bit data $(Q_0 \cdot 2^0 + Q_1 \cdot 2^1 + \ldots + Q_{n-1} \cdot 2^{n-1})$ among the M-bit data outputted from said frequency setting device, and is configured to include:

a comparing device which compares the low-order n-bit data of said dividing ratio distribution data with the low-order n-bit data of the pulse width information on the condition that the adding value of the pulse width on the $(P_0 \cdot 2^0 + P_1 \cdot 2^1 + \ldots + P_{n-1} \cdot 2^{n-1})$th cycle of said pulse width distributing device satisfies $S_X = \_P_X$ with respect to only the maximum value of n-1-X satisfying $Q_{n-1-X} \_ R_{n-1-X} = 1$ and $S_X = P_X$ with respect to the others when low-order n-bit data among said M-bit data of the frequency dividing ratio is greater than low-order n-bit data of the A-bit pulse width information, while $S_X = \_P_X$ with respect to only the maximum value of n-1-X satisfying $\_Q_{n-1-X} \cdot R_{n-1-X} = 1$ and $S_X = \_P_X$ with respect to the others when the low-order n-bit data among said M-bit data of the frequency dividing ratio is smaller than low-order n-bit data of said A-bit pulse width information, wherein $P_X$, $Q_X$ and $R_X$ are 0 or 1 and $\_P_X$, $\_Q_X$ and $\_R_X$ respectively represent the inversions of $P_X$, $Q_X$ and $R_X$;

a first searching device for searching a bit where said low-order n-bit of the dividing, ratio distribution data is 1 and the low-order n-bit data of said pulse width information is 0;

a second searching device for searching a bit where said low-order n-bit of the dividing, ratio distribution data is 0 and the low-order n-bit data of said pulse width information is 1;

a switching device which outputs the result from said first searching device when said low-order n-bit of the dividing ratio distribution data is greater than said low-order n-bit data of the pulse width information in said comparing device, while outputs the result from said second searching device when smaller;

a third searching device for searching the most significant bit among the search result outputted from said switching device;

a counter device which counts a period corresponding to a cycle of nth root of 2 of said driving pulse; and an inverting device which inverts a predetermined bit of said counter device according to the output from said third searching device, whereby said value of $S_X$ is obtained.

33. A cold cathode tube driving device according to any of claims 19–21 or 23–29 further including:

in front of said frequency setting device, a current detecting device for detecting a current flowing through said cold cathode tube;

a rectifying device which converts a sinusoidal voltage obtained from said current detecting device into an approximately DC voltage;

an A/D converter which converts said rectified voltage signal into a digital signal;

a smoothing process device for smoothing the output data from said A/D converter; and an error voltage calculating device which multiplies difference data between the externally applied reference data and the output data from said smoothing process device by a constant and outputs the resultant to said frequency setting device as error data.

34. A liquid crystal display device comprising:

a liquid crystal panel;

a cold cathode tube which is a back light of said liquid crystal panel; and a cold cathode tube driving device according to any of claims 19–21 or 23–29, wherein said piezoelectric transformer in said cold cathode tube driving device is connected to said cold cathode tube.

\* \* \* \* \*